(12) United States Patent
Shrivastava et al.

(10) Patent No.: US 11,868,103 B2
(45) Date of Patent: ***Jan. 9, 2024

(54) SITE MONITORING SYSTEM

(71) Applicant: View, Inc., Milpitas, CA (US)

(72) Inventors: Dhairya Shrivastava, Los Altos, CA (US); Stephen Clark Brown, San Mateo, CA (US); Alexander Rumer, Santa Clara, CA (US)

(73) Assignee: View, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,716

(22) Filed: Sep. 27, 2021

(65) Prior Publication Data

US 2022/0011729 A1    Jan. 13, 2022

Related U.S. Application Data

(63) Continuation of application No. 16/338,403, filed as application No. PCT/US2017/054120 on Sep. 28, (Continued)

(51) Int. Cl.
*G05B 15/02* (2006.01)
*E06B 9/24* (2006.01)
(Continued)

(52) U.S. Cl.
CPC .......... *G05B 15/02* (2013.01); *E06B 9/24* (2013.01); *F24F 11/30* (2018.01); *G02F 1/163* (2013.01); *E06B 2009/2464* (2013.01)

(58) Field of Classification Search
CPC ... G05B 15/02; E06B 9/24; E06B 2009/2464; F24F 11/30; G02F 1/163
See application file for complete search history.

(56) References Cited

U.S. PATENT DOCUMENTS

| | | |
|---|---|---|
| 4,129,861 A | 12/1978 | Giglia |
| 4,553,085 A | 11/1985 | Canzano |

(Continued)

FOREIGN PATENT DOCUMENTS

| | | |
|---|---|---|
| CN | 1161092 A | 10/1997 |
| CN | 1219251 A | 6/1999 |

(Continued)

OTHER PUBLICATIONS

"Sage Product Highlights" screenshot, accessed Aug. 28, 2015, 1 page.

(Continued)

*Primary Examiner* — Charles Cai
(74) *Attorney, Agent, or Firm* — Weaver Austin Villeneuve & Sampson LLP; Brian D. Griedel

(57) ABSTRACT

A site monitoring system (SMS) may analyze information from one or more sites to determine when a device, a sensor, a controller, or other structure or component associated with a network of optically switchable devices has a problem. The system may, if appropriate, act on the problem. In certain embodiments, the system learns customer/user preferences and adapts its control logic to meet the customer's goals. In various embodiments, the system updates a memory component associated with one or more optically switchable windows and/or controllers. The memory component may be updated to reflect an updated control algorithm and/or associated parameters in some cases.

34 Claims, 23 Drawing Sheets

Related U.S. Application Data 2017, now Pat. No. 11,150,616, said application No. 16/338,403 is a continuation-in-part of application No. 15/123,069, filed as application No. PCT/US2015/019031 on Mar. 5, 2015, now Pat. No. 10,859,983.

(60) Provisional application No. 62/403,605, filed on Oct. 3, 2016, provisional application No. 61/974,677, filed on Apr. 3, 2014, provisional application No. 61/948,464, filed on Mar. 5, 2014.

(51) Int. Cl.
  *G02F 1/163* (2006.01)
  *F24F 11/30* (2018.01)

(56) References Cited

U.S. PATENT DOCUMENTS

| | | |
|---|---|---|
| 5,384,653 A | 1/1995 | Benson et al. |
| 5,416,617 A | 5/1995 | Loiseaux et al. |
| 5,440,317 A | 8/1995 | Jalloul et al. |
| 5,477,152 A | 12/1995 | Hayhurst |
| 5,579,149 A | 11/1996 | Moret et al. |
| 6,039,390 A | 3/2000 | Agrawal et al. |
| 6,055,089 A | 4/2000 | Schulz et al. |
| 6,066,801 A | 5/2000 | Kodaira et al. |
| 6,262,831 B1 | 7/2001 | Bauer et al. |
| 6,344,748 B1 | 2/2002 | Gannon |
| 6,407,847 B1 | 6/2002 | Poll et al. |
| 6,567,708 B1 | 5/2003 | Bechtel et al. |
| 6,707,590 B1 | 3/2004 | Bartsch |
| 6,897,936 B1 | 5/2005 | Li et al. |
| 6,965,813 B2 | 11/2005 | Granqvist et al. |
| 7,133,181 B2 | 11/2006 | Greer |
| 7,391,420 B1 | 6/2008 | Coyne |
| 7,536,370 B2 | 5/2009 | Masurkar |
| 7,684,105 B2 | 3/2010 | Lamontagne et al. |
| 7,739,138 B2 | 6/2010 | Chauhan et al. |
| 7,800,812 B2 | 9/2010 | Moskowitz |
| 7,941,245 B1 | 5/2011 | Popat |
| 8,149,756 B2 | 4/2012 | Hottinen |
| 8,213,074 B1 | 7/2012 | Shrivastava et al. |
| 8,254,013 B2 | 8/2012 | Mehtani et al. |
| 8,705,162 B2 | 4/2014 | Brown et al. |
| 8,843,238 B2 | 9/2014 | Wenzel et al. |
| 8,976,440 B2 | 3/2015 | Berland et al. |
| 9,081,246 B2 | 7/2015 | Rozbicki |
| 9,128,346 B2 | 9/2015 | Shrivastava et al. |
| 9,170,008 B2 | 10/2015 | Reul et al. |
| 9,225,286 B1 | 12/2015 | Tweedie |
| 9,300,581 B1 | 3/2016 | Hui et al. |
| 9,348,192 B2 | 5/2016 | Brown et al. |
| 9,442,338 B2 | 9/2016 | Uhm et al. |
| 9,442,341 B2 | 9/2016 | Shrivastava et al. |
| 9,454,055 B2 | 9/2016 | Brown et al. |
| 9,470,947 B2 | 10/2016 | Nagel et al. |
| 9,494,055 B2 | 11/2016 | Rusche |
| 9,551,913 B2 | 1/2017 | Kim et al. |
| 9,677,327 B1 | 6/2017 | Nagel et al. |
| 9,690,174 B2 | 6/2017 | Wang |
| 9,709,869 B2 | 7/2017 | Baumann et al. |
| 9,740,074 B2 | 8/2017 | Agrawal et al. |
| 9,778,533 B2 | 10/2017 | Bertolini |
| 9,898,912 B1 | 2/2018 | Jordan, II et al. |
| 9,946,138 B2 | 4/2018 | Shrivastava et al. |
| 10,001,691 B2 | 6/2018 | Shrivastava et al. |
| 10,137,764 B2 | 11/2018 | Driscoll et al. |
| 10,268,098 B2 | 4/2019 | Shrivastava et al. |
| 10,286,839 B1 | 5/2019 | Mazuir et al. |
| 10,288,971 B2 | 5/2019 | Phillips et al. |
| 10,303,035 B2 | 5/2019 | Brown et al. |
| 10,329,839 B2 | 6/2019 | Fasi et al. |
| 10,387,221 B2 | 8/2019 | Shrivastava et al. |
| 10,409,652 B2 | 9/2019 | Shrivastava et al. |
| 10,481,459 B2 | 11/2019 | Shrivastava et al. |
| 10,488,837 B2 | 11/2019 | Cirino |
| 10,514,963 B2 | 12/2019 | Shrivastava et al. |
| 10,720,766 B2 | 7/2020 | Krammer et al. |
| 10,746,761 B2 | 8/2020 | Rayman et al. |
| 10,747,082 B2 | 8/2020 | Shrivastava et al. |
| 10,768,582 B2 | 9/2020 | Shrivastava et al. |
| 10,859,983 B2 | 12/2020 | Shrivastava et al. |
| 10,917,259 B1 | 2/2021 | Chein et al. |
| 10,921,675 B2 | 2/2021 | Barnum et al. |
| 10,949,267 B2 | 3/2021 | Shrivastava et al. |
| 10,954,677 B1 | 3/2021 | Scanlin |
| 10,956,231 B2 | 3/2021 | Shrivastava et al. |
| 10,989,977 B2 | 4/2021 | Shrivastava et al. |
| 11,016,357 B2 | 5/2021 | Brown et al. |
| 11,054,792 B2 | 7/2021 | Shrivastava et al. |
| 11,073,800 B2 | 7/2021 | Shrivastava et al. |
| 11,150,616 B2 | 10/2021 | Shrivastava et al. |
| 11,168,910 B2 | 11/2021 | Alcala Perez |
| 11,294,254 B2 | 4/2022 | Patterson et al. |
| 11,384,596 B2 | 7/2022 | Shrivastava et al. |
| 11,436,061 B2 | 9/2022 | Shrivastava et al. |
| 11,579,571 B2 | 2/2023 | Shrivastava et al. |
| 2002/0027504 A1 | 3/2002 | Davis et al. |
| 2002/0149829 A1 | 10/2002 | Mochizuka et al. |
| 2003/0101154 A1 | 5/2003 | Hisano et al. |
| 2003/0169574 A1 | 9/2003 | Maruyama et al. |
| 2003/0191546 A1 | 10/2003 | Bechtel et al. |
| 2003/0227663 A1 | 12/2003 | Agrawal et al. |
| 2004/0001056 A1 | 1/2004 | Atherton et al. |
| 2004/0215520 A1 | 10/2004 | Butler et al. |
| 2005/0270620 A1 | 12/2005 | Bauer et al. |
| 2005/0270621 A1 | 12/2005 | Bauer et al. |
| 2006/0018000 A1 | 1/2006 | Greer |
| 2006/0107616 A1 | 5/2006 | Ratti et al. |
| 2006/0174333 A1 | 8/2006 | Thomas et al. |
| 2006/0279527 A1 | 12/2006 | Zehner et al. |
| 2007/0053053 A1 | 3/2007 | Moskowitz |
| 2007/0067048 A1 | 3/2007 | Bechtel et al. |
| 2007/0285759 A1 | 12/2007 | Ash et al. |
| 2008/0042012 A1 | 2/2008 | Callahan et al. |
| 2008/0043316 A2 | 2/2008 | Moskowitz |
| 2008/0048101 A1 | 2/2008 | Romig et al. |
| 2008/0147847 A1 | 6/2008 | Pitkow et al. |
| 2008/0172312 A1 | 7/2008 | Synesiou et al. |
| 2008/0184350 A1 | 7/2008 | Chu |
| 2008/0186562 A2 | 8/2008 | Moskowitz |
| 2008/0211682 A1 | 9/2008 | Hyland et al. |
| 2008/0238706 A1 | 10/2008 | Kenwright |
| 2009/0015740 A1 | 1/2009 | Sagitov et al. |
| 2009/0271042 A1 | 10/2009 | Voysey |
| 2009/0323160 A1 | 12/2009 | Egerton et al. |
| 2010/0039410 A1 | 2/2010 | Becker et al. |
| 2010/0172010 A1* | 7/2010 | Gustavsson ............ G02F 1/163 359/265 |
| 2010/0188057 A1 | 7/2010 | Tarng |
| 2010/0228854 A1 | 9/2010 | Morrison et al. |
| 2010/0243427 A1 | 9/2010 | Kozlowski et al. |
| 2010/0245973 A1 | 9/2010 | Wang et al. |
| 2010/0274366 A1 | 10/2010 | Fata et al. |
| 2010/0286937 A1 | 11/2010 | Hedley et al. |
| 2010/0315693 A1 | 12/2010 | Lam et al. |
| 2011/0050756 A1 | 3/2011 | Cassidy et al. |
| 2011/0071685 A1 | 3/2011 | Huneycutt et al. |
| 2011/0097081 A1 | 4/2011 | Gupta et al. |
| 2011/0124313 A1 | 5/2011 | Jones |
| 2011/0148218 A1 | 6/2011 | Rozbicki |
| 2011/0164317 A1 | 7/2011 | Vergohl et al. |
| 2011/0261429 A1 | 10/2011 | Sbar et al. |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0086363 A1 | 4/2012 | Golding et al. |
| 2012/0140492 A1 | 6/2012 | Alvarez |
| 2012/0188627 A1 | 7/2012 | Chen et al. |
| 2012/0190386 A1 | 7/2012 | Anderson |
| 2012/0194895 A1 | 8/2012 | Podbelski et al. |
| 2012/0229275 A1 | 9/2012 | Mattern |
| 2012/0235493 A1 | 9/2012 | Kiuchi et al. |

(56) References Cited

U.S. PATENT DOCUMENTS

| | | | |
|---|---|---|---|
| 2012/0239209 A1* | 9/2012 | Brown | E06B 9/24 |
| | | | 359/275 |
| 2012/0259583 A1 | 10/2012 | Noboa et al. | |
| 2012/0293855 A1* | 11/2012 | Shrivastava | E06B 3/6722 |
| | | | 359/275 |
| 2013/0013921 A1 | 1/2013 | Bhathena et al. | |
| 2013/0024029 A1 | 1/2013 | Tran et al. | |
| 2013/0054033 A1 | 2/2013 | Casilli | |
| 2013/0060357 A1 | 3/2013 | Li et al. | |
| 2013/0073681 A1 | 3/2013 | Jiang et al. | |
| 2013/0085614 A1 | 4/2013 | Wenzel et al. | |
| 2013/0085615 A1 | 4/2013 | Barker | |
| 2013/0085616 A1 | 4/2013 | Wenzel | |
| 2013/0088331 A1 | 4/2013 | Cho et al. | |
| 2013/0131869 A1 | 5/2013 | Majewski et al. | |
| 2013/0157493 A1 | 6/2013 | Brown | |
| 2013/0158790 A1 | 6/2013 | McIntyre, Jr. et al. | |
| 2013/0182308 A1 | 7/2013 | Guarr et al. | |
| 2013/0196600 A1 | 8/2013 | Capers et al. | |
| 2013/0241299 A1 | 9/2013 | Snyker et al. | |
| 2013/0243425 A1 | 9/2013 | Franklin | |
| 2013/0271812 A1 | 10/2013 | Brown et al. | |
| 2013/0271813 A1 | 10/2013 | Brown | |
| 2013/0271814 A1 | 10/2013 | Brown | |
| 2013/0278989 A1 | 10/2013 | Lam et al. | |
| 2014/0101573 A1 | 4/2014 | Kuo | |
| 2014/0156097 A1 | 6/2014 | Nesler et al. | |
| 2014/0160550 A1 | 6/2014 | Brown et al. | |
| 2014/0170863 A1 | 6/2014 | Brown | |
| 2014/0172557 A1 | 6/2014 | Eden et al. | |
| 2014/0182350 A1* | 7/2014 | Bhavaraju | G01N 33/48792 |
| | | | 73/1.02 |
| 2014/0236323 A1 | 8/2014 | Brown et al. | |
| 2014/0249876 A1 | 9/2014 | Wu et al. | |
| 2014/0274458 A1 | 9/2014 | Kronenberg et al. | |
| 2014/0300945 A1 | 10/2014 | Parker | |
| 2014/0303788 A1 | 10/2014 | Sanders et al. | |
| 2014/0330538 A1 | 11/2014 | Conklin et al. | |
| 2014/0347190 A1 | 11/2014 | Grimm | |
| 2014/0349497 A1 | 11/2014 | Brown et al. | |
| 2014/0367057 A1 | 12/2014 | Feldstein | |
| 2014/0368899 A1 | 12/2014 | Greer | |
| 2014/0371931 A1 | 12/2014 | Lin et al. | |
| 2015/0002919 A1 | 1/2015 | Jack et al. | |
| 2015/0003822 A1 | 1/2015 | Fukada et al. | |
| 2015/0023661 A1 | 1/2015 | Borkenhagen et al. | |
| 2015/0098121 A1 | 4/2015 | Turnbull et al. | |
| 2015/0116811 A1 | 4/2015 | Shrivastava et al. | |
| 2015/0120297 A1 | 4/2015 | Meruva | |
| 2015/0129140 A1* | 5/2015 | Dean | E06B 9/24 |
| | | | 160/5 |
| 2015/0137792 A1* | 5/2015 | Filippi | G01D 4/00 |
| | | | 324/76.11 |
| 2015/0160525 A1 | 6/2015 | Shi | |
| 2015/0378230 A1 | 12/2015 | Gudmunson et al. | |
| 2015/0378231 A1 | 12/2015 | Greer et al. | |
| 2016/0070151 A1 | 3/2016 | Shrivastava et al. | |
| 2016/0109778 A1 | 4/2016 | Shrivastava et al. | |
| 2016/0134932 A1 | 5/2016 | Karp et al. | |
| 2016/0147100 A1 | 5/2016 | Van Oosten et al. | |
| 2016/0154290 A1 | 6/2016 | Brown et al. | |
| 2016/0202589 A1 | 7/2016 | Nagel et al. | |
| 2016/0203403 A1 | 7/2016 | Nagel et al. | |
| 2016/0225832 A1 | 8/2016 | Kwon et al. | |
| 2016/0261837 A1 | 9/2016 | Thompson et al. | |
| 2017/0063429 A1 | 3/2017 | Flask | |
| 2017/0070457 A1 | 3/2017 | Sachs | |
| 2017/0075183 A1 | 3/2017 | Brown | |
| 2017/0075323 A1 | 3/2017 | Shrivastava et al. | |
| 2017/0077988 A1 | 3/2017 | Flask | |
| 2017/0080341 A1 | 3/2017 | Mao et al. | |
| 2017/0082903 A1 | 3/2017 | Vigano et al. | |
| 2017/0085834 A1 | 3/2017 | Kim et al. | |
| 2017/0097259 A1 | 4/2017 | Brown et al. | |
| 2017/0139301 A1 | 5/2017 | Messere et al. | |
| 2017/0197494 A1 | 7/2017 | Li | |
| 2017/0200424 A1 | 7/2017 | Xu et al. | |
| 2017/0212400 A1 | 7/2017 | Shrivastava et al. | |
| 2017/0234067 A1 | 8/2017 | Fasi et al. | |
| 2017/0243122 A1 | 8/2017 | Komatsu et al. | |
| 2017/0251488 A1 | 8/2017 | Urban et al. | |
| 2017/0253801 A1 | 9/2017 | Bae et al. | |
| 2017/0264865 A1 | 9/2017 | Huangfu | |
| 2017/0272317 A1 | 9/2017 | Singla et al. | |
| 2017/0279930 A1 | 9/2017 | Zhang | |
| 2017/0285432 A1 | 10/2017 | Shrivastava et al. | |
| 2017/0285433 A1 | 10/2017 | Shrivastava et al. | |
| 2017/0347129 A1 | 11/2017 | Levi et al. | |
| 2017/0364046 A1 | 12/2017 | Westrick, Jr. et al. | |
| 2017/0364395 A1 | 12/2017 | Shrivastava et al. | |
| 2018/0090992 A1 | 3/2018 | Shrivastava et al. | |
| 2018/0129172 A1 | 5/2018 | Shrivastava et al. | |
| 2018/0144712 A1 | 5/2018 | Threlkel et al. | |
| 2018/0189117 A1 | 7/2018 | Shrivastava et al. | |
| 2018/0267380 A1 | 9/2018 | Shrivastava et al. | |
| 2018/0284555 A1 | 10/2018 | Klawuhn et al. | |
| 2018/0321042 A1 | 11/2018 | Brewer et al. | |
| 2018/0335939 A1 | 11/2018 | Karunamuni et al. | |
| 2019/0155122 A1 | 5/2019 | Brown et al. | |
| 2019/0235451 A1 | 8/2019 | Shrivastava et al. | |
| 2019/0271895 A1 | 9/2019 | Shrivastava et al. | |
| 2019/0331978 A1 | 10/2019 | Shrivastava et al. | |
| 2019/0347141 A1 | 11/2019 | Shrivastava et al. | |
| 2019/0353972 A1 | 11/2019 | Shrivastava et al. | |
| 2019/0361411 A1 | 11/2019 | Park et al. | |
| 2019/0384652 A1 | 12/2019 | Shrivastava et al. | |
| 2020/0041963 A1 | 2/2020 | Shrivastava et al. | |
| 2020/0041967 A1 | 2/2020 | Shrivastava et al. | |
| 2020/0045261 A1 | 2/2020 | Lim et al. | |
| 2020/0057421 A1 | 2/2020 | Trikha et al. | |
| 2020/0067865 A1 | 2/2020 | Jimenez et al. | |
| 2020/0103841 A1 | 4/2020 | Pillai et al. | |
| 2020/0150508 A1 | 5/2020 | Patterson et al. | |
| 2020/0162856 A1 | 5/2020 | Ziv et al. | |
| 2020/0241379 A1 | 7/2020 | Barnum et al. | |
| 2020/0257179 A1 | 8/2020 | Barnum et al. | |
| 2020/0387041 A1 | 12/2020 | Shrivastava et al. | |
| 2021/0021788 A1 | 1/2021 | McNelley et al. | |
| 2021/0165696 A1 | 6/2021 | Shrivastava et al. | |
| 2021/0191221 A1 | 6/2021 | Shrivastava et al. | |
| 2021/0210053 A1 | 7/2021 | Ng et al. | |
| 2021/0232015 A1 | 7/2021 | Brown et al. | |
| 2021/0246719 A1 | 8/2021 | Shrivastava et al. | |
| 2021/0302799 A1 | 9/2021 | Khanna | |
| 2021/0373511 A1 | 12/2021 | Shrivastava et al. | |
| 2021/0383804 A1 | 12/2021 | Makker et al. | |
| 2021/0390953 A1 | 12/2021 | Makker et al. | |
| 2022/0121078 A1 | 4/2022 | Vollen et al. | |
| 2022/0159077 A1 | 5/2022 | Shrivastava et al. | |
| 2022/0171248 A1 | 6/2022 | Shrivastava et al. | |
| 2022/0179275 A1 | 6/2022 | Patterson et al. | |
| 2022/0231399 A1 | 7/2022 | Brown et al. | |
| 2022/0298850 A1 | 9/2022 | Shrivastava et al. | |
| 2022/0316269 A1 | 10/2022 | Shrivastava et al. | |
| 2022/0365494 A1 | 11/2022 | Shrivastava et al. | |
| 2022/0365830 A1 | 11/2022 | Shrivastava et al. | |
| 2023/0041490 A1 | 2/2023 | Vangati et al. | |
| 2023/0074720 A1 | 3/2023 | Brown et al. | |
| 2023/0111311 A1 | 4/2023 | Shrivastava et al. | |
| 2023/0120049 A1 | 4/2023 | Vangati et al. | |

FOREIGN PATENT DOCUMENTS

| | | |
|---|---|---|
| CN | 1311935 A | 9/2001 |
| CN | 1692348 A | 11/2005 |
| CN | 1723658 A | 1/2006 |
| CN | 101154104 A | 4/2008 |
| CN | 101253460 A | 8/2008 |
| CN | 101501757 A | 8/2009 |
| CN | 101510078 A | 8/2009 |
| CN | 101856193 A | 10/2010 |
| CN | 102414601 A | 4/2012 |
| CN | 102598469 A | 7/2012 |

(56) References Cited

FOREIGN PATENT DOCUMENTS

| | | |
|---|---|---|
| CN | 202443309 U | 9/2012 |
| CN | 103051737 A | 4/2013 |
| CN | 103168269 A | 6/2013 |
| CN | 203019761 U | 6/2013 |
| CN | 103238107 A | 8/2013 |
| CN | 103282841 A | 9/2013 |
| CN | 103327126 A | 9/2013 |
| CN | 103345236 A | 10/2013 |
| CN | 103547965 A | 1/2014 |
| CN | 103649826 A | 3/2014 |
| CN | 103842735 A | 6/2014 |
| CN | 103987909 A | 8/2014 |
| CN | 104114804 A | 10/2014 |
| CN | 104321497 A | 1/2015 |
| CN | 104335595 A | 2/2015 |
| CN | 105143586 A | 12/2015 |
| CN | 105974160 A | 9/2016 |
| CN | 106125444 A | 11/2016 |
| CN | 106164973 A | 11/2016 |
| CN | 106462023 A | 2/2017 |
| CN | 106575064 A | 4/2017 |
| CN | 107850815 A | 3/2018 |
| CN | 108139644 A | 6/2018 |
| EP | 0917667 A1 | 5/1999 |
| EP | 1929701 A2 | 6/2008 |
| EP | 2090961 A1 | 8/2009 |
| EP | 2357544 A2 | 8/2011 |
| EP | 2648086 A2 | 10/2013 |
| EP | 2764998 A1 | 8/2014 |
| EP | 2357544 B1 | 10/2014 |
| EP | 3015915 A1 | 5/2016 |
| EP | 2837205 B1 | 2/2017 |
| EP | 3293941 A1 | 3/2018 |
| EP | 3352053 A1 | 7/2018 |
| EP | 3230943 B1 | 7/2021 |
| JP | H10215492 A | 8/1998 |
| JP | H10246078 A | 9/1998 |
| JP | H11500838 A | 1/1999 |
| JP | 2003284160 A | 10/2003 |
| JP | 2004332350 A | 11/2004 |
| JP | 2006287729 A | 10/2006 |
| JP | 2007156909 A | 6/2007 |
| JP | 4139109 B2 | 8/2008 |
| JP | 2010152646 A | 7/2010 |
| JP | 2012017614 A | 1/2012 |
| JP | 2012533060 A | 12/2012 |
| JP | 3184348 U | 6/2013 |
| JP | 2018050290 A | 3/2018 |
| JP | 2018507337 A | 3/2018 |
| JP | 2019186771 A | 10/2019 |
| KR | 19990088613 A | 12/1999 |
| KR | 20030040361 A | 5/2003 |
| KR | 20030073121 A | 9/2003 |
| KR | 20070089370 A | 8/2007 |
| KR | 20090066107 A | 6/2009 |
| KR | 20120045915 A | 5/2012 |
| KR | 20120092921 A | 8/2012 |
| KR | 20120117409 A | 10/2012 |
| KR | 20130023668 A | 3/2013 |
| KR | 20130026740 A | 3/2013 |
| KR | 20130112693 A | 10/2013 |
| KR | 101323668 B1 | 11/2013 |
| KR | 101346862 B1 | 1/2014 |
| KR | 20140004175 A | 1/2014 |
| KR | 101799323 B1 | 12/2017 |
| KR | 20210032133 A | 3/2021 |
| KR | 20210039721 A | 4/2021 |
| RU | 104808 U1 | 5/2011 |
| RU | 2012107324 A | 9/2013 |
| TW | 200532346 A | 10/2005 |
| TW | 201029838 A | 8/2010 |
| TW | 201635840 A | 10/2016 |
| TW | I607269 B | 12/2017 |
| WO | WO-0124700 A1 | 4/2001 |
| WO | WO-03092309 A1 | 11/2003 |
| WO | WO-2012079159 A1 | 6/2012 |
| WO | WO-2012125332 A2 | 9/2012 |
| WO | WO-2012125348 A2 | 9/2012 |
| WO | WO-2013046112 A1 | 4/2013 |
| WO | WO-2013155467 A1 | 10/2013 |
| WO | WO-2013158464 A1 | 10/2013 |
| WO | WO-2013177575 A1 | 11/2013 |
| WO | WO-2014059268 A2 | 4/2014 |
| WO | WO-2014082092 A1 | 5/2014 |
| WO | WO-2014121809 A1 | 8/2014 |
| WO | WO-2014124701 A1 | 8/2014 |
| WO | WO-2014130471 A1 | 8/2014 |
| WO | WO-2015051262 A1 | 4/2015 |
| WO | WO-2015113592 A1 | 8/2015 |
| WO | WO-2015134789 A1 | 9/2015 |
| WO | WO-2016004109 A1 | 1/2016 |
| WO | WO-2016085964 A1 | 6/2016 |
| WO | WO-2016094445 A1 | 6/2016 |
| WO | WO-2016183059 A1 | 11/2016 |
| WO | WO-2017007841 A1 | 1/2017 |
| WO | WO-2017007942 A1 | 1/2017 |
| WO | WO-2017075059 A1 | 5/2017 |
| WO | WO-2017189618 A1 | 11/2017 |
| WO | WO-2018067377 A1 | 4/2018 |
| WO | WO-2018200702 A1 | 11/2018 |
| WO | WO-2018200740 A2 | 11/2018 |
| WO | WO-2018200752 A1 | 11/2018 |
| WO | WO-2019157602 A1 | 8/2019 |
| WO | WO-2019203931 A1 | 10/2019 |
| WO | WO-2020172187 A1 | 8/2020 |
| WO | WO-2020185941 A1 | 9/2020 |
| WO | WO-2021211798 A1 | 10/2021 |

OTHER PUBLICATIONS

"SageGlass Mobile App" screenshot, accessed Aug. 28, 2015, 1 page.
"SageGlass Unplugged" screenshot, accessed Aug. 28, 2015, 1 page.
"SageGlass Unplugged™—wireless dynamic glass", 2014, 2 pages.
APC by Schneider Electric, Smart-UPS 120V Product Brochure, 2013, 8 pp.
AU Office action dated Oct. 22, 2021, in AU Application No. AU2020226999.
Australian Examination Report dated Dec. 24, 2019 in AU Application No. 2015227056.
Australian Examination Report dated Mar. 2, 2020 in AU Application No. 2015353569.
Australian Office Action dated Aug. 10, 2020 in AU Application No. 2015360714.
Australian Office Action dated Aug. 9, 2021 in AU Application No. 2015360714.
Australian Office Action dated Dec. 4, 2020 in AU Application No. 2015360714.
Australian Office Action dated Jun. 4, 2021 in AU Application No. 2015360714.
Cecilio, J., et al., "A configurable middleware for processing heterogenous industrial intelligent sensors," IEEE 16th International Conference on Intelligent Engineering Systems (INES), Jun. 15, 2012, pp. 145-149.
CN Notice of Allowance with Supplemental Search Report (w/translation) dated Mar. 1, 2021 in CN Application No. 201580040461.4.
CN Office Action dated Aug. 16, 2019 in CN Application No. 201580015979.2.
CN Office Action dated Aug. 28, 2018 in CN Application No. 201580070776.3.
CN Office Action dated Feb. 2, 2019 in CN Application No. 201580015979.2.
CN Office Action dated Feb. 3, 2020 in CN Application No. 201580072749.X.
CN Office Action dated Jan. 15, 2020 in CN Application No. 201580015979.2.
CN Office Action dated Jun. 29, 2021 in CN Application No. 202010466929.9.

(56) References Cited

OTHER PUBLICATIONS

CN Office Action dated Jun. 3, 2020 in CN Application No. 201580015979.2.
CN Office Action dated Jun. 3, 2021 in CN Application No. 201580072749.X.
CN Office Action dated Mar. 19, 2019 in CN Application No. 201580070776.3.
CN Office Action dated Mar. 8, 2021 in CN Application No. 201580072749.X.
CN Office Action dated Mar. 9, 2020 in CN Application No. 201580040461.4.
CN Office Action dated Nov. 12, 2021, in Application No. CN20158072749.
CN Office Action dated Oct. 21, 2020 in CN Application No. 201580040461.4.
CN Office Action dated Oct. 9, 2019 in CN Application No. 201580070776.3.
CN Office Action dated Sep. 30, 2020 in CN Application No. 201580072749.X.
Duchon, Claude E. et al., "Estimating Cloud Type from Pyranometer Observations," Journal of Applied Meteorology, vol. 38, Jan. 1999, pp. 132-141.
EP Examination Report dated Mar. 4, 2019 in EP Application No. 15814233.1.
EP Extended European Search Report dated Sep. 14, 2021, in the application EP21182449.7.
EP Extended Search Report dated Dec. 17, 2019 in EP Application No. 19202054.
EP Extended Search Report dated Feb. 15, 2018 in EP Application No. 15814233.1.
EP Extended Search Report dated Jun. 19, 2017 in EP Application No. 15758538.1.
EP Extended Search Report dated Jun. 5, 2018 in EP Application No. 15868003.3.
EP Extended Search Report dated Nov. 11, 2020 in EP Application No. 18791117.7.
EP Extended Search Report dated Nov. 28, 2019 in EP Application No. 19188907.0.
EP Extended Search Report dated Nov. 8, 2018 in EP Application No. 15863112.7.
EP Extended Search Report dated Oct. 1, 2020 in EP Application No. 17858928.9.
EP Office Action dated Aug. 21, 2018 in EP Application No. 15758538.1.
EP office action dated Aug. 25, 2021, in EP Application No. EP19202054.3.
EP Office Action dated Jan. 29, 2021 in EP Application No. 15868003.3.
EP Office Action dated May 14, 2020 in EP Application No. 15868003.3.
EP Office Action dated Nov. 19, 2020 in EP Application No. 15758538.1.
European Office Action dated Feb. 25, 2021 in EP Application No. 15863112.7.
IN Office Action dated Aug. 2, 2021 in IN Application No. 201637028587.
IN Office Action dated Nov. 24, 2020 in IN Application No. 201737020192.
Indian Office Action dated Feb. 24, 2021 in IN Application No. 201737021981.
International Preliminary Report on Patentability dated Apr. 18, 2019 in PCT Application No. PCT/US17/54120.
International Preliminary Report on Patentability dated Jan. 12, 2017 in PCT Application No. PCT/US15/38667.
International Preliminary Report on Patentability dated Jun. 22, 2017 in PCT Application No. PCT/US15/64555.
International Preliminary Report on Patentability dated June 8, 2017 in PCT/US2015/062480.
International Preliminary Report on Patentability dated Nov. 12, 2020 in PCT Application No. PCT/US2019/030467.
International Preliminary Report on Patentability dated Nov. 7, 2019 in PCT Application No. PCT/US2018/029406.
International Preliminary Report on Patentability dated Nov. 7, 2019 in PCT Application No. PCT/US2018/029460.
International Preliminary Report on Patentability dated Oct. 29, 2020 in PCT/US2019/019455.
International Preliminary Report on Patentability dated Sep. 15, 2016 in Application No. PCT/US2015/019031.
International Search Report and Written Opinion dated Apr. 28, 2020 in PCT Application No. PCT/US2020/018677.
International Search Report and Written Opinion dated Feb. 15, 2016 in PCT/US2015/062480.
International Search Report and Written Opinion dated Jul. 11, 2019 in PCT Application No. PCT/US2019/030467.
International Search Report and Written Opinion dated Mar. 29, 2016 in PCT Application No. PCT/US15/64555.
International Search Report and Written Opinion dated May 29, 2015 in Application No. PCT/US2015/019031.
International Search Report and Written Opinion dated Nov. 16, 2018 in PCT Application No. PCT/US2018/029460.
International Search Report and Written Opinion dated Oct. 15, 2018 in PCT Application No. PCT/US2018/029406.
International Search Report and Written Opinion dated Oct. 16, 2015 in PCT Application No. PCT/US15/38667.
International Search Report and Written Opinion (ISA/KR) dated Jan. 9, 2018 in PCT Application No. PCT/US17/54120.
International Search Report and Written Opinion (ISA/KR) dated Jun. 14, 2019 in PCT/US2019/019455.
JP Examination Report dated Nov. 26, 2020 in JP Application No. 2017-549175.
JP Office Action dated Jul. 20, 2021 in JP Application No. 2017-549175.
JP Office Action dated Jun. 16, 2020 in JP Application No. 2017-549175.
JP Office Action dated Nov. 19, 2019 in JP Application No. 2017-549175.
JP office action dated Sep. 7, 2021, in JP Application No. 2020-175033.
Kipp & Zonen, "Solar Radiation" (known as of Sep. 3, 2014) [http://www.kippzonen.com/Knowledge-Center/Theoretical-info/Solar-Radiation].
KR Office Action dated Jan. 22, 2021 in KR Application No. 10-2016-7025862.
KR Office Action dated Jul. 31, 2021 in KR Application No. 10-2016-7025862.
KR Office Action dated Oct. 26, 2021, in KR Application No. KR102021/028044 with English translation.
National Aeronautics & Space Administration, "Cloud Remote Sensing and Modeling," (known as of Sep. 3, 2014), published date of Sep. 15, 2014, [http://atmospheres.gsfc.nasa.gov/climate/index.php?section=134].
"Ossia Wireless Charging", screenshot and picture of Cota device, accessed Apr. 20, 2015, 1 page.
Preliminary Amendment dated Jan. 18, 2017 in U.S. Appl. No. 15/123,069.
RU Office Action dated Sep. 24, 2018 in RU Application No. 2016139012.
Russian Office Action dated Jul. 10, 2019 in RU Application No. 2017123902.
Sim, S., "Next generation data interchange: tool-to-tool application programming interfaces," IEEE Working Conference on Reverse Engineering, Nov. 25, 2000, pp. 278-280.
Taiwanese Office Action dated Dec. 12, 2018 in TW Application No. 107129150.
Taiwanese Office Action dated Feb. 27, 2020 in TW Application No. 108126548.
Taiwanese Office Action dated May 13, 2019 in TW Application No. 104139217.
TW Notice of Allowance & Search Report (translated) dated Jul. 30, 2021 in TW Application No. 106133985.
U.S. Corrected Notice of Allowability dated Jun. 4, 2020 in U.S. Appl. No. 16/298,776.

(56) References Cited

OTHER PUBLICATIONS

U.S. Corrected Notice of Allowability dated May 3, 2021 in U.S. Appl. No. 16/253,971.
U.S. Corrected Notice of Allowability dated Sep. 23, 2021, in U.S. Appl. No. 16/338,403.
U.S. Final Office Action dated Dec. 23, 2020 in U.S. Appl. No. 16/338,403.
U.S. Final Office Action dated Feb. 26, 2015 in U.S. Appl. No. 13/479,137.
U.S. Final Office Action dated Jan. 27, 2014 in U.S. Appl. No. 13/479,137.
U.S. Final Office Action dated Jan. 31, 2019 in U.S. Appl. No. 15/534,175.
U.S. Final Office Action dated Jul. 2, 2019 in U.S. Appl. No. 15/691,468.
U.S. Final Office Action dated Jul. 3, 2019 in U.S. Appl. No. 15/623,237.
U.S. Final Office Action dated Mar. 15, 2018 in U.S. Appl. No. 14/951,410.
U.S. Final Office Action dated Mar. 17, 2017 in U.S. Appl. No. 14/887,178.
U.S. Final Office Action dated Mar. 18, 2020 in U.S. Appl. No. 16/253,971.
U.S. Final Office Action dated Mar. 3, 2020 in U.S. Appl. No. 16/508,099.
U.S. Final Office Action dated Sep. 19, 2016 in U.S. Appl. No. 14/887,178.
U.S. Non-Final Office Action dated Oct. 28, 2021 in U.S. Appl. No. 15/733,765.
U.S. Non-Final Office Action dated Oct. 29, 2021 in U.S. Appl. No. 16/527,554.
U.S. Notice of Allowability (supplemental) dated Sep. 30, 2020 in U.S. Appl. No. 15/123,069.
U.S. Notice of Allowance (corrected) dated Apr. 18, 2019 in U.S. Appl. No. 15/320,725.
U.S. Notice of Allowance dated Apr. 17, 2019 in U.S. Appl. No. 15/534,175.
U.S. Notice of Allowance dated Apr. 17, 2019 in U.S. Appl. No. 15/910,936.
U.S. Notice of Allowance dated Apr. 6, 2020 in U.S. Appl. No. 16/298,776.
U.S. Notice of Allowance dated Apr. 9, 2020 in U.S. Appl. No. 15/123,069.
U.S. Notice of Allowance dated Dec. 13, 2018 in U.S. Appl. No. 15/978,029.
U.S. Notice of Allowance dated Dec. 14, 2018 in U.S. Appl. No. 15/910,936.
U.S. Notice of Allowance dated Dec. 31, 2020 in U.S. Appl. No. 16/523,624.
U.S. Notice of Allowance dated Dec. 31, 2020 in U.S. Appl. No. 16/555,377.
U.S. Notice of Allowance dated Dec. 7, 2020 in U.S. Appl. No. 16/508,099.
U.S. Notice of Allowance dated Feb. 4, 2021 in U.S. Appl. No. 16/253,971.
U.S. Notice of Allowance dated Jul. 1, 2020 in U.S. Appl. No. 15/623,237.
U.S. Notice of Allowance dated Jul. 17, 2019 in U.S. Appl. No. 15/123,069.
U.S. Notice of Allowance dated Jul. 17, 2019 in U.S. Appl. No. 15/320,725.
U.S. Notice of Allowance dated Jul. 25, 2019 in U.S. Appl. No. 15/534,175.
U.S. Notice of Allowance dated Jun. 14, 2021 in U.S. Appl. No. 16/338,403.
U.S. Notice of Allowance dated Mar. 10, 2021 in U.S. Appl. No. 15/691,468.
U.S. Notice of Allowance dated Mar. 20, 2019 in U.S. Appl. No. 15/320,725.
U.S. Notice of Allowance dated Mar. 26, 2021 in U.S. Appl. No. 16/254,434.
U.S. Notice of Allowance dated Mar. 9, 2018 in U.S. Appl. No. 14/887,178.
U.S. Notice of Allowance dated May 14, 2015 in U.S. Appl. No. 13/479,137.
U.S. Notice of Allowance dated May 14, 2019 in U.S. Appl. No. 15/623,235.
U.S. Notice of Allowance dated May 6, 2020 in U.S. Appl. No. 15/623,237.
U.S. Notice of Allowance dated Nov. 28, 2018 in U.S. Appl. No. 15/123,069.
U.S. Notice of Allowance dated Nov. 3, 2020 in U.S. Appl. No. 15/691,468.
U.S. Notice of Allowance dated Oct. 7, 2021 in U.S. Appl. No. 16/664,089.
U.S. Notice of Allowance dated Oct. 14, 2021 in U.S. Appl. No. 16/664,089.
U.S. Notice of Allowance dated Oct. 22, 2018 in Application No. 14/9 51,410.
U.S. Notice of Allowance (supplemental) dated Jun. 12, 2015 in U.S. Appl. No. 13/479,137.
U.S. Office Action dated Apr. 27, 2018 in U.S. Appl. No. 15/123,069.
U.S. Office Action dated Aug. 21, 2019 in U.S. Appl. No. 16/508,099.
U.S. Office Action dated Aug. 22, 2019 in U.S. Appl. No. 16/298,776.
U.S. Office Action dated Aug. 7, 2018 in U.S. Appl. No. 15/910,936.
U.S. Office Action dated Aug. 7, 2020 in U.S. Appl. No. 16/338,403.
U.S. Office Action dated Feb. 4, 2019 in U.S. Appl. No. 15/623,235.
U.S. Office Action dated Feb. 7, 2019 in U.S. Appl. No. 15/623,237.
U.S. Office Action dated Feb. 7, 2019 in U.S. Appl. No. 15/691,468.
U.S. Office Action dated Jul. 21, 2020 in U.S. Appl. No. 16/523,624.
U.S. Office Action dated Jul. 21, 2020 in U.S. Appl. No. 16/555,377.
U.S. Office Action dated Jul. 23, 2020 in U.S. Appl. No. 16/508,099.
U.S. Office Action dated Jul. 24, 2018 in U.S. Appl. No. 15/978,029.
U.S. Office Action dated Jul. 25, 2019 in U.S. Appl. No. 16/253,971.
U.S. Office Action dated Jul. 29, 2020 in U.S. Appl. No. 16/253,971.
U.S. Office Action dated Jul. 3, 2014 in U.S. Appl. No. 13/479,137.
U.S. Office Action dated Jul. 6, 2018 in U.S. Appl. No. 15/534,175.
U.S. Office Action dated Mar. 25, 2016 in U.S. Appl. No. 14/887,178.
U.S. Office Action dated May 6, 2020 in U.S. Appl. No. 15/691,468.
U.S. Office Action dated Oct. 23, 2017 in U.S. Appl. No. 14/887,178.
U.S. Office Action dated Sep. 11, 2017 in U.S. Appl. No. 14/951,410.
U.S. Office Action dated Sep. 23, 2013 in U.S. Appl. No. 13/479,137.
U.S. Office Action dated Sep. 30, 2020 in U.S. Appl. No. 16/254,434.
U.S. Office Action dated Sep. 4, 2018 in U.S. Appl. No. 15/320,725.
U.S. Appl. No. 15/733,765, inventors Shrivastava et al., filed Oct. 19, 2020.
U.S. Appl. No. 16/338,403, inventors Shrivastava et al., filed Mar. 29, 2019.
U.S. Appl. No. 17/083,128, inventors Patterson et al., filed Oct. 28, 2020
U.S. Appl. No. 63/124,673, inventors Tai et al., filed Dec. 11, 2020.
U.S. Appl. No. 63/146,365, inventors Brown et al., filed Feb. 5, 2021.
U.S. Appl. No. 63/163,305, inventors Trikha et al., filed Mar. 19, 2021.
U.S. Appl. No. 63/181,648, inventors Makker et al., filed Apr. 29, 2021.
U.S. Appl. No. 63/187,632, inventors Hur et al., filed May 12, 2021.
U.S. Appl. No. 63/226,127, inventors Lee et al., filed Jul. 21, 2021.
U.S. Preliminary Amendment dated Dec. 31, 2019 in U.S. Appl. No. 16/608,159.
Alguindigue. I., et al., "Monitoring and Diagnosis of Rolling Element Bearings Using Artificial Neural Networks," IEEE Transactions on Industrial Electronics, 1993, vol. 40 (2), pp. 209-217.
AU Office Action dated Jan. 11, 2022, in Application No. AU2021201145.
AU Office action dated Sep. 30, 2022, in AU Application No. AU2021215134.
AU Office action dated Apr. 4, 2022, in AU Application No. AU2020226999.
AU Office action dated Oct. 12, 2022, in AU Application No. AU2020226999.

(56) References Cited

OTHER PUBLICATIONS

Bucci, G., et al., "Digital Measurement Station for Power Quality Analysis in Distributed Environments," IEEE Transactions on Instrumentation and Measurement, 2003, vol. 52(1), pp. 75-84.
Byun, J. et al., "Development of a Self-adapting Intelligent System for Building Energy Saving and Context-aware Smart Services", IEEE Transactions on Consumer Electronics, Feb. 2011, vol. 57, No. 1, pp. 90-98.
CA Office Action dated Dec. 13, 2021, in Application No. CA2970300.
CA Office Action dated Dec. 23, 2021, in Application No. CA2941526.
CA Office Action dated Sep. 13, 2022, in Application No. CA2970300.
Chen, H. et al. "The Design and Implementation of a Smart Building Control System", 2009 IEEE International Conference on e-Business Engineering, pp. 255-262.
CN Office Action dated Aug. 1, 2022, in Application No. CN201880037591.6 With English translation.
CN Office action dated Aug. 22, 2022 in Application No. CN202011547257.0 With English translation.
CN Office Action dated Dec. 29, 2021, in application No. 202010466929.9 with English translation.
CN Office Action dated May 17, 2022, in Application No. CN201780069604.3 With English Translation.
CN Office Action dated Nov. 1, 2022, in Application No. CN201880037591.6 with English translation.
CN Office Action dated Apr. 18, 2022, in Application No. CN202011547257.0 with English translation.
CN Office Action dated Aug. 19, 2022, in Application No. CN202080022001.X with English translation.
CN Office Action dated Aug. 31, 2022 in Application No. CN201780069604.3 with English translation.
CN Office Action dated Dec. 1, 2021, in application No. CN201780069604.3 with English translation.
CN Office Action dated Jan. 10, 2023, in Application No. CN202080022001.X with English translation.
CN Office Action dated Jan. 12, 2023 in CN Application No. CN202011547257 with English translation.
CN Office Action dated Mar. 2, 2022, in Application No. CN201880037591.6 with English translation.
CN Office Action dated May 20, 2022, in Application No. CN202010466929.9 with English translation.
CN Office Action dated Nov. 12, 2021, in Application No. CN20158072749 with English translation.
CN Office Action dated Sep. 28, 2022 in Application No. CN202010466929.9 with English translation.
EP Office Action dated Jul. 13, 2022 in Application No. EP20170858928.
EP Office Action dated Sep. 12, 2022 in Application No. EP20180791117.7.
EP Extended European search report dated Jan. 3, 2023 in Application No. EP22198532.8.
EP Office Action dated Jan. 17, 2022, in Application No. 17858928.9.
EP Office Action dated Jun. 30, 2022 in Application No. EP20190727174.
EP Office Action dated Feb. 15, 2022, in Application No. EP19188907.0.
EP Search Report dated Dec. 10, 2021, in Application No. EP19787808.5.
Hadziosmanovic, D., et al., "Through the Eye of the Plc: Semantic Security Monitoring for Industrial Processes," Proceedings of the 30th Annual Computer Security Applications Conference, 2014, pp. 126-135.
Hameed, Z. et al., "Condition Monitoring and Fault Detection of Wind Turbines and Related Algorithms: a Review.", Renewable and Sustainable energy reviews, 2009, vol. 13, pp. 1-39.
IN Office Action dated Aug. 5, 2022 In Application No. IN201937050525.
IN Office Action dated Jan. 13, 2022, in Application No. 201937044701.
International Preliminary Report on Patentability dated Mar. 3, 2022, in Application No. PCT/US2020/070427.
International Preliminary Report on Patentability dated Oct. 6, 2022 in PCT Application PCT/US2021/023834.
International Search Report and Written Opinion dated Sep. 1, 2022 in Application No. PCT/US2022/028850.
International Search Report and Written Opinion dated Jul. 6, 2022, in PCT Application No. PCT/US2022/020730.
International Search Report and Written Opinion dated Sep. 1, 2022, in Application No. PCT/US2022/024812.
JP Office Action dated Dec. 7, 2021, in Application No. JP20170549175 with English translation.
JP Office Action dated Mar. 1, 2022, in Application No. JP2020-175033 with translation.
KR Office Action dated Nov. 3, 2022, in Application No. KR10-2022-7027386 with English Translation.
KR Office Action dated Apr. 13, 2022, in KR Application No. KR1020217028044 with English translation.
KR Office Action dated Dec. 7, 2022 in Application No. KR10-2022-7036992 with English translation.
KR Office Action dated Dec. 22, 2021, in Application No. KR1020177018491 with English translation.
Mumaw, R.J et al., "There is More to Monitoring a Nuclear Power Plant Than Meets the Eye", Human factors, 2000, vol. 42, No. 1, pp. 36-55.
TW Office Action dated Jun. 6, 2022 in Application No. TW108115291 With English Translation.
TW Office Action dated Apr. 29, 2022, in Application No. TW110140314 with English translation.
TW Office Action dated Jan. 28, 2022, in Application No. TW110109128 with English translation.
TW Office Action dated Mar. 15, 2022, in Application No. TW109112242 with English translation.
TW Office Action dated Nov. 23, 2022 in Application No. TW107114217 with English translation.
U.S. Non-Final office Action dated Sep. 21, 2022 in U.S. Appl. No. 17/301,026.
U.S. Notice of Allowance dated May 12, 2022, in U.S. Appl. No. 17/171,667.
U.S. Corrected Notice of Allowance dated Jan. 6, 2023 in U.S. Appl. No. 16/655,032.
U.S. Corrected Notice of Allowance dated Jun. 27, 2022 in U.S. Appl. No. 16/527,554.
U.S. Corrected Notice of Allowance dated Apr. 28, 2022, in U.S. Appl. No. 15/733,765.
U.S. Non-Final office Action dated Jan. 23, 2023 in U.S. Appl. No. 17/869,725.
U.S. Non-Final office Action dated Nov. 14, 2022 in U.S. Appl. No. 17/804,802.
U.S. Non-Final office Action dated Nov. 15, 2022 in U.S. Appl. No. 17/355,086.
U.S. Non-Final office Action dated Sep. 9, 2022 in U.S. Appl. No. 17/249,442.
U.S. Non-Final Office Action dated Aug. 12, 2022, in U.S. Appl. No. 16/655,032.
U.S. Non-Final Office Action dated Dec. 6, 2022 in U.S. Appl. No. 17/453,469.
U.S. Non-Final office Action dated Dec. 21, 2022 in U.S. Appl. No. 17/194,795.
U.S. Non-final Office Action dated Jul. 28, 2022 in U.S. Appl. No. 16/655,032.
U.S. Notice of Allowance dated Apr. 6, 2022, in U.S. Appl. No. 15/733,765.
U.S. Notice of Allowance dated Dec. 29, 2022 in U.S. Appl. No. 16/655,032.
U.S. Notice of Allowance dated Feb. 7, 2023 in U.S. Appl. No. 17/249,442.
U.S. Notice of Allowance dated Feb. 16, 2022 in U.S. Appl. No. 16/664,089.
U.S Notice of Allowance dated Jun. 8, 2022 in U.S. Appl. No. 15/733,765.
U.S. Notice of Allowance dated Jun. 20, 2022 in U.S. Appl. No. 16/527,554.
U.S. Appl. No. 17/989,603, Inventors Shrivastava et al., filed Nov. 17, 2022.

(56) References Cited

OTHER PUBLICATIONS

U.S. Supplemental Notice of Allowance dated Aug. 1, 2022 in U.S. Appl. No. 17/171,667.
Woods, D., "The Alarm Problem and Directed Attention in Dynamic Fault Management.", Ergonomics, 1995, vol. 38, No. 11, pp. 2371-2393.
AU Office action dated Mar. 20, 2023, in AU Application No. AU2021021 5134.
CA Office Action dated Feb. 22, 2023, in Application No. CA2970300.
CN Office Action dated Mar. 16, 2023, in Application No. CN202080022001.X with English translation.
CN Office Action dated Mar. 30, 2023 in Application No. CN201980031543 with English translation.
European Office Action dated Mar. 10, 2023 for EP Application No. EP20712740.8.
TW Office Action dated Jan. 12, 2023 in Application No. TW108115291 with English translation.
U.S. Non-Final Office Action dated Apr. 18, 2023 in U.S. Appl. No. 17/609,671.
U.S. Non-Final office Action dated Mar. 9, 2023 in U.S. Appl. No. 17/909,925.
U.S. Notice of Allowance dated Feb. 14, 2023 in U.S. Appl. No. 17/355,086.
U.S. Notice of Allowance dated Mar. 31, 2023 in U.S. Appl. No. 17/249,442.

\* cited by examiner

A - Direct Sunlight Penetration
B - Clear Sky Prediction
C - Real-time Irradiance accounting for obstructed and reflected

Site Status Dashboard

| Home | New Site | Reports | About |
|------|----------|---------|-------|

| Details | Name | Status | Update Date/Time | SITE CONDITION STATUS DETAILS:<br>SITE STATUS HISTORY:<br>WINDOW CONTROLLER STATUS DETAILS: |
|---------|--------|--------|-------------------|---|
| Details | Site A | ○ | 8/27/2016 5:16:33 AM | |
| Details | Site B | ○ | 8/27/2016 5:16:33 AM | |
| Details | Site C | ○ | 8/27/2016 5:16:33 AM | |
| Details | Site D | ○ | 8/27/2016 5:16:33 AM | |
| Details | Site E | ● | 8/27/2016 5:16:33 AM | |
| Details | Site F | ○ | 8/27/2016 5:16:33 AM | |
| Details | Site G | ○ | 8/27/2016 5:16:33 AM | |
| Details | Site H | ○ | 8/27/2016 5:16:33 AM | |
| Details | Site I | ○ | 8/27/2016 5:16:33 AM | |

*Figure 8A*

Main Menu (click hamburger menu to open)

| view | site management console | | Good afternoon, user 👤⚙️ Logout |
|---|---|---|---|

Dashboard
Jobs Status
PG Control&Monitor
WC Control
NC Mode Switches
File Manager
System Info

DASHBOARD
Site Info
Customer: Building 195 CR1
Site ID: 5118

Basic Site Info

Geo: 37.428777 (lat), -121.897603 (lon)
UTC Offset: 8

Quick Start

- Set Commissioning Mode
- Read Lite IDs
- Read Parameters
- Write Parameters
- Run Short Fingerprint
- Run Final Fingerprint
- Request Tint Change
- Start Other Tasks RESOURCES
FMC
View Apps
viewglass.com Common Tasks Jobs Status / Start a new job

| JOB | NC | SCRIPT | START TIME | STATUS | % | OUTPUT FILE |
|---|---|---|---|---|---|---|
| 35 | DEV100 | Read Parameters | 10:26:50 | Trans | 100 | 35.param.csv |
| 34 | DEV100 | Generate PT File | 16:29:16 | Trans | 100 | 34.pt.csv |
| 33 | DEV100 | Multi-tint vDrop | 15:22:22 | Trans | 100 | 33.vdrop.csv |
| 32 | DEV100 | Read Lite IDs | 15:20:30 | Trans | 100 | 32.LiteIDs.csv |
| 31 | DEV100 | Read Parameters | 15:18:17 | Trans | 100 | 31.param.csv |
| 30 | DEV100 | Run Final Fingerprint | 15:18:16 | Trans | 100 | 30.pt.csv |
| 29 | DEV100 | Write Parameters | 14:51:25 | Success | 100 | 28.pt.csv |
| 28 | DEV100 | Generate PT File | 16:33:27 | Trans | 100 | 28.pt.csv |
| 27 | DEV100 | Measure vDrop | 14:56:03 | Trans | 100 | 27.vdrop.csv |

Recent Jobs

*Figure 8B*

Shows window response to commands issued

Compare state transitions of windows connected to different network controllers.

| Zone # | WC# | WC ID/BAR CODE | FRAME | IGU # | W | H | SF | Notes |
|---|---|---|---|---|---|---|---|---|
| Zone 1 | WC1 | | FRAME-F | W1 | 54 1/8 | 68 1/8 | 25.61 | |
| | | | | W2 | 54 1/8 | 68 1/8 | 25.61 | |
| | WC2 | | | W3 | 54 1/8 | 68 1/8 | 25.61 | |
| | | | | W4 | 54 1/8 | 68 1/8 | 25.61 | |
| | WC3 | | FRAME-E | W5 | 52 5/8 | 68 1/8 | 24.90 | |
| | | | | W6 | 52 5/8 | 68 1/8 | 24.90 | |
| | WC4 | | | W7 | 52 5/8 | 68 1/8 | 24.90 | |
| | | | | W8 | 52 5/8 | 68 1/8 | 24.90 | |
| | WC5 | | FRAME-D | W9 | 52 5/8 | 68 1/8 | 24.90 | |
| | | | | W10 | 52 5/8 | 68 1/8 | 24.90 | |
| | WC6 | | | W11 | 52 5/8 | 68 1/8 | 24.90 | |
| | | | | W12 | 52 5/8 | 68 1/8 | 24.90 | |
| | WC7 | | FRAME-C | W13 | 52 5/8 | 68 1/8 | 24.90 | |
| | | | | W14 | 52 5/8 | 68 1/8 | 24.90 | |
| | WC8 | | | W15 | 52 5/8 | 68 1/8 | 24.90 | |
| | | | | W16 | 52 5/8 | 68 1/8 | 24.90 | |
| | WC9 | | FRAME-B | W17 | 52 5/8 | 68 1/8 | 24.90 | |
| | | | | W18 | 52 5/8 | 68 1/8 | 24.90 | |
| | WC10 | | | W19 | 52 5/8 | 68 1/8 | 24.90 | |
| | | | | W20 | 52 5/8 | 68 1/8 | 24.90 | |
| | WC11 | | FRAME-A | W21 | 52 9/16 | 68 1/8 | 24.87 | |
| | | | | W22 | 52 9/16 | 68 1/8 | 24.87 | |
| | WC12 | | | W23 | 52 9/16 | 68 1/8 | 24.87 | |

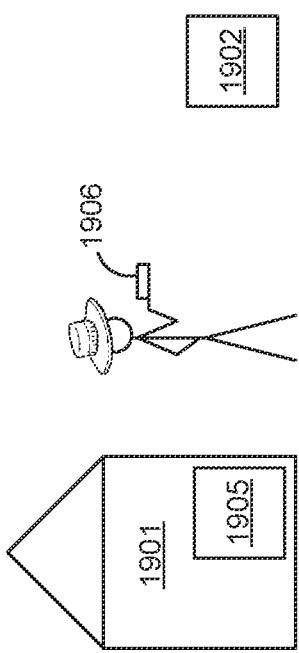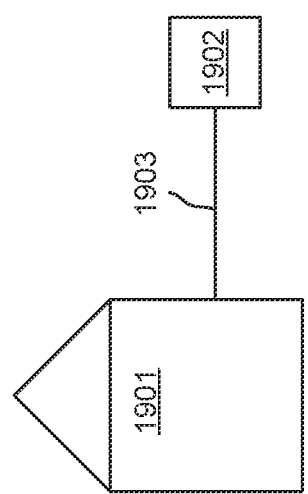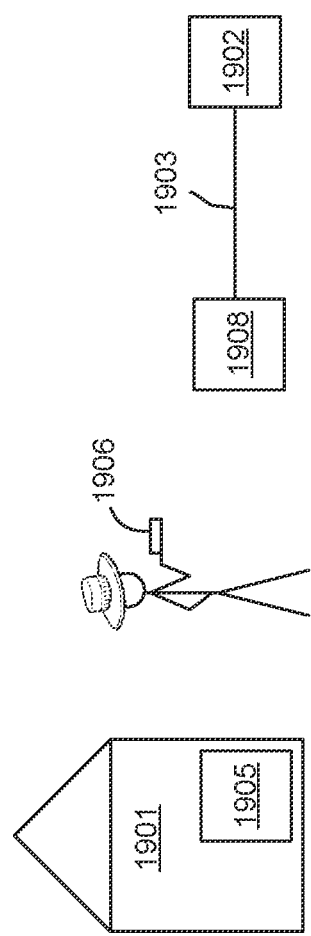

SITE MONITORING SYSTEM

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Electrically tintable windows such as electrochromic window, sometimes referred to as "smart windows" have been deployed in limited installations. As such windows gain acceptance and are more widely deployed, they may require increasingly sophisticated control and monitoring systems, as there may be a large amount of data associated with smart windows. Improved techniques for managing large installations will be necessary.

SUMMARY

A site monitoring system ("SMS") may analyze information from one or more sites to determine when a device, a sensor, or a controller has a problem. The system may, if appropriate, act on the problem. In certain embodiments, the system learns customer/user preferences and adapts its control logic to meet the customer's goals.

A system of one or more computers and/or other processing devices can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system for monitoring one or more sites, each having a network of switchable optical devices, the system including: (a) a data repository configured to store data about the functioning of the switchable optical devices in said sites; (b) one or more interfaces for receiving data from said sites; and (c) logic for analyzing said data from said sites to identify any of the switchable optical devices, or any controllers or sensors operating in conjunction with any of the switchable optical devices, that are performing outside an expected performance region. The monitoring may occur locally at the site(s) where the network(s) are located, or it may occur remotely. Other embodiments of this aspect include corresponding computer systems, apparatus, and computer programs recorded on one or more computer storage devices, each configured to perform or store instructions for performing the features of the logic.

In one aspect of the embodiments herein, a monitoring system for monitoring a network of optically switchable windows is provided, the monitoring system including: a fingerprinting module including instructions configured to execute hardware operations on one or more processors, where the instructions include: communicating with a plurality of components of the network of optically switchable windows to receive identification numbers of the plurality of components, causing the voltage and/or current to be measured at the plurality of components during one or more optical transitions of at least one optically switchable window, and storing the identification numbers received and the voltage and/or current measured in a fingerprint of the network of optically switchable windows, where the plurality of components include a plurality of the optically switchable windows, and a plurality of controllers configured to control optical transitions of the optically switchable windows; and a parameter update module including instructions configured to execute hardware operations on the one or more processors, where the instructions include: determining that one or more of the plurality of controllers requires updated parameters for controlling one or more optical transitions of one or more of the plurality of optically switchable windows, and sending one or more communications including the updated parameters and instructions to configure said one or more of the plurality of controllers requiring the updated parameters.

In some embodiments, the plurality of components further includes one or more control panels. In some such cases, the plurality of components further includes wiring electrically positioned between the one or more control panels and the plurality of controllers. In these or other cases, the plurality of components may further include one or more sensors. The monitoring system may be configured to monitor two or more networks of optically switchable windows, the two or more networks of optically switchable windows being provided at different sites.

The fingerprint of the network of optically switchable windows may further include information describing user preferences associated with one or more of the plurality of components. In some cases, the fingerprint of the network of optically switchable windows further includes algorithms and associated parameters for controlling optical transitions on the plurality of optically switchable windows. In some such cases, the associated parameters may include (i) a ramp to drive rate, (ii) a drive voltage, (iii) a ramp to hold rate, and (iv) a hold voltage. In these or other cases, the fingerprint of the network of optically switchable windows may further include a list of available tint states and associated transmissivity levels for one or more of the plurality of optically switchable windows based on the algorithms and/or associated parameters for controlling optical transitions on the plurality of optically switchable windows. The fingerprint of the network of optically switchable windows may include calibration data for one or more of the plurality of components. The fingerprint of the network of optically switchable windows may include log files and/or configuration files. The fingerprint of the network of optically switchable windows may include information related to a physical layout of the plurality of components on the network of optically switchable windows. In some embodiments, the network of optically switchable windows includes a control panel and wiring electrically positioned between the control panel and the plurality of controllers. In some such embodiments, the fingerprint of the network of optically switchable windows may include information related to a voltage drop over the wiring electrically positioned between the control panel and at least one of the plurality of controllers.

In certain implementations, the fingerprint of the network of optically switchable windows may include one or more parameters selected from the group consisting of: (i) a peak current experienced during the one or more optical transitions of the at least one optically switchable window, (ii) a leakage current observed at an ending optical state of the one or more optical transitions of the at least one optically switchable window, (iii) a voltage compensation required to account for a voltage drop in a conductive path from a power supply to at least one optically switchable window, (iv) a total charge transferred to the at least one optically switchable window during at least a portion of the one or more optical transitions of the at least one optically switchable window, (v) an amount of power consumed by the at least one optically switchable window during the one or more optical transitions of the at least one optically switchable window, (vi) an indication of whether double tinting or double clearing has occurred on the at least one optically switchable window, and (vii) information relating switching characteristics of the at least one optically switchable window to external weather conditions.

For example, the fingerprint of the network of optically switchable windows may include the peak current experienced during the one or more optical transitions of the at least one optically switchable window. In these or other embodiments, the fingerprint of the network of optically switchable windows may include the leakage current observed at the ending optical state of the one or more optical transitions of the at least one optically switchable window. In these or other embodiments, the fingerprint of the network of optically switchable windows may include the voltage compensation required to account for the voltage drop in the conductive path from the power supply to the at least one optically switchable window. In these or other embodiments, the fingerprint of the network of optically switchable windows may include the total charge transferred to the at least one optically switchable window during at least the portion of the one or more optical transitions of the at least one optically switchable window. In these or other embodiments, the fingerprint of the network of optically switchable windows may include the amount of power consumed by the at least one optically switchable window during the one or more optical transitions of the at least one optically switchable window. In these or other embodiments, the fingerprint of the network of optically switchable windows may include the indication of whether double tinting or double clearing has occurred on the at least one optically switchable window. In these or other embodiments, the fingerprint of the network of optically switchable windows may include information relating switching characteristics of the at least one optically switchable window to external weather conditions.

In certain implementations, the instructions for the fingerprinting module may include instructions for: generating a first fingerprint in response to a first command, the first fingerprint including voltage and/or current information related to a first optical transition on at least one of the optically switchable windows, and generating a second fingerprint in response to a second command, where the second fingerprint includes voltage and/or current information related to a second optical transition on at least one of the optically switchable windows, where the second optical transition has a different starting optical state and/or a different ending optical state compared to the first optical transition. In some such embodiments, the second fingerprint may include voltage and/or current information related to a third optical transition on at least one of the optically switchable windows. The third optical transition may have the same starting and ending states as the first optical transition.

The network of optically switchable windows may a plurality of zones into which the optically switchable windows are divided. In some cases, optically switchable windows in the same zone are desired to transition together, and the fingerprint of the network of optically switchable windows may include information regarding whether any of the optically switchable windows is transitioning or has been transitioning out-of-sync with the other optically switchable windows in the same zone. In some such embodiments, the instructions for the parameter update module may include instructions for identifying which optically switchable window is out-of-sync with the other optically switchable windows in the same zone, and providing the updated parameters and instructions to configure the controller associated with the optically switchable window that is out-of-sync to thereby change a rate at which the optically switchable window that is out-of-sync transitions such that all of the optically switchable windows in the same zone transition together.

In certain embodiments, the fingerprint of the network of optically switchable windows includes data indicating a frequency of errors over time related to one or more of the plurality of components. In a number of embodiments, the fingerprint of the network of optically switchable windows may include information indicating whether any of the plurality of components is becoming or has become disconnected from the network of optically switchable windows. The fingerprint of the network of optically switchable windows may include data related to one or more sensors, the data including one or more parameters selected from the group consisting of: (i) sensor readings vs. time, (ii) sensor readings vs. external weather events, (iii) information comparing an output of the one or more sensors vs. a tint state on at least one optically switchable window affected by the one or more sensors, and (iv) information regarding changes in external lighting conditions since the network of optically switchable windows was installed. In certain implementations, the fingerprint of the network of optically switchable windows may include sensor readings vs. time. In these or other implementations, the fingerprint of the network of optically switchable windows may include sensor readings vs. external weather events. In these or other implementations, the fingerprint of the network of optically switchable windows may include information comparing the output of the one or more sensors vs. the tint state on the at least one optically switchable window affected by the one or more sensors. In these or other embodiments, the fingerprint of the network of optically switchable windows may include information regarding changes in external lighting conditions since the network of optically switchable windows was installed.

In certain implementations, the fingerprint of the network of optically switchable windows may include information about an amount of time spent in each tint state for one or more of the plurality of optically switchable windows. In these or other embodiments, the fingerprint of the network of optically switchable windows may include information related to a number of times that one or more of the plurality of optically switchable windows has transitioned over its lifetime. In some cases, the fingerprint of the network of optically switchable windows may include at least one parameter selected from the group consisting of: an input power to the control panel, (ii) an output power from the control panel, (iii) an input voltage to the control panel, (iv) an output voltage from the control panel, (v) an input current to the control panel, and (vi) an output current from the control panel.

In some embodiments, determining that one or more of the plurality of controllers requires updated parameters may include comparing the fingerprint of the network of optically switchable windows to a previous fingerprint of the network of optically switchable windows. The parameter update module may be configured to detect a malfunctioning or degrading component of the plurality of components based on the fingerprint of the network of optically switchable windows. In some such embodiments, the monitoring system may be configured to notify a user when the malfunctioning or degrading component is detected.

In certain implementations, the monitoring system may further include a customization module including instructions configured to execute hardware operations on the one or more processors, where the instructions include: analyzing usage data related to the plurality of optically switchable windows, determining trends in the usage data, and determining the updated parameters for the parameter update module to provide to the one or more of the plurality of controllers, where the updated parameters more closely reflect the trends determined in the usage data compared to an original set of parameters used when the usage data was gathered.

A commissioning module may be included in some embodiments. The commissioning module may include instructions configured to execute hardware operations on the one or more processors, where the instructions include: determining the identification numbers of the plurality of components; determining a location of each of the plurality of components; and associating each of the plurality of components with its identification number and location.

In certain embodiments, the monitoring system may be configured to alert an operator of the monitoring system when one or more of the plurality of components is malfunctioning or degrading. The parameter update module may determine that one or more of the plurality of controllers requires updated parameters in response to a request from a user that one or more of the optically switchable windows transitions differently compared to past switching behavior. In some other cases, the parameter update module may determine that one or more of the plurality of controllers requires updated parameters in response to an event that destroys or erases one or more memory components storing an original set of parameters for controlling the one or more optical transitions of the one or more of the plurality of optically switchable windows.

Various communication options are available for communicating with a monitoring system. In some cases, the monitoring system may continuously communicate with a network installed at a site, where the communication occurs over an Internet connection. In other cases, the monitoring system may communicate intermittently or periodically with a network installed at a site, where the communication occurs over an Internet connection. In some cases, the monitoring system may communicate intermittently or periodically with a network installed at a site, where the communication occurs via a portable memory component.

In some embodiments, the network may be located at a site, and the one or more processors may be located remote from the site at which the network is located. In some embodiments, the network may be located at a site, and the one or more processors may be located at the site at which the network is located. In some embodiments, the network may be located at a site, and the one or more processors may be distributed between at least first location and a second location, the first location being the site at which the network is located, and the second location being remote from the site at which the network is located.

In another aspect of the disclosed embodiments, a method of managing a network of optically switchable windows is provided, the method including: communicating with a plurality of components of the network of optically switchable windows to receive identification numbers of the plurality of components; causing the voltage and/or current at the plurality of components to be measured during one or more transitions of at least one optically switchable window on the network; storing the identification numbers received and the current and/or voltage measured in a fingerprint of the network of optically switchable windows, where the plurality of components include a plurality of the optically switchable windows, and a plurality of window controllers configured to control optical transitions of the optically switchable windows; determining that one or more of the plurality of window controllers requires updated parameters for controlling one or more optical transitions of one or more of the plurality of optically switchable windows, and sending one or more communications including the updated parameters and instructions to configure said one or more of the plurality of window controllers requiring the updated parameters.

In certain embodiments, the plurality of components may include one or more control panels. In some such embodiments, the plurality of components may include wiring electrically positioned between the one or more control panels and the plurality of controllers. In these or other embodiments, the plurality of components may include one or more sensors. In some implementations, the method may further include monitoring two or more networks of optically switchable windows, the two or more networks of optically switchable windows being provided at different sites.

The fingerprint may include a number of different pieces of information. For instance, the fingerprint of the network of optically switchable windows may include information describing user preferences associated with one or more of the plurality of components. In these or other embodiments, the fingerprint of the network of optically switchable windows may include algorithms and associated parameters for controlling optical transitions on the plurality of optically switchable windows. The associated parameters may include (i) a ramp to drive rate, (ii) a drive voltage, (iii) a ramp to hold rate, and (iv) a hold voltage. In some embodiments, the fingerprint of the network of optically switchable windows further includes a list of available tint states and associated transmissivity levels for one or more of the plurality of optically switchable windows based on the algorithms and/or associated parameters for controlling optical transitions on the plurality of optically switchable windows. In these or other embodiments, the fingerprint of the network of optically switchable windows may include calibration data for one or more of the plurality of components. In these or other embodiments, the fingerprint of the network of optically switchable windows may include log files and/or configuration files. In these or other embodiments, the fingerprint of the network of optically switchable windows may include information related to a physical layout of the plurality of components on the network of optically switchable windows. In some embodiments, the network of optically switchable windows may include a control panel and wiring electrically positioned between the control panel and the plurality of controllers, and the fingerprint of the network of optically switchable windows may include information related to a voltage drop over the wiring electrically positioned between the control panel and at least one of the plurality of controllers.

In certain implementations, the fingerprint of the network of optically switchable windows may include one or more parameters selected from the group consisting of: (i) a peak current experienced during the one or more optical transitions of the at least one optically switchable window, (ii) a leakage current observed at an ending optical state of the one or more optical transitions of the at least one optically switchable window, (iii) a voltage compensation required to account for a voltage drop in a conductive path from a power supply to at least one optically switchable window, (iv) a total charge transferred to the at least one optically switchable window during at least a portion of the one or more optical transitions of the at least one optically switchable window, (v) an amount of power consumed by the at least one optically switchable window during the one or more optical transitions of the at least one optically switchable window, (vi) an indication of whether double tinting or double clearing has occurred on the at least one optically switchable window, and (vii) information relating switching characteristics of the at least one optically switchable window to external weather conditions. For instance, the fingerprint of the network of optically switchable windows may include the peak current experienced during the one or more optical transitions of the at least one optically switchable window. In these or other embodiments, the fingerprint of the network of optically switchable windows may include the leakage current observed at the ending optical state of the one or more optical transitions of the at least one optically switchable window. In these or other embodiments, the fingerprint of the network of optically switchable windows may include the voltage compensation required to account for the voltage drop in the conductive path from the power supply to the at least one optically switchable window. In these or other embodiments, the fingerprint of the network of optically switchable windows may include the total charge transferred to the at least one optically switchable window during at least the portion of the one or more optical transitions of the at least one optically switchable window. In these or other embodiments, the fingerprint of the network of optically switchable windows may include the amount of power consumed by the at least one optically switchable window during the one or more optical transitions of the at least one optically switchable window. In these or other embodiments, the fingerprint of the network of optically switchable windows may include the indication of whether double tinting or double clearing has occurred on the at least one optically switchable window. In these or other embodiments, the fingerprint of the network of optically switchable windows may include information relating switching characteristics of the at least one optically switchable window to external weather conditions.

In certain embodiments, the method may include: generating a first fingerprint in response to a first command, the first fingerprint including voltage and/or current information related to a first optical transition on at least one of the optically switchable windows, and generating a second fingerprint in response to a second command, where the second fingerprint includes voltage and/or current information related to a second optical transition on at least one of the optically switchable windows, where the second optical transition has a different starting optical state and/or a different ending optical state compared to the first optical transition. In some such embodiments, the second fingerprint may include voltage and/or current information related to a third optical transition on at least one of the optically switchable windows. The third optical transition may have the same starting optical state and ending optical state as the first optical transition.

The network of optically switchable windows may include a plurality of zones into which the optically switchable windows are divided. In some such cases, optically switchable windows in the same zone are desired to transition together, and the fingerprint of the network of optically switchable windows may include information regarding whether any of the optically switchable windows is transitioning or has been transitioning out-of-sync with the other optically switchable windows in the same zone. In certain embodiments, the method may include: identifying which optically switchable window is out-of-sync with the other optically switchable windows in the same zone, the optically switchable window that is out-of-sync with the other optically switchable windows in the same zone being associated with the window controller requiring the updated parameters, and providing the updated parameters and instructions to configure the controller requiring the updated parameters to thereby change a rate at which the optically switchable window that is out-of-sync with the other optically switchable windows in the same zone transitions such that all of the optically switchable windows in the same zone transition together.

In some embodiments, the fingerprint of the network of optically switchable windows may include data indicating a frequency of errors over time related to one or more of the plurality of components. In these or other embodiments, the fingerprint of the network of optically switchable windows may include information indicating whether any of the plurality of components is becoming or has become disconnected from the network of optically switchable windows. In these or other embodiments, the fingerprint of the network of optically switchable windows may include data related to the one or more sensors, the data including one or more parameters selected from the group consisting of: (i) sensor readings vs. time, (ii) sensor readings vs. external weather events, (iii) information comparing an output of the one or more sensors vs. a tint state on at least one optically switchable window affected by the one or more sensors, and (iv) information regarding changes in external lighting conditions since the network of optically switchable windows was installed. For instance, the fingerprint of the network of optically switchable windows may include sensor readings vs. time. In these or other embodiments, the fingerprint of the network of optically switchable windows may include sensor readings vs. external weather events. In these or other embodiments, the fingerprint of the network of optically switchable windows may include information comparing the output of the one or more sensors vs. the tint state on the at least one optically switchable window affected by the one or more sensors. In these or other embodiments, the fingerprint of the network of optically switchable windows may include information regarding changes in external lighting conditions since the network of optically switchable windows was installed. In these or other embodiments, the fingerprint of the network of optically switchable windows may include information about an amount of time spent in each tint state for one or more of the plurality of optically switchable windows. In these or other embodiments, the fingerprint of the network of optically switchable windows may include information related to a number of times that one or more of the plurality of optically switchable windows has transitioned over its lifetime. In these or other embodiments, the fingerprint of the network of optically switchable windows may include at least one parameter selected from the group consisting of: an input power to the control panel, (ii) an output power from the control panel, (iii) an input voltage to the control panel, (iv) an output voltage from the control panel, (v) an input current to the control panel, and (vi) an output current from the control panel.

In some implementations, determining that one or more of the plurality of controllers requires updated parameters may include comparing the fingerprint of the network of optically switchable windows to a previous fingerprint of the network of optically switchable windows. In certain embodiments, the method may include detecting a malfunctioning or degrading component of the plurality of components based on the fingerprint of the network of optically switchable windows. The method may include notifying a user when the malfunctioning or degrading component is detected.

In certain embodiments, the method may include: analyzing usage data related to the plurality of optically switchable windows, determining trends in the usage data, and determining the updated parameters, where the updated parameters more closely reflect the trends determined in the usage data compared to an original set of parameters used when the usage data was gathered. In these or other embodiments, the method may include determining the identification numbers of the plurality of components; determining a location of each of the plurality of components; and associating each of the plurality of components with its identification number and location.

In some implementations, the method may include alerting an operator when one or more of the plurality of components is malfunctioning or degrading. In these or other embodiments, determining that one or more of the plurality of controllers requires updated parameters may be done in response to a request from a user that one or more of the optically switchable windows transitions differently compared to past switching behavior. In some embodiments, determining that one or more of the plurality of controllers requires updated parameters may be done in response to an event that destroys or erases one or more memory components storing an original set of parameters for controlling the one or more optical transitions of the one or more of the plurality of optically switchable windows.

A number of options are available for communication. In some cases, communication with the network may occur continuously over an Internet connection. In other cases, communication with the network may occur intermittently or periodically over an Internet connection. In some embodiments, communication with the network may occur intermittently or periodically, and the communication may occurs via a portable memory component.

In some embodiments, the network may be located at a site, and one or more processors performing the method may be located remote from the site at which the network is located. In some embodiments, the network may be located at a site, and one or more processors performing the method may be located at the site at which the network is located. In certain implementations, the network may be located at a site, and one or more processors performing the method may be distributed between at least first location and a second location, the first location being the site at which the network is located, and the second location being remote from the site at which the network is located.

These and other features of the disclosure will be presented in more detail below with reference to the associated drawings.

BRIEF DESCRIPTION OF THE DRAWINGS

FIGS. 8A and 8B show examples of a dashboard for a SMS.

FIGS. 19A-19C show various techniques available for transferring data between a site and a SMS.

DETAILED DESCRIPTION

Figure 1A:
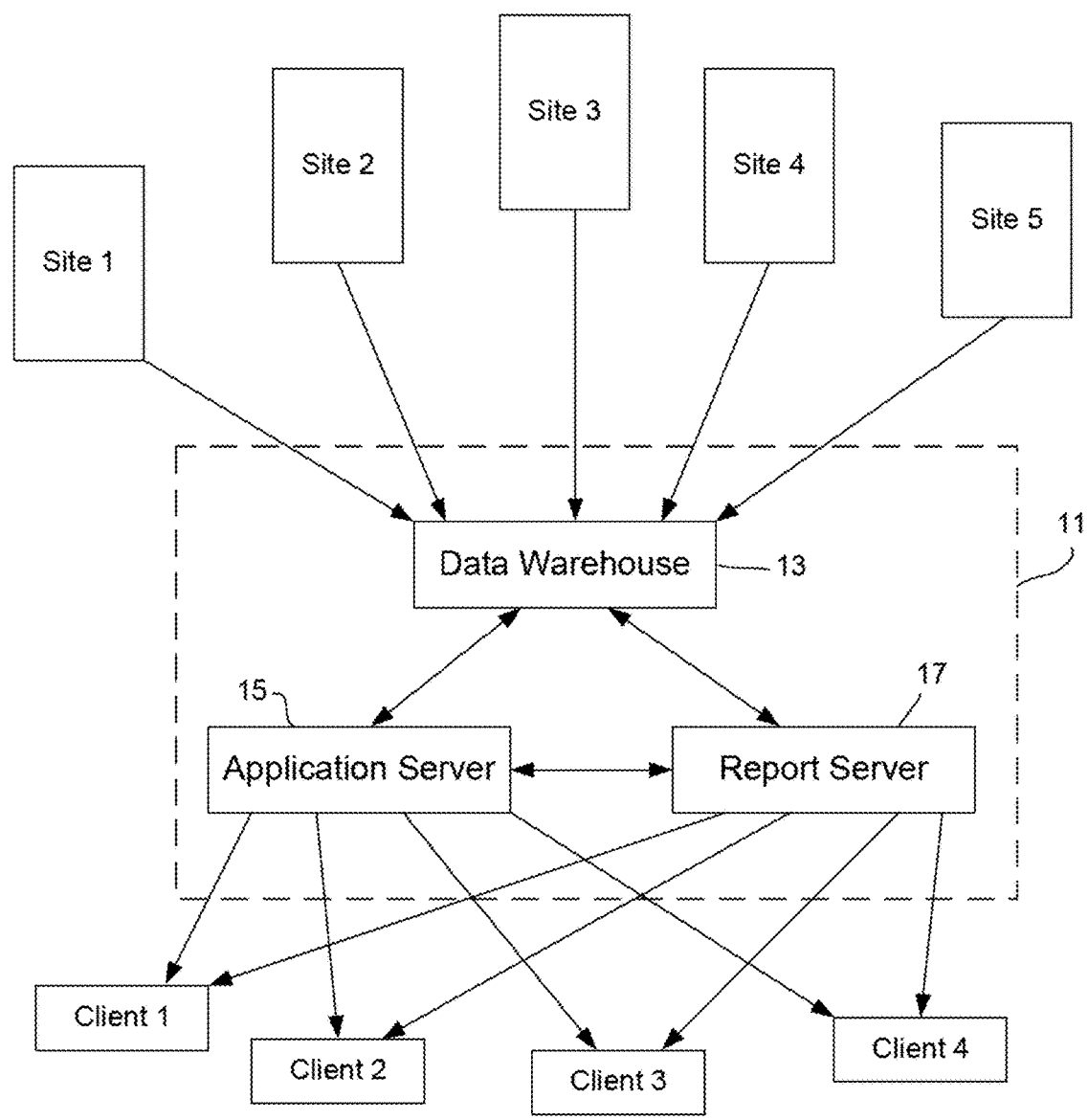
FIG. 1A is a block diagram of a network hierarchy with a monitoring network controller.

This document describes a platform for monitoring one or more buildings or other sites having switchable optical devices deployed therein. In some cases, the sites each have one or more controllers, each controlling the switching of one or more devices. The site may also have sensors such as light sensors, thermal sensors, and/or occupancy sensors, for example, that provide data used in making decisions about when and by how much (tint level) to switch the devices. In certain embodiments, the optical devices are electrochromic devices on structures such as windows and/or mirrors. In the description that follows, switchable optical devices are often referred to as "windows" or "electrochromic windows." It should be understood that such terms include structures other than windows that have switchable optical devices. Further, the switchable devices are not limited to electrochromic devices, but include such other switchable devices as liquid crystal devices, electrophoretic devices, and the like, which may be non-pixelated.

A SMS may analyze information from one or more sites to determine when a device, a sensor, and/or a controller has a problem. The system may, if appropriate, act on the problem. In certain embodiments, the system learns customer/user preferences and adapts its control logic to meet the customer's goals.

In a related way, the system may learn how to better conserve energy, sometimes through interaction with a site's lighting and/or HVAC systems, and then modify the controller settings accordingly. By doing this over one or multiple sites, the system may learn entirely new energy control methods, which it can deploy on the same or other sites. As an example, the system may learn how to control heating load when confronted with a type of rapidly changing weather (e.g., a storm). Through experience, the system learns how to adjust window tinting, e.g., at sites where storms occur frequently, and then apply its learned mode of adjustment to other sites when storms occur there. The system may in turn learn something new from adjusting window tint at the latter storm site and relay that learning to the previous or other sites.

In certain embodiments, the SMS includes a dashboard or other user interface that flags sites with components that are out of specification. The dashboard allows a technician to view the details of a flagged component and see the log or performance data of the component. Thus, the system allows for proactive and/or prophylactic adjustment and/or repair of a window, sensor, controller, or other component, e.g., before the end user may realize the performance of the component is out of specification. In this way a better end user experience is realized.

System Terminology

"Site monitoring system" A processing center that communicates with one or more sites. The communication may occur continuously or intermittently. The SMS monitors the site(s) by receiving data about the switchable optical devices and associated controllers and sensors at the site(s) (as well as any other relevant components at the site(s)). From this data, the SMS may detect and/or present potential problems, identify trends in the performance of devices, controllers, and/or other components at the site(s), modify algorithms and/or parameters for controlling the switchable optical devices, etc. It may also send data and/or control messages to the site(s), sometimes in response to data it receives from the site(s). A SMS may operate locally on a site that it monitors, and/or may operate remotely from one or more of the site(s) that it monitors.

"Site" This is the building, vehicle, or other location of installed switchable optical devices. The sites communicate with the SMS to allow monitoring and optionally control. Examples of sites include residential buildings, office buildings, schools, airports, hospitals, government buildings, vehicles, planes, boats, trains, etc. The switchable devices may be provided in a network and operated under the control of one or more algorithms. Such networks are further described in the following applications, each of which is herein incorporated by reference in its entirety: U.S. patent application Ser. No. 15/268,204, filed Sep. 16, 2016; PCT Patent Application No. PCT/US16/41176, filed Jul. 6, 2016; and PCT Patent Application No. PCT/US15/38667, filed Jun. 30, 2015.

Transitions from one optical state to another may be dictated by programs or logic such as that described in U.S. patent application Ser. No. 13/772,969, filed Feb. 21, 2013, which is incorporated herein by reference in its entirety. The one or more control functions (e.g., algorithms and/or associated parameters) used to control the switchable devices may be implemented on the site by one more window controllers, network controllers and/or master controllers. Logic for controlling the switchable devices may be provided on any one or more of these controllers. As described further below, the system may send and/or retrieve data to any or all of these controllers depending upon the particular setup at each site that the system monitors. For example, the system may communicate with a master controller at one site, while communicating with network controllers at another site. In another example, the system communicates only with master controllers at all sites. In yet another example, the system may communicate indirectly with one or more controllers at a site (e.g., window controllers, network controllers, and/or master controllers), for example, the system may communicate directly with a building management system which relays window controller data to the system and vice versa.

Various embodiments discussed herein are presented in the context of a SMS that simultaneously monitors multiple sites. However, it is understood that a SMS may also monitor a single site, or it may monitor multiple sites in a non-simultaneous manner. Any of the features described herein with respect to multiple sites may also be implemented on a SMS that only monitors a single site.

"Monitoring" is the principal way that the SMS generates and/or acquires information from sites. Monitoring can provide the system with information about the various sensors, windows, controllers, and other components and window systems in the sites it services. In various embodiments, the SMS may generate a fingerprint for each component that is monitored, the fingerprint including information about the component that is communicated to the SMS. The exact type of information included in each fingerprint will depend on the type of component being fingerprinted. The SMS may actively utilize the information gathered by monitoring the site(s) to identify, control, and/or correct an issue with one or more components at the site. The monitoring may be done continuously or intermittently. The fingerprint may represent, e.g., the physical characteristics, operation mode, settings, etc. at a snapshot in time. The SMS may use a fingerprint as a baseline for comparison at a later time, to identify variation in parameters from the stored fingerprint.

An "optically switchable device" or "switchable optical device" is a device that changes optical state in response to an electrical input. The device is typically, but not necessarily, a thin film device. It reversibly cycles between two or more optical states. Switching between these states is controlled by applying predefined current and/or voltage to the device. The device typically includes two thin conductive sheets that straddle at least one optically active layer. The electrical input driving the change in optical state is applied to the thin conductive sheets. In certain implementations, the input is provided by bus bars in electrical communication with the conductive sheets.

While the disclosure emphasizes electrochromic devices as examples of optically switchable devices, the disclosure is not so limited. Examples of other types of optically switchable device include certain electrophoretic devices, liquid crystal devices, and the like. Optically switchable devices may be provided on various optically switchable products, such as optically switchable windows. However, the embodiments disclosed herein are not limited to switchable windows. Examples of other types of optically switchable products include mirrors, displays, and the like. In the context of this disclosure, these products are typically provided in a non-pixelated format.

An "optical transition" is a change in any one or more optical properties of a switchable optical device. The optical property that changes may be, for example, tint, reflectivity, refractive index, color, etc. In certain embodiments, the optical transition will have a defined starting optical state and a defined ending optical state. For example the starting optical state may be 80% transmissivity and the ending optical state may be 50% transmissivity. The optical transition is typically driven by applying an appropriate electric potential across the two thin conductive sheets of the switchable optical device.

A "starting optical state" is the optical state of a switchable optical device immediately prior to the beginning of an optical transition. The starting optical state is typically defined as the magnitude of an optical state which may be tint, reflectivity, refractive index, color, etc. The starting optical state may be a maximum or minimum optical state for the switchable optical device; e.g., 90% or 4% transmissivity. Alternatively, the starting optical state may be an intermediate optical state having a value somewhere between the maximum and minimum optical states for the switchable optical device; e.g., 50% transmissivity.

An "ending optical state" is the optical state of a switchable optical device immediately after the complete optical transition from a starting optical state. The complete transition occurs when optical state changes in a manner understood to be complete for a particular application. For example, a complete tinting might be deemed a transition from 75% optical transmissivity to 10% transmissivity. The ending optical state may be a maximum or minimum optical state for the switchable optical device; e.g., 90% or 4% transmissivity. Alternatively, the ending optical state may be an intermediate optical state having a value somewhere between the maximum and minimum optical states for the switchable optical device; e.g., 50% transmissivity.

"Bus bar" refers to an electrically conductive strip attached to a conductive layer such as a transparent conductive electrode spanning the area of a switchable optical device. The bus bar delivers electrical potential and current from an external lead to the conductive layer. A switchable optical device includes two or more bus bars, each connected to a single conductive layer of the device. In various embodiments, a bus bar forms a long thin line that spans most of the length or width of a device's conductor sheets. Often, a bus bar is located near the edge of the device.

"Applied Voltage" or $V_{app}$ refers the difference in potential applied to two bus bars of opposite polarity on the electrochromic device. Each bus bar is electronically connected to a separate transparent conductive layer. The applied voltage may different magnitudes or functions such as driving an optical transition or holding an optical state. Between the transparent conductive layers are sandwiched the switchable optical device materials such as electrochromic materials. Each of the transparent conductive layers experiences a potential drop between the position where a bus bar is connected to it and a location remote from the bus bar. Generally, the greater the distance from the bus bar, the greater the potential drop in a transparent conducting layer. The local potential of the transparent conductive layers is often referred to herein as the $V_{TCL}$. Bus bars of opposite polarity may be laterally separated from one another across the face of a switchable optical device.

"Effective Voltage" or $V_{eff}$ refers to the potential between the positive and negative transparent conducting layers at any particular location on the switchable optical device. In Cartesian space, the effective voltage is defined for a particular x,y coordinate on the device. At the point where $V_{eff}$ is measured, the two transparent conducting layers are separated in the z-direction (by the device materials), but share the same x,y coordinate.

"Hold Voltage" refers to the applied voltage necessary to indefinitely maintain the device in an ending optical state.

Figure 3:
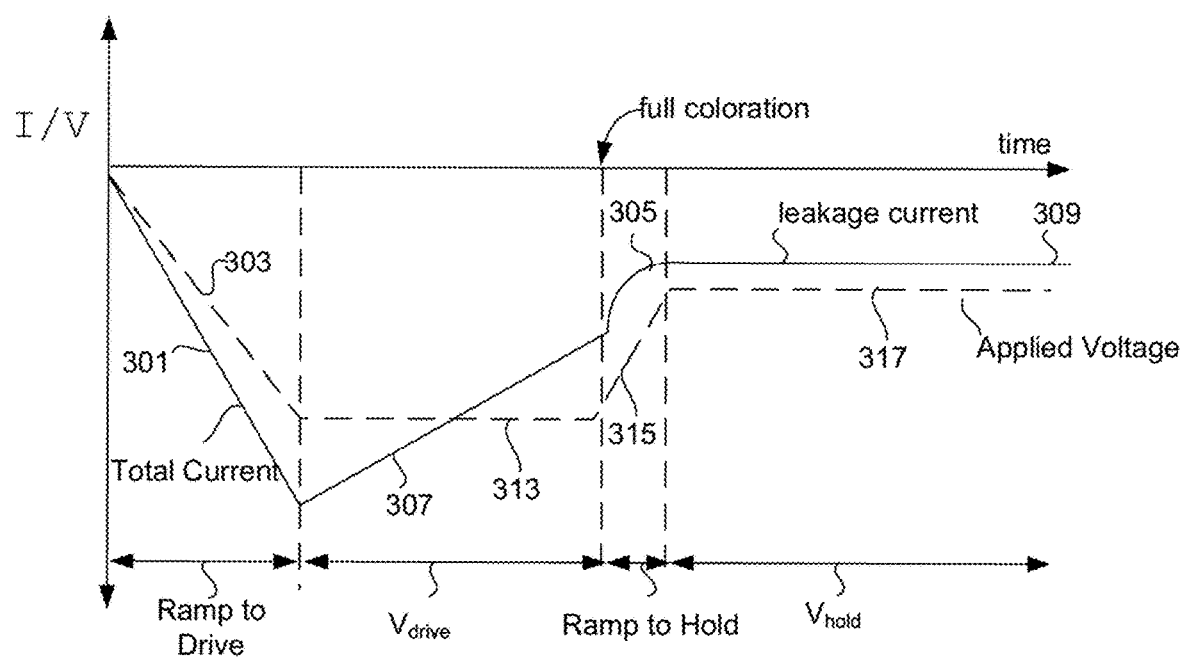
FIG. 3 is a graph depicting certain voltage and current profiles associated with driving an electrochromic device from bleached to colored.

"Drive Voltage" refers to the applied voltage provided during at least a portion of the optical transition. The drive voltage may be viewed as "driving" at least a portion of the optical transition. Its magnitude is different from that of the applied voltage immediately prior to the start of the optical transition. In certain embodiments, the magnitude of the drive voltage is greater than the magnitude of the hold voltage. An example application of drive and hold voltages is depicted in FIG. 3.

A window "controller" is used to control the tint level of the electrochromic device of an electrochromic window. In some embodiments, the window controller is able to transition the electrochromic window between two tint states (levels), a bleached state and a colored state. In other embodiments, the controller can additionally transition the electrochromic window (e.g., having a single electrochromic device) to intermediate tint levels. In some disclosed embodiments, the window controller is able to transition the electrochromic window to and from four or more tint levels. Certain electrochromic windows allow intermediate tint levels by using two (or more) electrochromic lites in a single IGU, where each lite is a two-state lite. Other electrochromic windows allow intermediate states by varying the applied voltage to a single electrochromic lite.

In some embodiments, a window controller can power one or more electrochromic devices in an electrochromic window. Typically, this function of the window controller is augmented with one or more other functions described in more detail below. Window controllers described herein are not limited to those that have the function of powering an electrochromic device to which it is associated for the purposes of control. That is, the power source for the electrochromic window may be separate from the window controller, where the window controller has its own power source and directs application of power from the window power source to the window. However, it is convenient to include a power source with the window controller and to configure the controller to power the window directly, because it obviates the need for separate wiring for powering the electrochromic window.

Further, the window controllers described in this section are described as standalone controllers which may be configured to control the functions of a single window or a plurality of electrochromic windows, without integration of the window controller into a building control network or a building management system (BMS). Window controllers, however, may be integrated into a building control network or a BMS, as described further in the Building Management System section of this disclosure.

The optically switchable devices described in this application may be provided in a network. In various embodiments, the optically switchable devices may be connected together in a power distribution network and/or a communications network. Various components may form part of both the power distribution network and the communication network. A simplified example of a communications network is shown in FIG. 1D, described further below. Briefly, a master controller 1403 is in communication with a plurality of intermediate network controllers 1405 (often referred to more simply as network controllers), which are each in communication with a plurality of leaf or end window controllers 1110 (often referred to more simply as window controllers). A similar setup is described in FIG. 1E, described further below.

Figure 20:
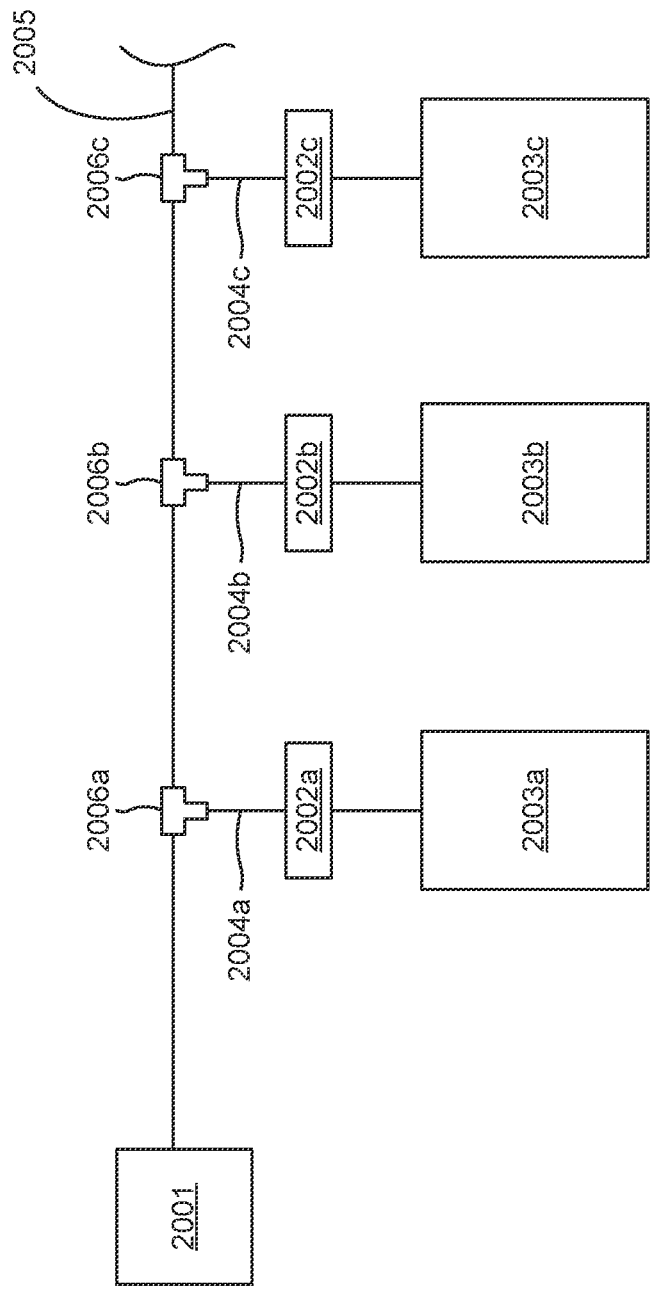
FIG. 20 illustrates a portion of a power distribution network according to certain embodiments.

A simplified example of a power distribution network according to one embodiment is shown in FIG. 20, described further below. Briefly, a trunk line 2005 connects a power source (in this embodiment control panel 2001) to a plurality of drop lines 2004*a-c*. At the junction of the trunk line 2005 with each drop line 2004*a-c*, a connector 2006*a-c* joins the two lines. The drop lines 2004*a-c* connect the trunk line 2005 with the window controllers 2002*a-c*, which are in turn connected with optically switchable windows 2003*a-c*. Power distribution networks are further described in the following patent applications, each of which is herein incorporated by reference in its entirety: U.S. patent application Ser. No. 15/268,204, filed Sep. 16, 2016, and PCT Patent Application No. PCT/US16/41176, filed Jul. 6, 2016.

In various embodiments where the optically switchable windows are provided in a wired power distribution network, one or more trunk lines may be used to route power. Briefly, a trunk line is defined by a structural element and a positional element. Structurally, a trunk line is understood to include wires for carrying power. In many cases a trunk line also includes wires for carrying communication information, though this is not always the case. With respect to position, a trunk line is understood to be functionally positioned between the control panel and the individual drop lines (or the window controllers themselves if no drop lines are present). Drop lines can tap off of the trunk line to receive power and communication information. Drop lines are not considered to be part of the trunk line. In certain implementations, a trunk line may be a 5 wire cable (including one pair of wires for power, one pair of wires for communication, and one ground wire). Similarly, the drop lines may also be 5 wire cable. In some other implementations, the trunk line and/or drop lines may be 4 wire cable (including one pair of wires for power and one pair of wires for communication, without any separate ground wire). The trunk line may carry class 1 or class 2 power in various embodiments.

Sites and Site Monitoring Systems

One example of network entities and a SMS is depicted in FIG. 1A. As shown there, a SMS 11 interfaces with multiple monitored sites—sites 1-5. Each site has one or more switchable optical devices such as electrochromic windows and one or more controllers designed or configured to control switching of the windows. The SMS 11 also interfaces with multiple client machines—clients 1-4. The clients may be workstations, portable computers, tablets, mobile devices such as smartphones, and the like, each able to present information about the functioning of devices in the sites. Personnel associated with SMS 11 may access this information from one or more of the clients. In some instances, the clients are configured to communicate with one another. In some implementations, personnel associated with one or more sites may access a subset of the information via a client. In various implementations, the client machines run one or more applications designed or configured to present views and analysis of the optical device information for some or all of the sites.

Site monitoring system 11 may contain various hardware and/or software configurations. In the depicted embodiment, system 11 includes a data warehouse 13, an application server 15, and a report server 17. The data warehouse interfaces directly with the sites. It stores data from the sites in a relational database or other data storage arrangement. In one embodiment, the data is stored in database or other data repository such as an Oracle DB, a Sequel DB, or a custom designed database. Data warehouse 13 may obtain information from any of a number of entities such as master controllers at the sites, network controllers at the sites, window controllers at the sites, building management systems at the sites, etc. Examples of network arrangements containing a hierarchy of controllers are described below with reference to FIGS. 1B-1D. Application server 15 and report server 17 interface with the clients to provide application services and reports, respectively. In one embodiment, the report server runs Tableau, Jump, Actuate, or a custom designed report generator. In the depicted embodiment, data warehouse 13 and application server 15 each provide information to report server 17. Communication between data warehouse 13 and application server 15 is bidirectional, as is communication between data warehouse 13 and report server 17 as well as between application server 15 and report server 17.

Figure 1B:
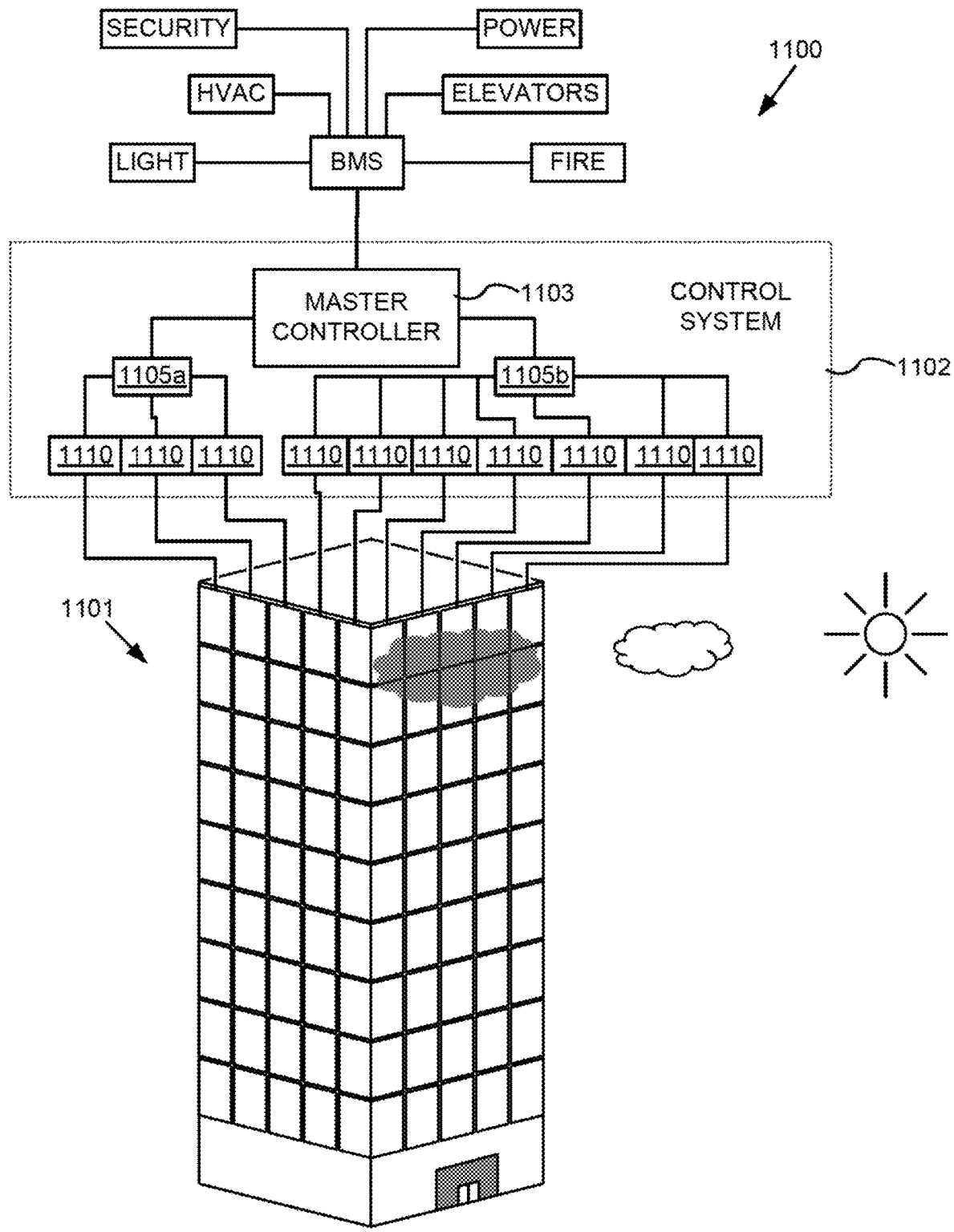
FIG. 1B depicts a schematic diagram of an embodiment of a building management system (BMS).
Figure 1C:
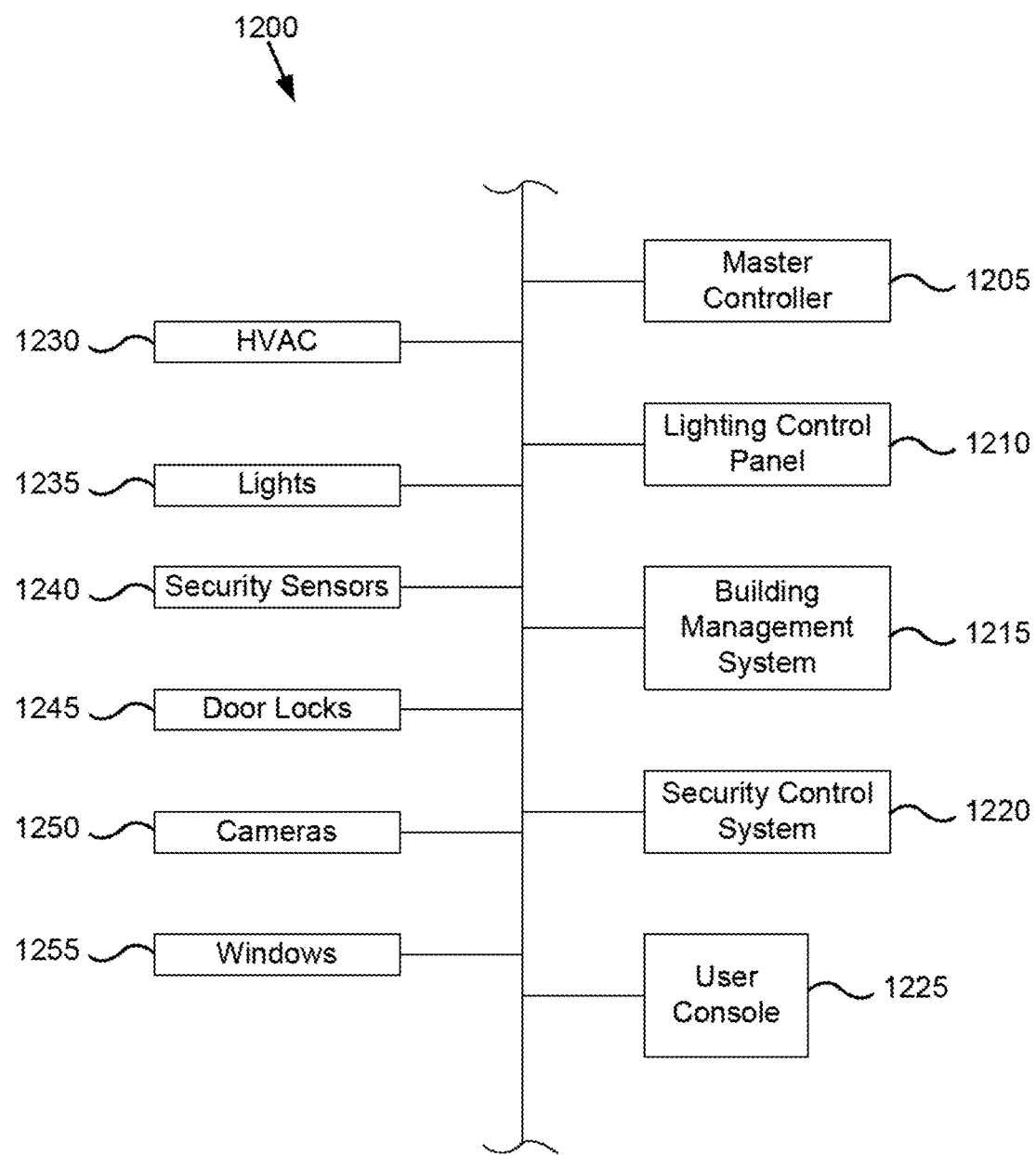
FIG. 1C depicts a block diagram of a building network.
Figure 1D:
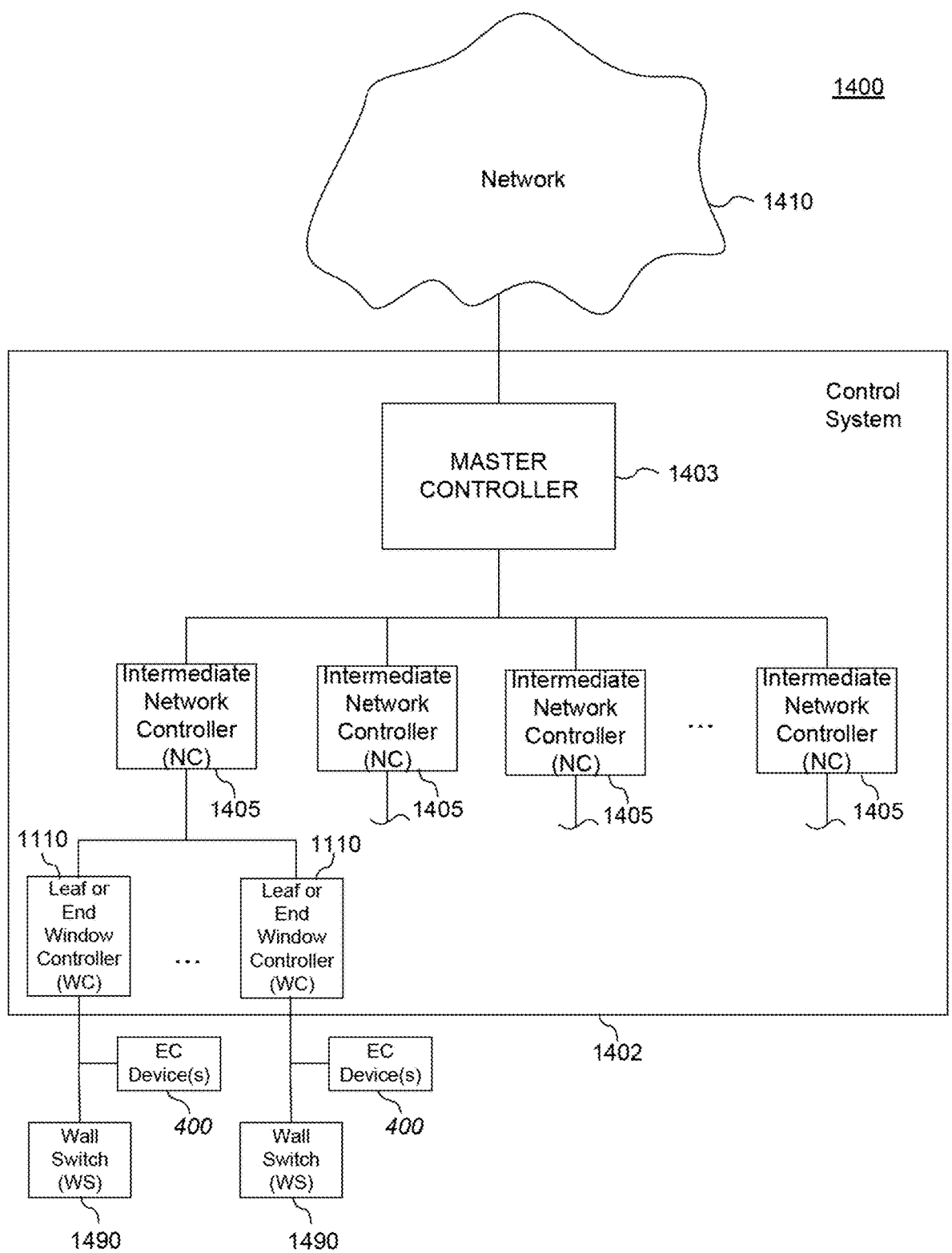
FIG. 1D is a block diagram of components of a system for controlling functions of one or more tintable windows of a building.

Examples of site configurations are shown in FIGS. 1B-1D, discussed below. In certain embodiments, a site includes (a) multiple switchable optical devices, each directly controlled by a (window) controller, (b) multiple sensors such as illumination sensors, occupancy sensors, thermal sensors, etc., and (c) one or more higher level controllers such as network controllers and master controllers.

The SMS may include one or more interfaces for communicating with the remote sites. These interfaces may include ports or connections for securely communicating over the internet. Of course, other forms of network interfaces may be used. The data may be compressed before sending to the SMS. The SMS may interface with the individual sites via a wireless connection or cable connection in some cases. In certain embodiments, the SMS is implemented in the "cloud."

Alternatively or in addition, the SMS may interface with a site via a portable memory component as described below in relation to FIGS. 19B and 19C. The portable memory component may be used locally at a site to store information that is gathered to monitor the various components installed at the site. In one example, the portable memory component may be a USB or other flash drive (e.g., USB, miniUSB, microUSB, etc.) that plugs into a component (e.g., computer, tablet, smartphone, controller, control panel, etc.) located on-site. In another example, the portable memory component may be provided in a laptop or other portable computer. In some cases, the portable memory component may utilize optical storage (e.g., CD, DVD, Blu-ray, M-DISC, etc.), or magnetic storage (e.g., cassette tape, floppy disk, etc.). Solid state storage is also available. The relevant monitoring information may be transferred to the portable memory component at a desired time. Then, the portable memory component can be moved to a second location where the monitoring data may be analyzed or further transferred for analysis. This second location may be a central location where one or more sites are monitored. In some examples, this second location may correspond to the place of business of the window manufacturer or retailer. In another example, the second location is any location at which an Internet connection is available, such that the relevant data can be transferred (e.g., over the Internet, to any component of the SMS that utilizes such information) and used as needed. The portable memory configuration is particularly useful for monitoring sites where an Internet connection is not available.

A SMS can be centralized or distributed and can be accessed from anywhere using a client application by authorized personnel. The various components of the system may be located together or apart in one or more sites, a location remote from all sites, in the cloud, and/or in a portable memory component. In certain embodiments, a SMS may run on a master controller, a network controller, a window controller, a control panel, a laptop or other computer, a tablet, a smartphone, etc. The device on which the SMS runs may be connected, continuously or intermittently, to the communication network(s) linking the various optically switchable devices at the site(s). Such connection may be wired or wireless.

Additional features, functions, modules, etc. of the SMS may include a data and event reporter, a data and event log and/or a database, data analyzer/reporter, and communicator.

While in many embodiments, all or most of the site data analysis, monitoring, and management is performed at the SMS, this is not always the case. In some implementations, some site level analytics, data compression, diagnosing, troubleshooting, controlling, correcting, updating etc. is performed at the site, in some cases prior to sending site data to the SMS. For example, a window, network, master controller, control panel, or another component at the site may have sufficient processing power and other resources for conducting analytics, data compression, etc., and thus processing may be distributed to take advantage of this. This distribution of processing power may not be static, that is, depending on what functions are being performed, the monitoring system may draw on remote processors for performing the aforementioned tasks, or not. Thus the monitoring system may be configured with the flexibility of using remote processors at the site or not.

A number of options are available for communicating data from a site to the SMS. The SMS may be in constant or intermittent communication with the site(s) that it monitors. In some implementations, the data is sent over a network connection, for example over the Internet. FIG. 19A illustrates this embodiment, with site 1901 in communication with SMS 1902 over Internet connection 1903. In such embodiments, the SMS may be in constant or periodic communication with the site(s) that it monitors. This option is particularly suitable for sites that have high quality Internet connections.

In some implementations, the relevant data may be stored locally at a site before it is transferred to the SMS. This option may be particularly suitable for sites that have intermittent or otherwise poor quality Internet connections, or sites that lack Internet connectivity. Where the site has an intermittent or poor quality Internet connection, the data may be sent as shown in FIG. 19A when a suitable Internet connection is available. In another embodiment shown in FIG. 19B, the data may be stored within one or more memory components 1905 located within site 1901. Memory components 1905 may be nonvolatile, and may be provided in window controllers, network controllers, master controllers, control panels, and/or pigtails (e.g., the wiring between a window controller and an associated optically switchable device), etc. To transfer the data to the SMS, a portable memory component 1906 may be used to read the data from memory component 1905 (or another component installed at the site) and transfer the data onto the portable memory component 1906. The portable memory component 1906 can then be transferred to the SMS 1902, which can read the relevant data from the portable memory component 1906. In another embodiment shown in FIG. 19C, the data may be transferred to the portable memory component 1906 as described in relation to FIG. 19B, but instead of transferring the portable memory component 1906 directly to the SMS 1902, the portable memory component 1906 may be transferred to a third location 1908 that has an Internet connection 1903 over which the data can be transferred to the SMS 1902.

In another embodiment, the relevant data may be transmitted (intermittently or continuously) over a cell phone network or similar communication network. In certain embodiments, a private cell network may be used to transmit the data to the SMS.

In another embodiment, the SMS may be run on-site such that there is no need to actively transfer the data from the site to the SMS. In some such embodiments, the SMS may run on a control panel installed at the site, or on one or more controllers (e.g., master controllers, network controllers, window controllers, controllers or control panels for a BMS, etc.) installed at a site. Regardless of where a SMS runs, the SMS may be synced with other applications as desired. In one example, the SMS is configured to sync with an application or program that runs on a hand held device such as a tablet, smartphone, or portable computer. The hand held device may be used to control or otherwise interact with the SMS.

Data may be stored and/or deleted as desired. In some embodiments, all fingerprint data is retained indefinitely. In another embodiment, initial fingerprint data (e.g., from when the site was first installed) may be retained, while other fingerprint data over time may be discarded. In some such cases, fingerprint data may be periodically retained. For instance, if a site is fingerprinted every day, one fingerprint per week or per month may be retained, while other fingerprint data may be deleted. Such deletions can save storage space and costs. In some embodiments, the latest fingerprint data is always retained. In a particular embodiment, certain older fingerprint data may be deleted as new fingerprint data is added. For instance, if fingerprint data is generated daily, the SMS may store an initial fingerprint and the latest fingerprint. In another example, the last week or month's worth of fingerprint data may be retained, while older fingerprint data is deleted. In some embodiments, the SMS may generate an alert only when the incoming (new) fingerprint data doesn't match an existing (e.g., initial) fingerprint. This may save computing power and end user or system bandwidth, as only alert data is presented.

The SMS may utilize some form of authentication to ensure that only authorized users have access to the system. Similarly, certain users may have limited access to the system while other users have more complete access. This tiered access may be particularly suitable for ensuring that, e.g., customers have access to an appropriate amount of information about their systems, while simultaneously ensuring that a manufacturer/servicer of the system has full access, and/or ensuring that a building administrator can view information relevant to the various systems (e.g., optically switchable windows, HVAC, etc.) being monitored at a site by the SMS. This can prevent unauthorized and accidental changes to the system that could deleteriously affect performance, while providing reasonable levels of access for different users.

In one example, the SMS has three levels of access depending on the level of authorization of the user. In a first level available to building occupants, the building occupant may have access to e.g., (1) view the current tint state of all the optically switchable devices in the building (or some relevant subset thereof), (2) change the tint state of any optically switchable devices that the occupant is authorized to switch (e.g., in the occupant's office), (3) view any warnings or alerts describing serious errors causing decreased performance in the optically switchable devices at the site, and in some cases (4) view less serious warnings or alerts describing errors that are not yet causing decreased performance in the optically switchable devices at the site. In a second level available to a building administrator who administers a site, additional access may be permitted to, e.g., (5) view information related to the HVAC system including any heating, cooling, temperature, and other information available for the site, and (6) change any settings related to how the HVAC or other building systems (e.g., security, lighting, etc.) are running at the site. In a third level available to an entity servicing the optically switchable devices, additional access may be provided to allow the servicer to, e.g., (7) view any relevant warnings or alerts related to the optically switchable devices, (8) change the tint state of any optically switchable devices at the site, (9) update the switching algorithms or associated parameters for any optically switchable devices at the site, (10) update any other parameters (e.g., calibration data, offsets, etc.) affecting how the various components on the network of optically switchable devices function at a site. Appropriate levels of access can be determined for a particular user/site based on many different considerations.

Through monitoring of the sensors, controllers, windows, control panels, wiring, and other components at the various installations, a SMS can provide any one or more of the following services:

a. Customer service including flagging and correcting issues that arise—the SMS will note when data from a switchable device, a sensor, a controller, or another component indicates a problem. The problem may be immediate, such as a malfunction, or an impending problem that can be anticipated, e.g., when a component's performance drifts from specified parameters (while still functioning adequately). In response, service personnel may visit the remote location to correct the problem and/or they may communicate to the remote location that there is a problem. In the latter scenario, service personnel may, e.g., reprogram a switchable device's controller (and/or another controller at the site such as a network or master controller, or another memory component storing relevant parameters and/or algorithms) to compensate for a drift from specification.

In some instances, potential issues are flagged and resolved before they become apparent at a site. For example, the aforementioned reprogramming may provide adequate performance from the window permanently or provide adequate performance until a field service engineer can visit the site and replace or repair the unit. Additionally, the monitoring system may be configured to autocorrect problems with sites. Unless stated otherwise, any of the problems, issues, errors, etc. described herein can be autocorrected using heuristics in the SMS. In one example, the monitoring system detects a drift from specification in an electrochromic window (e.g., based on a fingerprint of the electrochromic window) and automatically reprograms the window's controller(s) to compensate for the drift. The system also alerts service personnel as to this event and may retain a log of such events, e.g. for future forensic and diagnostic purposes.

The reprogramming may involve updating the memory component (e.g., NVRAM) associated with a particular controller or other component. Various issues described herein can be solved by using the SMS to update one or more memory components installed at a site. In various embodiments, switching algorithms and associated parameters (e.g., as discussed in relation to FIGS. 2 and 3) may be stored in a memory component, and these algorithms/parameters may be reprogrammed by a SMS. The memory component storing the algorithms/parameters may be in the window controller in some cases. In other cases, the memory component storing the algorithms/parameters may be provided in a chip positioned in the wiring (often referred to as a pigtail) that connects the optically switchable device with its associated window controller. In some cases, the memory component storing the algorithms/parameters may be provided in a network controller, master controller, and/or control panel. In such cases, the window controller may communicate with the network controller/master controller/control panel as needed, and execute the algorithm/parameters stored on the memory component of another controller or component. For instance, a network controller may have a memory component that stores the switching algorithms/parameters for each of ten different optically switchable devices and their associated window controllers. Each time one of the ten optically switchable devices is instructed to undergo an optical transition, the relevant window controller reads the algorithm/parameters stored on the relevant network controller, then executes the switching algorithm on the relevant optically switchable device. In another example, the algorithms/parameters may be stored at a location that is remote from the site where the network of optically switchable windows is installed. In one example, the SMS runs remotely to control one or more sites, and the algorithms/parameters may be stored within a memory component in the SMS. In another example, the algorithms/parameters may be stored in the cloud. The algorithms/parameters may be stored redundantly in different locations in some cases.

After (or simultaneously with) any alerts and optional reprogramming, the service personnel can decide the best course of action, e.g., further reprogramming, replacing the window, replacing the controller, and the like. The occupant may have no indication that anything has gone awry with the window and/or controller, and the occupant's perception of the window's performance may be unchanged throughout these events.

Alert notifications may be sent when issues are detected with a component. Such alert notifications can be sent to any interested recipients including, but not limited to, a manufacturer of the component in question, a maintenance provider for the component in question, a BMS system and/or operator, an end user/occupant who owns, possesses, or otherwise uses the component in question, etc.

This system enables quick resolution of problems. For example, a dashboard interface may provide the ability to drill down into issues from a high level summary. From the high level summary, the system may provide easy access to site-specific context based log file sections, schematics, pictures, fingerprints, and reports. In some implementations, the system flags an entire site when one or more problems with the site are identified. In this way, persons interacting with the system need not be exposed to minutiae concerning the issue until they want such information. Thus, e.g., service personnel can quickly choose a flagged site, and drill down to the actual problem, which may be e.g., a single window with a non-critical issue. This allows the service personal to (a) quickly determine where problems arise, (b) quickly determine the nature of the problem at each site, and (c) prioritize any problems effectively. See FIG. 8A.

The system may also provide look ahead data to a site's other systems such as HVAC systems, thereby enabling such systems to enhance user comfort and/or save energy.

b. Customize the installation based on observed usage trends. User preferences may be incorporated in a program over time. As an example, the SMS may determine how an end user (e.g., occupant) tries to override a window control algorithm at particular times of day and uses this information to predict future behavior of the user. It may modify the window control algorithm to set tint levels according to the learned user preference.

c. Deploy learned approaches to other installations (e.g., how to best tint windows when an afternoon thunderstorm approaches). There are benefits achieved in using the collective experience and information from an installed base of switchable device networks. For example, it helps to fine tune control algorithms, customize window/network products for a particular market segment, and/or test new ideas (e.g., control algorithms, sensor placement).

d. Commissioning—the SMS may be used to commission a network of electrochromic windows when they are first installed. With reference to FIG. 8B, which shows an example dashboard that may be used to implement a SMS, an installer can enter a "commissioning mode" that may be used to more easily commission the windows, window controllers, and other components at the site. Commissioning is further discussed in the following patent applications, each of which is herein incorporated by reference in its entirety: U.S. Provisional Patent Application No. 62/370,174, filed Aug. 2, 2016, and PCT Patent Application No. PCT/US2013/036456, filed Apr. 12, 2013. In certain embodiments, the commissioning mode may be used to program algorithms, associated parameters, and any other related information for controlling optical transitions on the optically switchable devices at a site. These algorithms, parameters, and related information may be programmed into one or more memory components that may be associated with one or more window controllers or other controllers. The information that is programmed may be provided to the SMS before commissioning begins, for example. In various embodiments, the commissioning mode may be used to determine exactly which component(s) are installed at which locations, as well as the associations between the different components. For example, the commissioning mode may be used to determine which window controllers are associated with which optically switchable devices, and the location of each of the window controllers and optically switchable devices.

e. Observe and manage status of sites and components within sites. The SMS can be used to monitor and observe the status of various components installed at a site. For instance, the current tint state (as well as tint history) of any optically switchable device (or group of devices) can be determined based on information in the SMS. In embodiments where the SMS is in constant communication with the site(s) it manages, this can be done remotely and in real time. The SMS can also be used to determine the switching algorithms and associated parameters for an optically switchable device, for example by reading such information from wherever it is stored (e.g., within a memory component that may be associated with an optically switchable window, window controller, network controller, master controller, etc.) and transmitting it to the SMS. As mentioned above, these algorithms and parameters can be updated as desired by the SMS. Any jobs undertaken at a site can be similarly monitored and managed by the SMS. The SMS can be used to efficiently display many useful types of information, including, but not limited to, any of the parameters, algorithms, status indicators, warnings, tint states, transmissivity levels, reports, and other data described herein. In a particular example, the SMS displays the transmissivity level associated with each particular tint state (e.g., tint1, tint2, etc.) for each window or set of windows.

f. Issue commands to optically switchable devices and other components within sites, and update the switching characteristics or other parameters associated with various optically switchable devices. The SMS can be used to issue commands to optically switchable windows, controllers, and other components within a site. Further, as mentioned above, the SMS can be used to update algorithms and parameters that affect the switching behavior of the optically switchable devices. There may be many reasons to make this type of change. In one example mentioned above, the algorithms/parameters may be updated to address a problem that has arisen (e.g., a degradation in an optically switchable device or other component). In another example, updates may be made to adjust the tint state and/or switching characteristics to address customer preferences. For example, a set of optically switchable windows may come with two pre-set tint states: tint1 at 10% transmissivity and tint2 at 50% transmissivity. A customer may request that tint1 is more opaque and tint 2 is more clear. A servicer can use the SMS to update the relevant parameters for the optically switchable windows in question such that tint1 only provides 5% transmissivity and tint2 provides 60% transmissivity. In other words, the SMS can be used to tailor the tint states for a particular customer. Likewise, the SMS can update the switching algorithms/parameters to affect the switching speed and other switching characteristics, as desired. In a particular example, a servicer selects a particular transmissivity level to be associated with a particular tint state (e.g., selecting that the tint state "tint1" should be at 5% transmissivity, etc.) for an optically switchable window. The selection may be made when the window is first installed, or during a later update. The servicer provider assigns the desired transmissivity level to the relevant tint state for the relevant window, this assignment is communicated to the SMS, and the SMS automatically calculates and provides the control parameters and/or algorithms that the optically switchable window and its associated window controller will use to achieve the desired transmissivity levels. Similarly, a set of optically switchable windows may be controlled/programmed/reprogrammed together in this manner. In some such cases, the set of optically switchable windows may be provided together in a zone of windows. These same types of switching behavior/parameter changes can also be made in cases where an optically switchable device needs to be fine-tuned, for example because it is functioning out-of-specification. Examples of parameters that may be updated to affect the switching behavior of an optically switchable device are described further in relation to FIGS. 2 and 3.

g. Restoring a site after a malfunction. In certain cases, the SMS may be used to restore a site if the site experiences operational problems. For instance, if a site partially or wholly goes down, the SMS may use stored information (e.g., such information may be provided in fingerprints, log files, configuration files, databases, etc.) to restore the site to functionality. In some cases, a storm or other event may destroy or otherwise wipe one or more memory components that store algorithms and related parameters for transitioning optically switchable devices. After any critical hardware is repaired or replaced (if needed), the SMS may provide all of the information needed to program the memory components that were destroyed or erased.

h. Detecting changes in the system. The SMS may also determine when a component has been removed or replaced. In response to a determination that a component has been removed or replaced, the SMS may generate a return merchandise authorization (RMA) to encourage and facilitate return of the component to the manufacturer, vendor, or servicer of the component. The determination that a component has been removed or replaced may also trigger warranty information to be sent to the customer and/or manufacturer/vendor/servicer of the component. The determination may be made based on a comparison of fingerprints taken at different times, which may indicate (e.g., based on the ID number of the relevant component and/or the performance of the relevant component) that an expected component is missing and/or that a new, unexpected part is present.

i. Updating files to reflect changes in the system. Where the SMS detects that a change has been made in the system, the SMS may automatically update the records associated with the components that were changed, removed, replaced, added, etc. The records that are updated may be configuration files or other types of files and/or databases. In one example, a network of electrochromic windows is installed in a building, each electrochromic window being associated with a window controller that is assigned a particular identification number referred to as its CANID. When the network is first implemented, a window controller having identification number CANID123 is installed at location WC10 and controls an IGU referred to as IG15. After some time, a problem develops with the controller at location WC10, and a servicer replaces it with a new window controller having identification number CANID456. As described above, the SMS may automatically detect this change in window controllers. Specifically, the SMS detects that (a) the window controller CANID123 is no longer in the system; (b) the window controller CANID456 is newly installed in the system; and (c) the window controller having identification number CANID456 is connected to IG15. Based on these observations, the SMS may automatically update the records associated with the relevant components. For instance, the SMS may automatically change a configuration file to associate location WC10 with the window controller having identification number CANID456, and it may automatically provide the relevant parameters and/or algorithms previously used by the window controller CANID123 to the new window controller CANID456. These same techniques can be used for many different types of changes to the system, including but not limited to, swapping of components, replacement of components, upgrade of components, etc.

Fingerprinting

Fingerprinting a component at a site generally involves identifying and recording multiple parameters related to the component at a particular time. Any component that forms part of a network of optically switchable devices at a site can be fingerprinted.

Examples of such components include, but are not limited to, (1) windows, (2) optically switchable devices, (3) sensors (e.g., occupancy sensors, temperature/heat sensors, photosensors, motion sensors, etc.), (4) controllers (e.g., window controllers, network controllers, and master controllers), (5) power distribution network components (e.g., power sources, control panels, energy wells, trunk lines, drop lines, power insert lines, connectors, etc.), (6) communication network components (e.g., transmitters, receivers, wiring between different controllers, e.g., between a window controller and a network controller, and/or between a network controller and a master controller, etc.), (7) other connections such as a connection between a window controller and a window (sometimes referred to as a pigtail connection, which may transmit power and/or communication information), etc. Various components at a site may fit into more than one such category.

It is generally expected that a fingerprint for a given component will remain relatively stable over time unless there is a change to the system (e.g., changing operating conditions, degradation of a component, etc.). Therefore, comparison of fingerprints for a given component at different times can be used to ensure that the components at the site are operating as expected. In cases where a fingerprint of a component drifts or changes from what is expected, this drift/change can indicate that the component (or another component affecting the relevant component) is not functioning as desired, and that some remedial action may be warranted. The drift/change can be identified by comparing two or more fingerprints taken at different times. Fingerprints may also be used to balance or otherwise harmonize system components and/or function. For example, a group of EC windows is installed, the windows have substantially the same characteristics. After a number of years, some of the windows are degraded and are replaced with a newer generation of technology. The remaining older windows' fingerprints are, e.g., used as a basis to adjust control parameters on the older windows and/or the newly installed windows to make sure that all the windows tint uniformly, e.g. in color and/or switching speed.

In certain embodiments, the windows, controllers, sensors, and/or other components have their performance, characteristics, and/or response checked at an initial point in time and thereafter rechecked repeatedly. The data gathered during such checks can be included in the fingerprint for the relevant component or combination of components. In some cases, recent performance/response measurements are compared with earlier performance/response measurements to detect trends, deviations, stability, etc. If necessary, adjustments can be made or service can be provided to address trends or deviations detected during comparisons. For example, a group of photosensors is installed with an EC window installation. After a number of years, some of the sensors' performance has degraded and are replaced with a newer generation of technology. The remaining older sensors' fingerprints are, e.g., used as a basis to adjust control parameters on the older sensors and/or the newly installed sensors to make sure that all the controllers are receiving comparable sensor data.

Parameters that may be recorded in a fingerprint include, but are not limited to (1) data related to the ID number of the component (which in some cases may be encoded in a 29 bit address), (2) a description of the component, (3) any current/voltage/power data related to the component, including in some cases current/voltage data related to one or more specific optical transitions, as well as the input/output current/voltage/power to various components, (4) personalization preferences related to the component, (5) algorithms and associated parameters for driving optical transitions on the component, (6) default tint state or other settings for the component, (7) calibration data for the component (including, but not limited to, analog to digital converter gain, I/V offsets and gains, calibration data from manufacturing, etc.), (8) any information contained in log files or other system files related to the component, and (9) system configuration and layout information related to the component and/or overall network or system (including, but not limited to, the location of switchable devices, controllers, and other components, length/position/type/location of various wiring components, etc.). Any current or relevant historical information can be included in a fingerprint for a component.

Generally speaking, a fingerprint can be made for each component at the site. In addition, the site can have a fingerprint that includes the fingerprints of all (or any subset of) the components at the site. The fingerprints for various components can be combined as desired. In one example, a fingerprint for a zone of windows that includes ten optically switchable devices will include the fingerprints for the ten optically switchable devices in the zone, as well as the fingerprints for the associated window controllers and sensors. Any grouping of fingerprints can be used. Mismatching sensor type, window type, controller type, etc. can be harmonized by using fingerprint data and adjusting control parameters to compensate for the differences in order to get e.g., uniform window switching, optimized switching speed, and the like.

While in many cases a fingerprint for a relevant component may be compared against a previous fingerprint for that same component, fingerprints for different components can also be compared against one another. Such comparisons can help identify and diagnose problems that occur as the network of optically switchable devices operates over time.

Various different file types and combinations of file types can be used to store the information in a fingerprint. In one example, the relevant information is stored in a configuration file. Other types of files and databases may also be used to store the relevant information in a fingerprint.

In some embodiments, windows, sensors, controllers, and/or other components are checked and optionally fingerprinted at the factory. For example, a switchable window may go through a burn in procedure during which relevant parameters can be extracted. Windows exhibiting problems can have their current performance compared against earlier fingerprints to optionally determine whether the problem developed during shipping/installation or during operation. Fingerprints can also be generated, optionally automatically, when the devices are commissioned (e.g., installed at a site and initially detected and cataloged). Fingerprinting can occur periodically in some embodiments. For instance, each component (or some subset of the components) at a site can be fingerprinted daily, weekly, monthly, yearly, etc. In these or other cases, fingerprinting can be done non-periodically, for example in response to a request from a user or from the SMS, or in response to the failure of one or more components at the site, or in response to a set of rules governing when fingerprinting should occur (e.g., one such rule may indicate that fingerprinting should occur after there is a power failure).

In various embodiments, fingerprints can be stored in a memory associated directly with the component being fingerprinted or in memory associated with another component at the site. The SMS may reprogram the memory associated with the component to address changes in performance or otherwise update the system for improved performance, as described further herein.

In certain embodiments, during commissioning at a new site, the SMS compares a designed site layout to the actual, as commissioned layout, to flag any discrepancy at time of commissioning. This may be used to correct a device, controller, etc. at the site or to correct design document. In some cases, the SMS simply verifies that all window controllers, network controllers, zones, etc. match between design document and actual site implementation. In other cases, a more extensive analysis is conducted, which may verify cable lengths etc. For example, measured resistance values in installed wire runs can be compared with known resistance characteristics and length of the wire runs. Measuring a change in the resistance value can indicate, e.g., that the wire is degrading or that the wrong length of wire was installed. The comparison may also identify other installation problems such as incorrect photosensor orientations, defective photosensors, etc., and optionally automatically correct such problems. As indicated, during commissioning, the SMS may obtain and store initial fingerprints of many or all individual components in the site, including voltage/current measurements at switchable optical devices for different device transitions. Such fingerprints may be used to periodically check the site and detect degradation in upstream hardware (i.e. wiring, power supplies, uninterrupted power supply (UPS)), as well as window controllers and switchable optical devices. Using a UPS in a switchable optical window network is described in PCT Patent Application No. PCT/US15/38667, filed Jun. 30, 2015, which is incorporated herein by reference in its entirety.

Data Monitored

The data gathered for a particular component will depend on the type of component being fingerprinted, as well as the degree of fingerprinting that is desired. For instance, different levels of fingerprinting may be used for different purposes. A short fingerprint for an optically switchable device may include a limited set of information such as the ID number of the optically switchable device, and the I/V data related to a single standardized optical transition from a known starting optical state to a known ending optical state. A more detailed fingerprint may include additional information such as a description of the optically switchable device, information regarding the location of the optically switchable device, and I/V data related to a series of standardized optical transitions with known starting and ending optical states.

The following description presents examples of some types of site information that may be monitored by a SMS. The information may be provided in one or more fingerprints for one or more components installed at the site. The information may be provided from various sources such as voltage and/or current versus time data for individual switchable devices or other components, sensor output versus time, communications and network events and logs for controller networks, etc. The time variable may be associated with external events or conditions such as solar position, weather, power outages, etc. Information with a periodic component may be analyzed in the frequency domain as well as the time domain. Some of the information described in this section may be considered in the context of the figures presented herein.

1. From a window controller's (or other controller's) I/V data:

a. Peak current experienced during an optical transition [this is sometimes produced during application of a ramp to drive voltage for producing an optical transition. See FIGS. 2 and 3. Unexpected changes in peak current can indicate that a switchable device is not operating as expected.]

b. Hold (leakage) current [this may be observed at an end state of a switchable device. A rate of increasing leakage current may correlate with the likelihood that a short has developed in the device. Sometimes a short causes an undesirable blemish such as a halo in the device. These may be field serviceable using, e.g., a portable defect mitigation apparatus such as described in U.S. patent application Ser. No. 13/859,623, filed Apr. 9, 2013, which is incorporated herein by reference in its entirety.]

c. Voltage compensation required [Voltage compensation is the change in voltage required to account for the voltage drop in the conductive path from the power supply to the switchable device. Unexpected changes in the voltage compensation required can indicate a problem with the power supply, wiring, and/or switchable device.]

d. Total charge transferred [measured over a period of time and/or during a certain state of the switchable device (e.g., during drive or during hold). Unexpected changes in the total charge transferred over a particular time period can indicate that a switchable device is not operating as expected.]

e. Power consumption [Power consumption may be calculated by (I*V) per window or controller. Unexpected changes in power consumption can indicate a number of problems with various components on the network.]

f. Comparison with other WC (window controllers) on the same façade with identical loads [This allows the monitoring system to determine that a particular controller has an issue, rather than a particular device controlled by the controller. For example, a window controller may be connected to five insulated glass units, each exhibiting the same issue. Because it is unlikely that five devices will all suffer from the same issue, the monitoring system may conclude that the controller is to blame. This same comparison can be made among other types of controllers such as network controllers.]

g. Instances of abnormal profiles: e.g., double tinting/double clearing [Double tinting/clearing refers to a situation where a normal drive cycle (voltage and/or current profile) is applied and it is found that the switchable device has not switched, in which case a second drive cycle must be conducted. See FIG. 12. Such instances can indicate that a switchable device is not operating as expected.]

h. Switching characteristics vs. external weather [At certain temperatures or weather conditions, the monitoring system expects particular switching results or performance. Deviations from the expected response suggest an issue with a controller, a switchable device, and/or a sensor or other component on the network.]

The changes and comparisons described here can be produced from data collected at, e.g., the window controller level, the network controller level, the master controller level, the control panel level, etc. Historical data (days, weeks, months, years) is preserved in the SMS, and such data can be used for comparison, both between different sites and within the same site over time. With such data, variations due to temperature can be identified and ignored, if appropriate. The various changes, alone or in combination, may provide a signature of a problem in a window, a controller, a sensor, another component, etc. Any one or more of the foregoing parameters may identify an increase in impedance at any position from the power supply to (and including) the switchable device. This path may include the switchable device, a bus bar connected to the device, a lead attach to the bus bar, a connector to the lead attach or IGU, a group of wires (sometimes called a "pigtail") between the connector (or IGU) and the power supply. As an example, a change in any or more of parameters 1a-1h may indicate corrosion caused by water in a window frame. A model using a combination of these parameters may recognize the signature of such corrosion and accurately report this issue.

2. From window controller state and zone state changes:

a. Any window controller getting out of sync with its zone—for example, this may be due to communication issues [Example: If there are multiple controllers in a zone of a site, and one of these controllers does behave as expected, the SMS may conclude that the aberrant controller is not receiving or following commands over a communications network. The SMS can take action to isolate the source of the problem and correct it]

b. Longest switching time for the zone and adjustments to make all glass switch at the same rate [The SMS may identify a particular switchable device that is not switching at a desired rate or an expected rate. See FIG. 15. Without replacing or physically modifying the device, the monitoring site may modify the switching algorithm (e.g., by updating one or more switching algorithms or associated parameters stored in the memory (e.g., NVRAM) of the relevant switchable device) so that the device switches at the expected rate. For example, if a device is observed to switch too slowly, its ramp to drive or drive voltage may be increased. This can be done remotely or on-site, and automatically in certain embodiments.]

3. From system logs:

a. Any change in frequency of communication errors—increase in noise or device degradation [The received communications from a controller may be slowed or stopped. Or, the sent communications may not be acknowledged or acted upon. These changes can indicate a problem with the communication network or with a particular controller or other component showing decreased frequency of communication errors or other messages.]

b. Connection degradation if a pigtail (or other connection) starts showing up as disconnected [In certain embodiments, a connector, e.g., which may include a memory and/or logic, provides a signal indicating that it is becoming disconnected. A window controller or other controller may receive such signals, which can be logged at the remote SMS. See FIG. 13. A further description of pigtails and other electrical connection features is presented in U.S. patent application Ser. No. 14/363,769, filed Nov. 27, 2014, which is incorporated herein by reference in its entirety.]

4. From photosensor or other sensor data:

a. Any degradation over time [This may be manifest as a signal magnitude reduction. It may be caused by various factors including damage to the sensor, dirt on the sensor, an obstruction appearing in front of the sensor, etc.]

b. Correlation with external weather and time [Normally, the SMS will assume that the photosensor output should correlate with the weather and time (at least if the photosensor senses external light levels).]

c. Comparison with zone state change to ensure that a site's window control technology is working correctly [The SMS normally expects that the zone will change state when its photosensor output meets certain state-change criteria. For example, if the sensor indicates a transition to sunny conditions, the switchable devices in the zone should tint. In certain embodiments, there are one or more photosensors per zone. See FIGS. 14A-14D.]

d. Any changes in surroundings after commissioning [As an example, a tree grows in front of one or more sensors, a building is constructed in front of one or more sensors or a construction scaffold is erected in front of one or more sensors. Such changes in surroundings may be evidenced by multiple sensors affected by the changes being similarly affected (e.g., their photosensor outputs go down at the same time). Among other purposes, commissioning serves to provide information about the deployment of sensors, controllers, and/or switchable optical devices in a site. Commissioning is further described in PCT Application No. PCT/US2013/036456, filed Apr. 12, 2013, which is incorporated herein by reference in its entirety.]

5. From log file analysis of driver of state changes:

a. Overrides by zone—further tuning of control algorithms for the zone [The SMS may learn the requirements of a particular site and adapt its learning algorithm to address the requirements. Various types of adaptive learning are described in PCT Application No. PCT/US2013/036456, filed Apr. 12, 2013, which was previously incorporated herein by reference in its entirety.]

b. Mobile device vs. wall switch overrides—consumer preference [When overrides are observed, the monitoring system may note which type of device initiated the override, e.g., a wall switch or a mobile device. More frequent use of wall switches may indicate a training issue or a problem with the window application on the mobile device.]

c. Time/Frequency of various states—usefulness of each state [When multiple tint states are available, and some are underused, it may indicate to the remote monitoring system that there is an issue with a particular state. The system may change the transmissivity or other characteristic of the state.]

d. Variation by market segment [The frequency of use (popularity) of certain states or other properties of a site's switching characteristics may correlate with a market segment. When a SMS learns this, it may develop and provide market-specific algorithms. Examples of market segments include airports, hospitals, office buildings, schools, government buildings, etc. In some cases, market segments can correspond to specific geographic areas, e.g., New England, Midwest, West, Southwest, Northwest, Southern United States, etc.]

e. Total number of transitions—Expected number of cycles over warranty period and life by market segment. [This may provide in situ lifecycle information. See FIG. 12.]

6. Energy calculations:

a. Energy saved by zone by season, total system energy saving by season [The SMS may compare energy savings from multiple sites to identify algorithms, device types, structures, etc. that provide improvements. The sites can be compared, and this comparison can be used to improve lower performing sites. See FIGS. 14B and 14D.]

b. Provide advanced energy load information to AC system by zone [Buildings have large thermal masses, so air conditioning and heating do not take effect immediately. Using a solar calculator or other predictive tools (described elsewhere herein), the SMS can provide advance notice to HVAC systems so they can begin a transition early. It may be desirable to provide this information by zone. Moreover, a SMS may tint one or more windows or zones to aid the HVAC system in doing its job. For example, if a heat load is expected on a particular façade, the SMS may provide advance notice to the HVAC system and also tint windows on that side of the building to reduce what would otherwise be the HVAC's cooling requirements. Depending upon the tinting speed of the windows, the SMS can calculate and time tinting and HVAC activation sequences appropriately. For example, if the windows tint slowly, the HVAC activation may be sooner, if they tint quickly, then the HVAC signal to action may be delayed or ramped more slowly to reduce load on the system. See FIGS. 14B and 14D.]

7. From the control panel:

a. Power input and output of the control panel. [The input and output power of the control panel can be monitored. Any unexpected changes in input power can be correlated with power outages or related events. Any unexpected changes in output power may be used to identify cases where the control panel is not operating as expected and may need maintenance. The input and output I/V data for the control panel can be similarly monitored.]

8. From the trunk line or other wiring:

a. Voltage drop over each relevant wired connection to determine relative location of different components [The voltage drop over a wire or set of wires can be measured to determine the length of wiring, and therefore the relative location of the components at each end of the wiring. This method can be used to determine the relative location of a set of window controllers, for instance. With reference to FIG. 20, a voltage drop can be measured between the control panel 2001 and each window controller 2002a, 2002b, and 2002c. For optically switchable window 2003a, the voltage drop will correspond to the decrease in voltage experienced as the power is transferred from the control panel 2001, over trunk line 2005 and drop line 2004a, before reaching the window controller 2002a. Similarly, for optically switchable window 2003b, the voltage drop will correspond to the decrease in voltage experienced as the power is transferred from the control panel 2001, over trunk line 2005 and drop line 2004b, before reaching the window controller 2002b, and for optically switchable window 2003c, the voltage drop will correspond to the decrease in voltage experienced as the power is transferred from the control panel 2001, over trunk line 2005 and drop line 2004c, before reaching window controller 2002c. These voltage drops can be compared against one another to determine the relative position of window controllers 2002a-2002c. Generally speaking, longer line lengths correspond to greater voltage drops over the same line. Therefore, the voltage drop between the control panel and window controller 2002a will be smallest, indicating that window controller 2002a is closest to the control panel, while the voltage drop between the control panel and window controller 2002c will be largest, indicating that window controller 2002c is farthest from the control panel. This voltage drop comparison may be done to confirm that the various window controllers are installed where they are expected to be installed. If the voltage drop going to one window controller is higher than expected and the voltage drop going to a second window controller is lower than expected, it may indicate that these window controllers were accidentally switched during installation. Voltage drops can be measured between any two components capable of reporting an experienced (e.g., input or output) voltage. This technique can be used to determine which components are connected to one another and by which lines.]

b. Voltage drop over each relevant wired connection to verify expected wire lengths [As explained above, the voltage drop over a wire or set of wires can be measured to determine the length of wiring present. In addition to comparing the relative voltage drops over different lengths of wiring, the absolute voltage drop over a particular length of wiring can also be useful. For example, with reference to FIG. 20, an expected voltage drop can be calculated between, e.g., the control panel 2001 and the window controller 2002a. This expected voltage drop can be calculated based on the impedance of the trunk line 2005, as well as the expected length of the trunk line 2005, and the current traveling through the trunk line 2005. The impedance and length of the drop line 2004a may also be considered, although in many embodiments the length of the drop line 2004a is negligible in comparison to the length of the trunk line 2005, and the drop line 2004a can therefore be ignored in the calculation. The expected voltage drop can be compared against an actual voltage drop experienced between the control panel 2001 and the window controller 2002*a*. In cases where the actual voltage drop is larger than the expected voltage drop, the length of the trunk line 2005 between the control panel 2001 and the connector 2006*a* may be longer than expected/designed. This can be confirmed by comparing the actual and expected voltage drops between the control panel 2001 and the other window controllers 2002*b-c*. An actual voltage drop larger than an expected voltage drop can also indicate that the trunk line 2005 has a higher than expected impedance. Conversely, where the actual voltage drop is smaller than the expected voltage drop, the relevant length of wiring may be shorter than expected/designed, or may have lower impedance than expected. The actual voltage drop between two components can be used to verify the length of wiring installed between the two components, and when necessary, update a site layout (e.g., map and related information) to reflect the as-installed setup. In one embodiment, the SMS updates one or more files describing the layout of the power distribution network to more accurately reflect the length of a particular wire or set of wires based on a measured voltage drop across the wire or set of wires between two or more components on the power distribution network. In some cases, the SMS may update one or more parameters to address the fact that a component at the site is receiving (or delivering) a different voltage than was originally expected when the system was designed. For instance, an as-designed network may expect a particular window controller to have an input voltage of about 10V. If the voltage actually reaching this window controller is only 9V due to a larger-than-expected voltage drop before reaching the window controller, the SMS may update one or more parameters associated with the window controller to accommodate the lower-than-expected input voltage at the window controller. In another example, the SMS may update one or more parameters associated with the control panel or other power source, e.g., to cause the control panel/power source to deliver a voltage greater than originally designed, such that the power reaching the window controller has the desired voltage. In another example, in response to a voltage drop that is smaller or larger than expected, a manual inspection may be made, and if appropriate, a different trunk line (or other wiring) may be installed.]

Auto-Detection and Auto-Correction by the Site Monitoring System

While much of the discussion herein focuses on systems for detecting and diagnosing issues with networks of switchable optical devices, a further aspect of the disclosure concerns a SMS that leverages these capabilities to automatically collect data, automatically detect problems and potential problems, automatically notify personnel or systems of problems or potential problems, automatically correcting such problems or potential problems, and/or automatically interfacing with building or corporate systems to analyze data, implement corrections, generate service tickets, etc.

Examples of the automatic features of site monitoring systems:

1. If there is a slow degradation in current to a window (or other signature of non-fatal issue with switching current received by a window), the SMS can auto-correct this issue by, for example, directing a controller associated with the window to increase the switching voltage to the window. The system may calculate an increase in voltage using empirical and/or analytic techniques that relate changes in current drawn or optical switching properties to changes in applied voltage. The changes in voltage may be limited to a range such as a range defining safe levels of voltage or current for the devices in the window network. The changes to the voltage may be implemented by the SMS reprogramming one or more memories storing tint transition instructions for the window in question. For example, a memory associated with the window, e.g. in a pigtail of the window or otherwise associated with a window controller or other controller, is programmed from the factory to contain window parameters that allow a window controller to determine appropriate drive voltages for the electrochromic coating associated with the window. If there is degradation or similar issues, one or more of these parameters may need to change and the SMS may reprogram the memory to cause this change. This may be done, e.g., if the window controller automatically generates drive voltage parameters based on the stored values in the memory (e.g., a memory associated with the pigtail or at another location). That is, rather than the SMS sending new drive parameters to the window controller, the system may simply reprogram the memory associated with the window (wherever such memory resides) so the window controller can determine new drive parameters itself. Of course, the SMS may also provide the tint transition parameters to the window controller or another controller, which can then apply them according to its own internal protocol, which may involve storing them in an associated memory or providing them to a higher level network controller.

2. If there is a slow degradation in a photosensor (or other signature of non-fatal issue with a sensor) causing a lower than accurate reading, the SMS can auto-correct the sensor reading before using the reading for other purposes such as input for optical device switching algorithms. In certain embodiments, the SMS applies an offset within some limit to compensate a photosensor reading. This allows for, e.g., uninterrupted occupant comfort and automatic adjustment of window tinting for improved aesthetics. Again, for example, the occupant may not realize that any of these changes to the window and/or related components or software has occurred.

3. If the system detects that a room is occupied or learns that the room is commonly occupied, and the tinting algorithm applies a tint after the glare begins, the SMS may automatically adjust the tint algorithm to start earlier, when the room is occupied or predicted to be occupied. In certain embodiments, glare is detected by a photosensor located in a room or outside a room where the glare occurs. The algorithm may employ an occupancy sensor located within the room.

4. When the system detects a difference in tinting times for different windows in the same façade, it may cause all windows to tint at the same time and, if desired, to the same tint level by auto adjusting ramping voltage parameters (if the occupant wants whole façade tinting at the same time).

5. The SMS may detect a window controller that is out of synchronization with other window controllers for a group of windows in a zone or a façade. The description of FIGS. 18A-18H contains a detailed explanation of such example. The system may then bring the window back into sync automatically by adjusting the applied switching voltage or other parameters affecting switching behavior, or by taking other remedial action within its control.

Ancillary Services

The remote monitoring system may collect and use local climate information, site lighting information, site thermal load information, and/or weather feed data for various purposes. A few examples follow.

Weather Service Rating: There are existing services that rely on weather feeds/data to sell and/or enable their services. For example, "smart sprinklers" and even landscaping companies using conventional sprinkler systems use weather data to program their watering patterns. These weather data are often local, e.g., zip code based data, and there are multiple sources of weather data. In certain embodiments, the remote monitoring system uses actual data it collects to rate what weather services predict for any given area. The system may determine which weather service is most accurate and provide that rating to services that rely on weather feeds. Any given weather service may be more accurate depending on the geographical area, e.g., weather service A might be best in San Francisco, but not as good in the Santa Clara Valley (where service B is better). The system can provide a rating service identifying which weather feed is more reliable for a given area, by collecting its actual sensor data, doing statistical analysis, and providing to customers as valuable intelligence. This information is useful for entities other than sites; examples include sprinkler companies, companies that use or control solar panels, outdoor venues, any entity that relies on the weather.

Weather Service: A SMS can collect sensor data live over large geographic areas. In certain embodiments, it provides this data to weather services so that they can more accurately provide weather data. In other words, weather services rely heavily on satellite imagery and larger sky pattern data feeds. Information from one more sites with switchable optical devices and associated sensors, widely deployed, can provide real time ground level information on sun, clouds, heat, etc. Combining these two data, more accurate weather forecasts can be achieved. This approach may be viewed as creating a sensor net across the country or other geographic region where multiple sites exist.

Consumer Behavior: Indirect data from end user patterns can be gleaned, e.g., by knowing when/how end users tint or bleach optically tintable windows in any geographical location or region. In certain embodiments, data collected by the SMS is analyzed for patterns that may have value to other consumer products vendors. For example, "heavy tinters" may indicate: aversion to sun/heat, the fact that high sun levels are present, the need for more water in a region, a region ripe for more sunglasses sales, etc. Likewise, "heavy bleachers" may indicate opposite trends that will be useful to vendors that sell, e.g.: sun lamps, tea, books, heating pads, furnaces, tanning booths, and the like.

Building Management System (BMS)

A BMS is a computer-based control system installed at a site (e.g., a building) that can monitor and control the site's mechanical and electrical equipment such as ventilation, lighting, power systems, elevators, fire systems, and security systems. In certain embodiments, a BMS may be designed or configured to communicate with a SMS to receive control signals and communicate monitored information from systems at the site. A BMS consists of hardware, including interconnections by communication channels to a computer or computers, and associated software for maintaining conditions in the site according to preferences set by the occupants, site manager, and/or SMS manager. For example, a BMS may be implemented using a local area network, such as Ethernet. The software can be based on, for example, internet protocols and/or open standards. One example of software is software from Tridium, Inc. (of Richmond, Va.). One communications protocol commonly used with a BMS is BACnet (building automation and control networks).

Platforms for communicating among one or more otherwise independent systems involved in controlling functions of buildings or other sites having switchable optical devices deployed therein are further discussed in PCT Patent Application No. PCT/US15/64555, filed Dec. 8, 2015, which is herein incorporated by reference in its entirety.

A BMS is most common in a large building, and typically functions at least to control the environment within the building. For example, a BMS may control temperature, carbon dioxide levels, and humidity within a building. Typically, there are many mechanical devices that are controlled by a BMS such as heaters, air conditioners, blowers, vents, and the like. To control the building environment, a BMS may turn on and off these various devices under defined conditions. A core function of a typical modern BMS is to maintain a comfortable environment for the building's occupants while minimizing heating and cooling costs/demand. Thus, a modern BMS is used not only to monitor and control, but also to optimize the synergy between various systems, for example, to conserve energy and lower building operation costs.

In some embodiments, a window controller is integrated with a BMS, where the window controller is configured to control one or more electrochromic windows or other tintable windows. In one embodiment, each of the one or more tintable windows includes at least one all solid state and inorganic electrochromic device. In another embodiment, each of the one or more tintable windows includes only all solid state and inorganic electrochromic devices. In another embodiment, one or more of the tintable windows are multistate electrochromic windows, as described in U.S. patent application Ser. No. 12/851,514, filed on Aug. 5, 2010, and entitled "Multipane Electrochromic Windows."

FIG. 1B depicts a schematic diagram of an embodiment of a site network 1100 having a BMS that manages a number of systems of a building, including security systems, heating/ventilation/air conditioning (HVAC), lighting of the building, power systems, elevators, fire systems, and the like. Security systems may include magnetic card access, turnstiles, solenoid driven door locks, surveillance cameras, burglar alarms, metal detectors, and the like. Fire systems may include fire alarms and fire suppression systems including a water plumbing control. Lighting systems may include interior lighting, exterior lighting, emergency warning lights, emergency exit signs, and emergency floor egress lighting. Power systems may include the main power, backup power generators, and uninterrupted power source (UPS) grids.

Also, the BMS manages a control system 1102. In this example, control system 1102 is depicted as a distributed network of window controllers including a master controller, 1103, intermediate network controllers, 1105a and 1105b, and end or leaf controllers 1110. End or leaf controllers 1110 may be similar to window controller 450 described with respect to FIGS. 4 and 5. For example, master controller 1103 may be in proximity to the BMS, and each floor of building 1101 may have one or more intermediate network controllers 1105a and 1105b, while each window of the building has its own end or leaf controller 1110. In this example, each of controllers 1110 controls a specific tintable window of building 1101. In certain embodiments, control system 1102 and/or master controller 1103 communicates with the SMS or component thereof such as a data warehouse. Intermediate network controllers 1105a and 1105b, as well as end or leaf controllers 1110 may also communicate with the SMS or a component thereof in certain embodiments.

Each of controllers 1110 can be in a separate location from the tintable window that it controls, or can be integrated into the tintable window. For simplicity, only ten tintable windows of building 1101 are depicted as controlled by control system 1102. In a typical setting there may be a large number of tintable windows in a building controlled by control system 1102. Control system 1102 need not be a distributed network of window controllers. For example, a single end controller which controls the functions of a single tintable window also falls within the scope of the embodiments disclosed herein, as described above. Advantages and features of incorporating tintable window controllers as described herein with BMSs are described below in more detail and in relation to FIG. 1B, where appropriate.

One aspect of the disclosed embodiments is a BMS including a multipurpose window controller as described herein. By incorporating feedback from a window controller, a BMS can provide, for example, enhanced: 1) environmental control, 2) energy savings, 3) security, 4) flexibility in control options, 5) improved reliability and usable life of other systems due to less reliance thereon and therefore less maintenance thereof, 6) information availability and diagnostics, 7) effective use of staff, and various combinations of these, because the tintable windows can be automatically controlled and updated as desired. In certain embodiments, any one or more of these functions can be provided by the SMS, which may communicate with windows and window controllers directly or indirectly, via a BMS or through another program or application.

In some embodiments, a BMS may not be present or a BMS may be present but may not communicate with a master controller (or other controller) or communicate at a high level with a master controller such as when a SMS communicates with the control system directly. In these embodiments, a master controller can provide, for example, enhanced: 1) environmental control, 2) energy savings, 3) flexibility in control options, 4) improved reliability and usable life of other systems due to less reliance thereon and therefore less maintenance thereof, 5) information availability and diagnostics, 6) effective use of staff, and various combinations of these, because the tintable windows can be automatically controlled and updated as desired. In these embodiments, maintenance on the BMS would not interrupt control of the tintable windows.

In certain embodiments, a BMS may be in communication with a SMS to receive control signals and other information and transmit monitored data from one or more systems in a site network. In other embodiments, the SMS may be in direct communication with the control system and/or other systems in a site network to manage the systems.

FIG. 1C depicts a block diagram of an embodiment of a site network 1200 for a site (e.g., building). As noted above, the network 1200 may employ any number of different communication protocols, including BACnet. As shown, site network 1200 includes a master controller 1205, a lighting control panel 1210, a BMS 1215, a security control system, 1220, and a user console, 1225. These different controllers and systems at the site may be used to receive input from and/or control a HVAC system 1230, lights 1235, security sensors 1240, door locks 1245, cameras 1250, and tintable windows 1255, of the site.

Lighting Control Panel for Building

Master controller 1205 may function in a similar manner as master controller 1103 described with respect to FIG. 1B. Lighting control panel 1210 may include circuits to control the interior lighting, the exterior lighting, the emergency warning lights, the emergency exit signs, and the emergency floor egress lighting. Lighting control panel 1210 also may include occupancy sensors in the rooms of the site. BMS 1215 may include a computer server that receives data from and issues commands to the other systems and controllers of site network 1200. For example, BMS 1215 may receive data from and issue commands to each of the master controller 1205, lighting control panel 1210, and security control system 1220. Security control system 1220 may include magnetic card access, turnstiles, solenoid driven door locks, surveillance cameras, burglar alarms, metal detectors, and the like. User console 1225 may be a computer terminal that can be used by the site manager to schedule operations of, control, monitor, optimize, and troubleshoot the different systems of the site. Software from Tridium, Inc. may generate visual representations of data from different systems for user console 1225.

Each of the different controls may control individual devices/apparatus. Master controller 1205 controls windows 1255. Lighting control panel 1210 controls lights 1235. BMS 1215 may control HVAC 1230. Security control system 1220 controls security sensors 1240, door locks 1245, and cameras 1250. Data may be exchanged and/or shared between all of the different devices/apparatus and controllers that are part of site network 1200.

In some cases, the systems of site network 1100 or site network 1200 may run according to daily, monthly, quarterly, or yearly schedules. For example, the lighting control system, the window control system, the HVAC, and the security system may operate on a 24 hour schedule accounting for when people are at the site during the work day. At night, the site may enter an energy savings mode, and during the day, the systems may operate in a manner that minimizes the energy consumption of the site while providing for occupant comfort. As another example, the systems may shut down or enter an energy savings mode over a holiday period.

The scheduling information may be combined with geographical information. Geographical information may include the latitude and longitude of a site such as, for example, a building. In the case of a building, geographical information also may include information about the direction that each side of the building faces. Using such information, different rooms on different sides of the building may be controlled in different manners. For example, for east facing rooms of the building in the winter, the window controller may instruct the windows to have no tint in the morning so that the room warms up due to sunlight shining in the room and the lighting control panel may instruct the lights to be dim because of the lighting from the sunlight. The west facing windows may be controllable by the occupants of the room in the morning because the tint of the windows on the west side may have no impact on energy savings. However, the modes of operation of the east facing windows and the west facing windows may switch in the evening (e.g., when the sun is setting, the west facing windows are not tinted to allow sunlight in for both heat and lighting).

Described below is an example of a site such as, for example, the building 1101 in FIG. 1B, that includes a site network, tintable windows for the exterior windows (e.g., windows separating the interior of the building from the exterior of the building), and a number of different sensors. Light from exterior windows of a building generally has an effect on the interior lighting in the building about 20 feet or about 30 feet from the windows. That is, space in a building that is more that about 20 feet or about 30 feet from an exterior window receives little light from the exterior window. Such spaces away from exterior windows in a building are lit by lighting systems of the building.

Further, the temperature within a building may be influenced by exterior light and/or the exterior temperature. For example, on a cold day and with the building being heated by a heating system, rooms closer to doors and/or windows will lose heat faster than the interior regions of the building and be cooler compared to the interior regions.

For exterior condition monitoring, the building may include exterior sensors on the roof of the building. Alternatively, the building may include an exterior sensor associated with each exterior window or an exterior sensor on each side of the building. An exterior sensor on each side of the building could track the irradiance on a side of the building as the sun changes position throughout the day.

When a window controller is integrated into a site network, outputs from exterior sensors may be input to a site network and/or SMS. In some cases, these outputs may be provided as input to a local window controller. For example, in some embodiments, output signals from any two or more exterior sensors are received. In some embodiments, only one output signal is received, and in some other embodiments, three, four, five, or more outputs are received. These output signals may be received over a site network.

In some embodiments, the output signals received by sensor(s) include a signal indicating energy or power consumption by a heating system, a cooling system, and/or lighting within the building. For example, the energy or power consumption of the heating system, the cooling system, and/or the lighting of the building may be monitored to provide the signal indicating energy or power consumption. Devices may be interfaced with or attached to the circuits and/or wiring of the building to enable this monitoring. Alternatively, the power systems in the building may be installed such that the power consumed by the heating system, a cooling system, and/or lighting for an individual room within the building or a group of rooms within the building can be monitored.

Tint instructions can be provided to change to tint of the tintable window to a determined level of tint. For example, referring to FIG. 1B, this may include master controller 1103 issuing commands to one or more intermediate network controllers 1105a and 1105b, which in turn issue commands to end controllers 1110 that control each window of the building. Master controller 1103 may issue commands based on commands received from a BMS and/or a SMS. End controllers 1100 may apply voltage and/or current to the window to drive the change in tint pursuant to the instructions.

In some embodiments, a site including tintable windows may be enrolled in or participate in a demand response program run by the utility or utilities providing power to the site. The program may be a program in which the energy consumption of the site is reduced when a peak load occurrence is expected. The utility may send out a warning signal prior to an expected peak load occurrence. For example, the warning may be sent on the day before, the morning of, or about one hour before the expected peak load occurrence. A peak load occurrence may be expected to occur on a hot summer day when cooling systems/air conditioners are drawing a large amount of power from the utility, for example. The warning signal may be received by a BMS of a building, by the SMS, or by window controllers configured to control the tintable windows in the building. This warning signal can be an override mechanism that disengages the tinting control. The BMS or SMS can then instruct the window controller(s) to transition the appropriate electrochromic device in the tintable windows to a dark tint level to aid in reducing the power draw of the cooling systems in the building at the time when the peak load is expected.

In some embodiments, tintable windows (e.g., electrochromic windows) of windows of a site may be grouped into zones with tintable windows in a zone being instructed in a similar manner. For example, the exterior windows of the site (i.e., windows separating the interior from the exterior of a building), may be grouped into zones, with tintable windows in a zone being instructed in a similar manner. For example, groups of tintable windows on different floors of the building or different sides of a building may be in different zones. In one case, on the first floor of the building, all of the east facing tintable windows may be in zone 1, all of the south facing tintable windows may be in zone 2, all of the west facing tintable windows may be in zone 3, and all of the north facing tintable windows may be in zone 4. In another case, all of the tintable windows on the first floor of the building may be in zone 1, all of the tintable windows on the second floor may be in zone 2, and all of the tintable windows on the third floor may be in zone 3. In yet another case, all of the east facing tintable windows may be in zone 1, all of the south facing tintable windows may be in zone 2, all of the west facing tintable windows may be in zone 3, and all of the north facing tintable windows may be in zone 4. As yet another case, east facing tintable windows on one floor could be divided into different zones. Any number of tintable windows on the same side and/or different sides and/or different floors of the building may be assigned to a zone.

In some embodiments, tintable windows in a zone may be controlled by the same window controller. In some other embodiments, tintable windows in a zone may be controlled by different window controllers, but the window controllers may all receive the same output signals from sensors and use the same function or lookup table to determine the level of tint for the windows in a zone.

In some embodiments, tintable windows in a zone may be controlled by a window controller or controllers that receive an output signal from a transmissivity sensor. In some embodiments, the transmissivity sensor may be mounted proximate the windows in a zone. For example, the transmissivity sensor may be mounted in or on a frame containing an IGU (e.g., mounted in or on a mullion, the horizontal sash of a frame) included in the zone. In some other embodiments, tintable windows in a zone that includes the windows on a single side of the building may be controlled by a window controller or controllers that receive an output signal from a transmissivity sensor.

In some embodiments, a sensor (e.g., photosensor) may provide an output signal to a window controller to control the tintable windows of a first zone (e.g., a master control zone). The window controller may also control the tintable windows in a second zone (e.g., a slave control zone) in the same manner as the first zone. In some other embodiments, another window controller may control the tintable windows in the second zone in the same manner as the first zone.

In some embodiments, a site manager, occupants of rooms in the second zone, or other person may manually instruct (using a tint or clear command or a command from a user console of a BMS, for example) the tintable windows in the second zone (i.e., the slave control zone) to enter a tint level such as a colored state (level) or a clear state. In some embodiments, when the tint level of the windows in the second zone is overridden with such a manual command, the tintable windows in the first zone (i.e., the master control zone) remain under control of the window controller receiving output from the transmissivity sensor. The second zone may remain in a manual command mode for a period of time and then revert back to be under control of the window controller receiving output from the transmissivity sensor. For example, the second zone may stay in a manual mode for one hour after receiving an override command, and then may revert back to be under control of the window controller receiving output from the transmissivity sensor.

In some embodiments, a site manager, occupants of rooms in the first zone, or other person may manually instruct (using a tint command or a command from a user console of a BMS, for example) the windows in the first zone (i.e., the master control zone) to enter a tint level such as a colored state or a clear state. In some embodiments, when the tint level of the windows in the first zone is overridden with such a manual command, the tintable windows in the second zone (i.e., the slave control zone) remain under control of the window controller receiving outputs from the exterior sensor. The first zone may remain in a manual command mode for a period of time and then revert back to be under control of window controller receiving output from the transmissivity sensor. For example, the first zone may stay in a manual mode for one hour after receiving an override command, and then may revert back to be under control of the window controller receiving output from the transmissivity sensor. In some other embodiments, the tintable windows in the second zone may remain in the tint level that they are in when the manual override for the first zone is received. The first zone may remain in a manual command mode for a period of time and then both the first zone and the second zone may revert back to be under control of the window controller receiving output from the transmissivity sensor.

Any of the methods described herein of control of a tintable window, regardless of whether the window controller is a standalone window controller or is interfaced with a site network, may be used control the tint of a tintable window.

Wireless or Wired Communication

In some embodiments, window controllers described herein include components for wired or wireless communication between the window controller, sensors, and separate communication nodes. Wireless or wired communications may be accomplished with a communication interface that interfaces directly with the window controller. Such interface could be native to the microprocessor or provided via additional circuitry enabling these functions. In addition, other systems of a site network may include components for wired or wireless communication between different system elements.

A separate communication node for wireless communications can be, for example, another wireless window controller, an end, intermediate network, or master controller, a remote control device, a BMS, or a SMS. Wireless communication may be used in the window controller for at least one of the following operations: programming and/or operating the tintable window 505 (see FIG. 5), collecting data from the tintable window 505 from the various sensors and protocols described herein, and using the tintable window 505 as a relay point for wireless communication. Data collected from tintable windows 505 also may include count data such as number of times an EC device has been activated, efficiency of the EC device over time, and the like. These wireless communication features are described in more detail below.

In one embodiment, wireless communication is used to operate the associated tintable windows 505, for example, via an infrared (IR), and/or radio frequency (RF) signal. In certain embodiments, the controller will include a wireless protocol chip, such as Bluetooth, EnOcean, WiFi, Zigbee, and the like. Window controllers may also have wireless communication via a network. Input to the window controller can be manually input by an end user at a wall switch, either directly or via wireless communication, or the input can be from a BMS of a site of which the tintable window is a component or from a SMS managing system.

In one embodiment, when the window controller is part of a distributed network of controllers, wireless communication is used to transfer data to and from each of a plurality of tintable windows via the distributed network of controllers, each having wireless communication components. For example, referring again to FIG. 1B, master controller 1103, communicates wirelessly with each of intermediate network controllers 1105a and 1105b, which in turn communicate wirelessly with end controllers 1110, each associated with a tintable window. Master controller 1103 may also communicate wirelessly with a BMS or with a SMS. In one embodiment, at least one level of communication in the window controller is performed wirelessly.

In some embodiments, more than one mode of wireless communication is used in the window controller distributed network. For example, a master controller may communicate wirelessly to intermediate controllers via WiFi or Zigbee, while the intermediate controllers communicate with end controllers via Bluetooth, Zigbee, EnOcean, or other protocol. In another example, window controllers have redundant wireless communication systems for flexibility in end user choices for wireless communication.

Example of System for Controlling Functions of Tintable Windows

FIG. 1D is a block diagram of components of a system 1400 for controlling functions (e.g., transitioning to different tint levels) of one or more tintable windows at a site (e.g., building 1101 shown in FIG. 1B), according to embodiments. System 1400 may be one of the systems managed by a SMS through a BMS (e.g., BMS 1100 shown in FIG. 1B) or may be managed directly by a SMS and/or operate independently of a BMS.

System 1400 includes a control system 1402 that can send control signals to the tintable windows to control its functions. System 1400 also includes a network 1410 in electronic communication with master window controller 1402. Control logic and instructions for controlling functions of the tintable window(s), and/or sensor data may be communicated to the control system 1402 through the network 1410. Network 1410 can be a wired or a wireless network (e.g., a cloud network). In some embodiments, network 1410 may be in communication with a BMS to allow the BMS to send instructions for controlling the tintable window(s) through network 1410 to the tintable window(s) in a building. In some cases, the BMS may be in communication with the SMS to receive instructions for controlling the tintable window(s) from the SMS. In other embodiments, network 1410 may be in communication with a SMS to allow the SMS to send instructions for controlling the tintable window(s) through network 1410 to the tintable window(s) in a building. In certain embodiments, the control system 1402 and/or the master controller 1403 are designed or configured to communicate with the SMS or component thereof such as a data warehouse.

System 1400 also includes EC devices 400 of the tintable windows (not shown) and wall switches 1490, which are both in electronic communication with control system 1402. In this illustrated example, control system 1402 can send control signals to EC device(s) to control the tint level of the tintable windows having the EC device(s). Each wall switch 1490 is also in communication with EC device(s) and control system 1402. An end user (e.g., occupant of a room having the tintable window) can use the wall switch 1490 to control the tint level and other functions of the tintable window having the EC device(s).

In FIG. 1D, control system 1402 is depicted as a distributed network of window controllers including a master controller 1403, a plurality of intermediate network controllers 1405 in communication with the master controller 1403, and multiple pluralities of end or leaf window controllers 1110. Each plurality of end or leaf window controllers 1110 is in communication with a single intermediate network controller 1405. Although control system 1402 is illustrated as a distributed network of window controllers, control system 1402 could also be a single window controller controlling the functions of a single tintable window in other embodiments. The components of the system 1400 in FIG. 1D may be similar in some respects to components described with respect to FIG. 1B. For example, master controller 1403 may be similar to master controller 1103 and intermediate network controllers 1405 may be similar to intermediate network controllers 1105. Each of the window controllers in the distributed network of FIG. 1D may include a processor (e.g., microprocessor) and a computer readable medium in electrical communication with the processor.

In FIG. 1D, each leaf or end window controller 1110 is in communication with EC device(s) 400 of a single tintable window to control the tint level of that tintable window in the building. In the case of an IGU, the leaf or end window controller 1110 may be in communication with EC devices 400 on multiple lites of the IGU to control the tint level of the IGU. In other embodiments, each leaf or end window controller 1110 may be in communication with a plurality of tintable windows. The leaf or end window controller 1110 may be integrated into the tintable window or may be separate from the tintable window that it controls. Leaf and end window controllers 1110 in FIG. 1D may be similar to the end or leaf controllers 1110 in FIG. 1B and/or may also be similar to window controller 450 described with respect to FIG. 5.

Each wall switch 1490 can be operated by an end user (e.g., occupant of the room) to control the tint level and other functions of the tintable window in communication with the wall switch 1490. The end user can operate the wall switch 1490 to communicate control signals to the EC devices 400 in the associated tintable window. These signals from the wall switch 1490 may override signals from control system 1402 in some cases. In other cases (e.g., high demand cases), control signals from the control system 1402 may override the control signals from wall switch 1490. Each wall switch 1490 is also in communication with the leaf or end window controller 1110 to send information about the control signals (e.g. time, date, tint level requested, etc.) sent from wall switch 1490 back to control system 1402. In some cases, wall switches 1490 may be manually operated. In other cases, wall switches 1490 may be wirelessly controlled by the end user using a remote device (e.g., cell phone, tablet, etc.) sending wireless communications with the control signals, for example, using infrared (IR), and/or radio frequency (RF) signals. In some cases, wall switches 1490 may include a wireless protocol chip, such as Bluetooth, EnOcean, WiFi, Zigbee, and the like. Although wall switches 1490 depicted in FIG. 1D are located on the wall(s), other embodiments of system 1400 may have switches located elsewhere in the room.

Wireless communication between, for example, master and/or intermediate window controllers and end window controllers offers the advantage of obviating the installation of hard communication lines. This is also true for wireless communication between window controllers and BMS. In one aspect, wireless communication in these roles is useful for data transfer to and from electrochromic windows for operating the window and providing data to, for example, a BMS for optimizing the environment and energy savings in a building. Window location data as well as feedback from sensors are synergized for such optimization. For example, granular level (window-by-window) microclimate information is fed to a BMS in order to optimize the building's various environments.

Figure 1E:
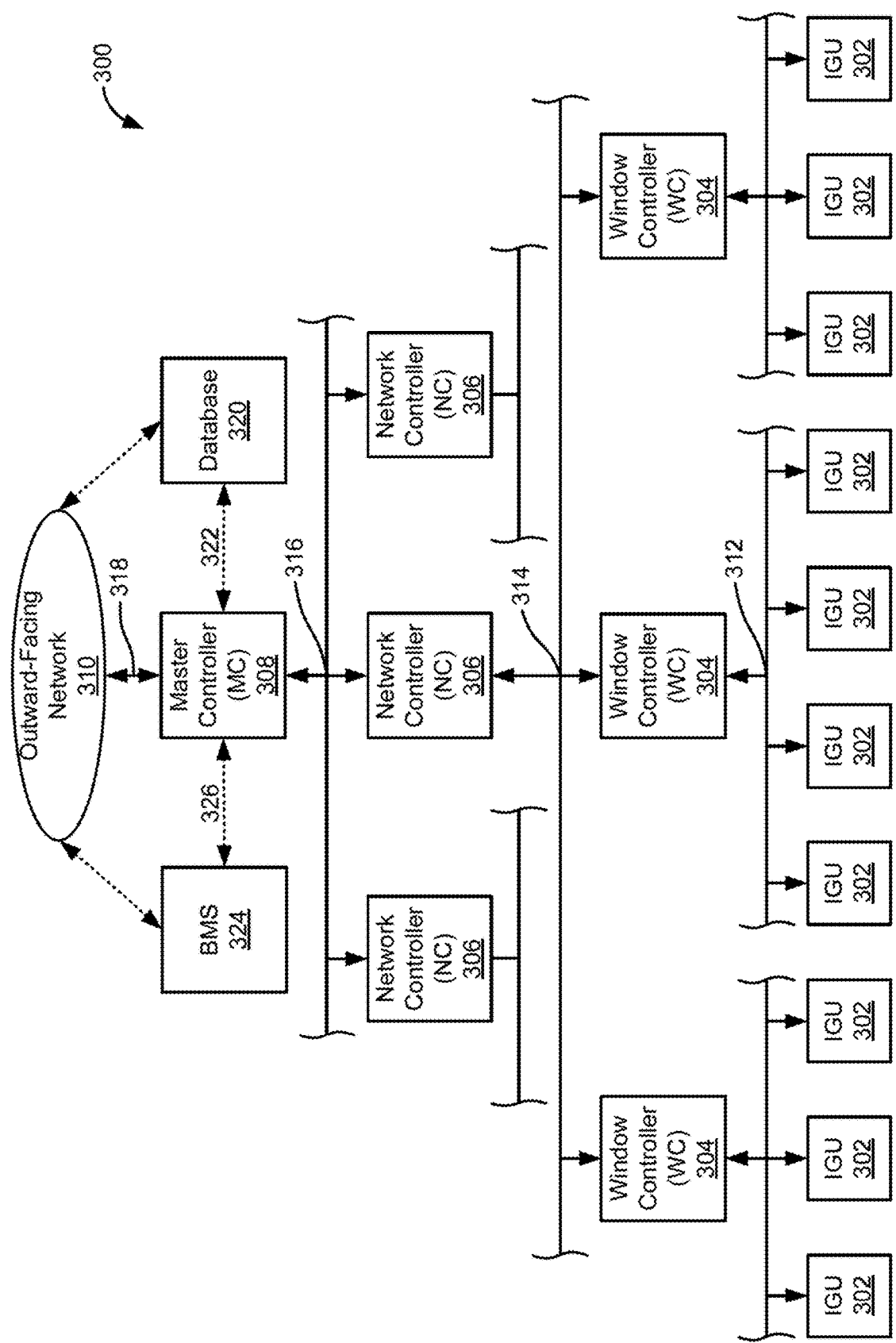
FIG. 1E is another block diagram of components of a system for controlling functions of one or more tintable windows of a building.

FIG. 1E shows a block diagram of an example network system, 300, operable to control a plurality of IGUs 302 in accordance with some implementations. One primary function of the network system 300 is controlling the optical states of the electrochromic devices (ECDs) or other optically-switchable devices within the IGUs 302. In some implementations, one or more of the windows 302 can be multi-zoned windows, for example, where each window includes two or more independently controllable ECDs or zones. In various implementations, the network system 300 is operable to control the electrical characteristics of the power signals provided to the IGUs 302. For example, the network system 300 can generate and communicate tinting instructions (also referred to herein as "tint commands") to control voltages applied to the ECDs within the IGUs 302.

In some implementations, another function of the network system 300 is to acquire status information from the IGUs 302 ("information" is used interchangeably with "data"). For example, the status information for a given IGU can include an identification of, or information about, a current tint state of the ECD(s) within the IGU. The network system 300 also can be operable to acquire data from various sensors, such as temperature sensors, photosensors (also referred to herein as light sensors), humidity sensors, air flow sensors, or occupancy sensors, whether integrated on or within the IGUs 302 or located at various other positions in, on or around the building.

The network system 300 can include any suitable number of distributed controllers having various capabilities or functions. In some implementations, the functions and arrangements of the various controllers are defined hierarchically. For example, the network system 300 includes a plurality of distributed window controllers (WCs) 304, a plurality of network controllers (NCs) 306, and a master controller (MC) 308. In some implementations, the MC 308 can communicate with and control tens or hundreds of NCs 306. In various implementations, the MC 308 issues high level instructions to the NCs 306 over one or more wired or wireless links 316 (hereinafter collectively referred to as "link 316"). The instructions can include, for example, tint commands for causing transitions in the optical states of the IGUs 302 controlled by the respective NCs 306. Each NC 306 can, in turn, communicate with and control a number of WCs 304 over one or more wired or wireless links 314 (hereinafter collectively referred to as "link 314"). For example, each NC 306 can control tens or hundreds of the WCs 304. Each WC 304 can, in turn, communicate with, drive or otherwise control one or more respective IGUs 302 over one or more wired or wireless links 312 (hereinafter collectively referred to as "link 312").

The MC 308 can issue communications including tint commands, status request commands, data (for example, sensor data) request commands or other instructions. In some implementations, the MC 308 can issue such communications periodically, at certain predefined times of day (which may change based on the day of week or year), or based on the detection of particular events, conditions or combinations of events or conditions (for example, as determined by acquired sensor data or based on the receipt of a request initiated by a user or by an application or a combination of such sensor data and such a request). In some implementations, when the MC 308 determines to cause a tint state change in a set of one or more IGUs 302, the MC 308 generates or selects a tint value corresponding to the desired tint state. In some implementations, the set of IGUs 302 is associated with a first protocol identifier (ID) (for example, a BACnet ID). The MC 308 then generates and transmits a communication—referred to herein as a "primary tint command"—including the tint value and the first protocol ID over the link 316 via a first communication protocol (for example, a BACnet compatible protocol). In some implementations, the MC 308 addresses the primary tint command to the particular NC 306 that controls the particular one or more WCs 304 that, in turn, control the set of IGUs 302 to be transitioned. The NC 306 receives the primary tint command including the tint value and the first protocol ID and maps the first protocol ID to one or more second protocol IDs. In some implementations, each of the second protocol IDs identifies a corresponding one of the WCs 304. The NC 306 subsequently transmits a secondary tint command including the tint value to each of the identified WCs 304 over the link 314 via a second communication protocol. In some implementations, each of the WCs 304 that receives the secondary tint command then selects a voltage or current profile from an internal memory based on the tint value to drive its respectively connected IGUs 302 to a tint state consistent with the tint value. Each of the WCs 304 then generates and provides voltage or current signals over the link 312 to its respectively connected IGUs 302 to apply the voltage or current profile.

In some implementations, the various IGUs 302 can be advantageously grouped into zones of EC windows, each of which zones includes a subset of the IGUs 302. In some implementations, each zone of IGUs 302 is controlled by one or more respective NCs 306 and one or more respective WCs 304 controlled by these NCs 306. In some more specific implementations, each zone can be controlled by a single NC 306 and two or more WCs 304 controlled by the single NC 306. Said another way, a zone can represent a logical grouping of the IGUs 302. For example, each zone may correspond to a set of IGUs 302 in a specific location or area of the building that are driven together based on their location. As a more specific example, consider a building having four faces or sides: a North face, a South face, an East Face and a West Face. Consider also that the building has ten floors. In such a didactic example, each zone can correspond to the set of electrochromic windows 100 on a particular floor and on a particular one of the four faces. Additionally or alternatively, each zone may correspond to a set of IGUs 302 that share one or more physical characteristics (for example, device parameters such as size or age). In some other implementations, a zone of IGUs 302 can be grouped based on one or more non-physical characteristics such as, for example, a security designation or a business hierarchy (for example, IGUs 302 bounding managers' offices can be grouped in one or more zones while IGUs 302 bounding non-managers' offices can be grouped in one or more different zones).

In some such implementations, each NC 306 can address all of the IGUs 302 in each of one or more respective zones. For example, the MC 308 can issue a primary tint command to the NC 306 that controls a target zone. The primary tint command can include an abstract identification of the target zone (hereinafter also referred to as a "zone ID"). In some such implementations, the zone ID can be a first protocol ID such as that just described in the example above. In such cases, the NC 306 receives the primary tint command including the tint value and the zone ID and maps the zone ID to the second protocol IDs associated with the WCs 304 within the zone. In some other implementations, the zone ID can be a higher level abstraction than the first protocol IDs. In such cases, the NC 306 can first map the zone ID to one or more first protocol IDs, and subsequently map the first protocol IDs to the second protocol IDs.

Further details related to the various types of controllers are described in Provisional U.S. Patent Application No. 62/248,181, filed Oct. 29, 2015, which is herein incorporated by reference in its entirety.

Example Switching Algorithm

Figure 2:
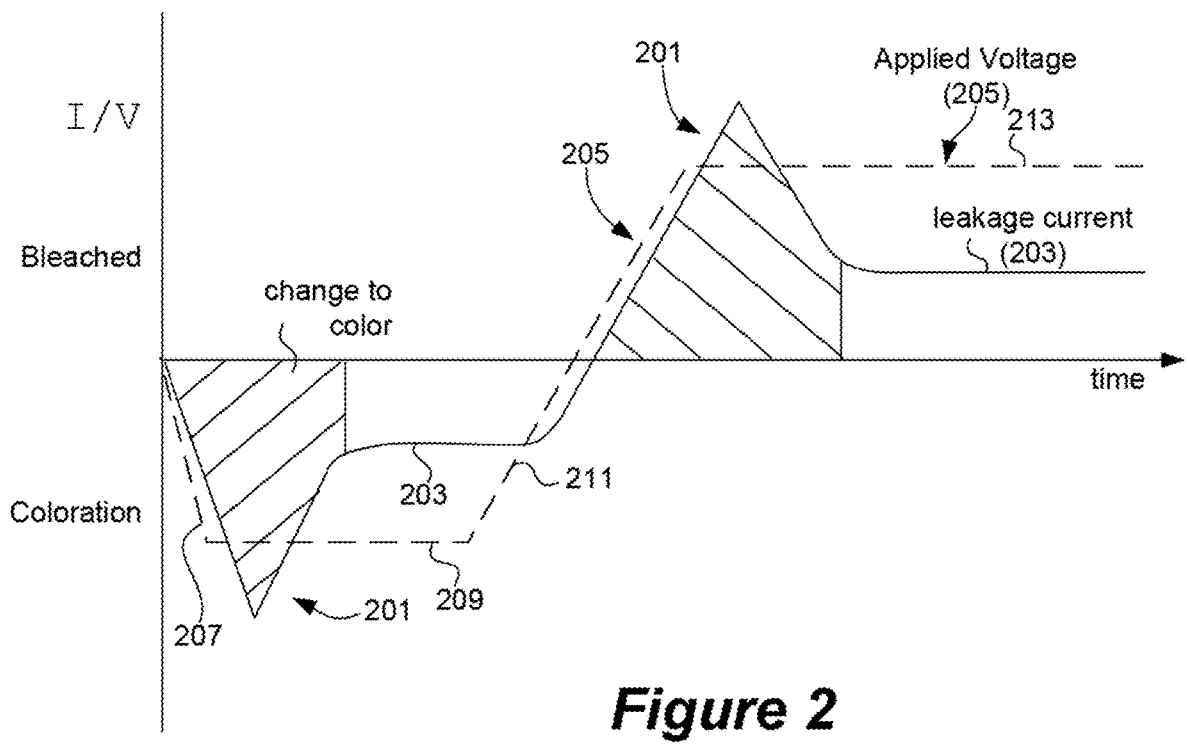
FIG. 2 is a graph depicting voltage and current profiles associated with driving an electrochromic device from bleached to colored and from colored to bleached.

To speed along optical transitions, the applied voltage is initially provided at a magnitude greater than that required to hold the device at a particular optical state in equilibrium. This approach is illustrated in FIGS. 2 and 3. FIG. 2 is a graph depicting voltage and current profiles associated with driving an electrochromic device from bleached to colored and from colored to bleached. FIG. 3 is a graph depicting certain voltage and current profiles associated with driving an electrochromic device from bleached to colored.

FIG. 2 shows a complete current profile and voltage profile for an electrochromic device employing a simple voltage control algorithm to cause an optical state transition cycle (coloration followed by bleaching) of an electrochromic device. In the graph, total current density (I) is represented as a function of time. As mentioned, the total current density is a combination of the ionic current density associated with an electrochromic transition and electronic leakage current between the electrochemically active electrodes. Many different types electrochomic device will have the depicted current profile. In one example, a cathodic electrochromic material such as tungsten oxide is used in conjunction with an anodic electrochromic material such as nickel tungsten oxide in counter electrode. In such devices, negative currents indicate coloration of the device. In one example, lithium ions flow from a nickel tungsten oxide anodically coloring electrochromic electrode into a tungsten oxide cathodically coloring electrochromic electrode. Correspondingly, electrons flow into the tungsten oxide electrode to compensate for the positively charged incoming lithium ions. Therefore, the voltage and current are shown to have a negative value.

The depicted profile results from ramping up the voltage to a set level and then holding the voltage to maintain the optical state. The current peaks 201 are associated with changes in optical state, i.e., coloration and bleaching. Specifically, the current peaks represent delivery of the ionic charge needed to color or bleach the device. Mathematically, the shaded area under the peak represents the total charge required to color or bleach the device. The portions of the curve after the initial current spikes (portions 203) represent electronic leakage current while the device is in the new optical state.

In the figure, a voltage profile 205 is superimposed on the current curve. The voltage profile follows the sequence: negative ramp (207), negative hold (209), positive ramp (211), and positive hold (213). Note that the voltage remains constant after reaching its maximum magnitude and during the length of time that the device remains in its defined optical state. Voltage ramp 207 drives the device to its new the colored state and voltage hold 209 maintains the device in the colored state until voltage ramp 211 in the opposite direction drives the transition from colored to bleached states. In some switching algorithms, a current cap is imposed. That is, the current is not permitted to exceed a defined level in order to prevent damaging the device (e.g. driving ion movement through the material layers too quickly can physically damage the material layers). The coloration speed is a function of not only the applied voltage, but also the temperature and the voltage ramping rate.

FIG. 3 illustrates a voltage control profile in accordance with certain embodiments. In the depicted embodiment, a voltage control profile is employed to drive the transition from a bleached state to a colored state (or to an intermediate state). To drive an electrochromic device in the reverse direction, from a colored state to a bleached state (or from a more colored to less colored state), a similar but inverted profile is used. In some embodiments, the voltage control profile for going from colored to bleached is a mirror image of the one depicted in FIG. 3.

The voltage values depicted in FIG. 3 represent the applied voltage (Vapp) values. The applied voltage profile is shown by the dashed line. For contrast, the current density in the device is shown by the solid line. In the depicted profile, $V_{app}$ includes four components: a ramp to drive component 303, which initiates the transition, a $V_{drive}$ component 313, which continues to drive the transition, a ramp to hold component 315, and a $V_{hold}$ component 317. The ramp components are implemented as variations in $V_{app}$ and the $V_{drive}$ and $V_{hold}$ components provide constant or substantially constant Vapp magnitudes.

The ramp to drive component is characterized by a ramp rate (increasing magnitude) and a magnitude of $V_{drive}$. When the magnitude of the applied voltage reaches $V_{drive}$, the ramp to drive component is completed. The $V_{drive}$ component is characterized by the value of $V_{drive}$ as well as the duration of $V_{drive}$. The magnitude of $V_{drive}$ may be chosen to maintain $V_{eff}$ with a safe but effective range over the entire face of the electrochromic device as described above.

The ramp to hold component is characterized by a voltage ramp rate (decreasing magnitude) and the value of $V_{hold}$ (or optionally the difference between $V_{drive}$ and $V_{hold}$). $V_{app}$ drops according to the ramp rate until the value of $V_{hold}$ is reached. The $V_{hold}$ component is characterized by the magnitude of $V_{hold}$ and the duration of $V_{hold}$. Actually, the duration of Vhold is typically governed by the length of time that the device is held in the colored state (or conversely in the bleached state). Unlike the ramp to drive, $V_{drive}$, and ramp to hold components, the $V_{hold}$ component has an arbitrary length, which is independent of the physics of the optical transition of the device.

Each type of electrochromic device will have its own characteristic components of the voltage profile for driving the optical transition. For example, a relatively large device and/or one with a more resistive conductive layer will require a higher value of $V_{drive}$ and possibly a higher ramp rate in the ramp to drive component. Larger devices may also require higher values of $V_{hold}$. U.S. patent application Ser. No. 13/449,251, filed Apr. 17, 2012, and incorporated herein by reference, discloses controllers and associated algorithms for driving optical transitions over a wide range of conditions. As explained therein, each of the components of an applied voltage profile (ramp to drive, $V_{drive}$, ramp to hold, and $V_{hold}$, herein) may be independently controlled to address real-time conditions such as current temperature, current level of transmissivity, etc. In some embodiments, the values of each component of the applied voltage profile is set for a particular electrochromic device (having its own bus bar separation, resistivity, etc.) and does vary based on current conditions. In other words, in such embodiments, the voltage profile does not take into account feedback such as temperature, current density, and the like.

As indicated, all voltage values shown in the voltage transition profile of FIG. 3 correspond to the Vapp values described above. They do not correspond to the Veff values described above. In other words, the voltage values depicted in FIG. 3 are representative of the voltage difference between the bus bars of opposite polarity on the electrochromic device.

In certain embodiments, the ramp to drive component of the voltage profile is chosen to safely but rapidly induce ionic current to flow between the electrochromic and counter electrodes. As shown in FIG. 3, the current in the device follows the profile of the ramp to drive voltage component until the ramp to drive portion of the profile ends and the $V_{drive}$ portion begins. See current component 301 in FIG. 3. Safe levels of current and voltage can be determined empirically or based on other feedback. U.S. Pat. No. 8,254,013, filed Mar. 16, 2011, issued Aug. 28, 2012 and incorporated herein by reference, presents examples of algorithms for maintaining safe current levels during electrochromic device transitions.

In certain embodiments, the value of $V_{drive}$ is chosen based on the considerations described above. Particularly, it is chosen so that the value of $V_{eff}$ over the entire surface of the electrochromic device remains within a range that effectively and safely transitions large electrochromic devices. The duration of $V_{drive}$ can be chosen based on various considerations. One of these ensures that the drive potential is held for a period sufficient to cause the substantial coloration of the device. For this purpose, the duration of $V_{drive}$ may be determined empirically, by monitoring the optical density of the device as a function of the length of time that $V_{drive}$ remains in place. In some embodiments, the duration of $V_{drive}$ is set to a specified time period. In another embodiment, the duration of $V_{drive}$ is set to correspond to a desired amount of ionic charge being passed. As shown, the current ramps down during $V_{drive}$. See current segment 307.

Another consideration is the reduction in current density in the device as the ionic current decays as a consequence of the available lithium ions completing their journey from the anodic coloring electrode to the cathodic coloring electrode (or counter electrode) during the optical transition. When the transition is complete, the only current flowing across device is leakage current through the ion conducting layer. As a consequence, the ohmic drop in potential across the face of the device decreases and the local values of $V_{eff}$ increase. These increased values of $V_{eff}$ can damage or degrade the device if the applied voltage is not reduced. Thus, another consideration in determining the duration of $V_{drive}$ is the goal of reducing the level of $V_{eff}$ associated with leakage current. By dropping the applied voltage from $V_{drive}$ to $V_{hold}$, not only is $V_{eff}$ reduced on the face of the device but leakage current decreases as well. As shown in FIG. 3, the device current transitions in a segment 305 during the ramp to hold component. The current settles to a stable leakage current 309 during $V_{hold}$.

Methods for controlling optical transitions on optically switchable devices are further described in the following patent applications, each of which is herein incorporated by reference in its entirety: PCT Application No. PCT/US14/43514, filed Jun. 20, 2014; U.S. Provisional Application No. 62/239,776, filed Oct. 9, 2015; and U.S. application Ser. No. 13/449,248, filed Apr. 17, 2012.

Any of the parameters described in relation to FIGS. 2 and 3 (including, but not limited to, the ramp to drive rate, the drive voltage, the ramp to hold rate, and the hold voltage) can be updated by a SMS. Such updates may be made for any number of reasons, as described above. Typically, these parameters are set for a particular optically switchable device based on the size of the glass (or other substrate), the distance between bus bars on the device, the shape of the glass and layout of the bus bars, the suite of desired tint states (e.g., the desired level of transmissivity at each available tint state), and the generation/technology of glass that is used. These parameters may also vary based on e.g., the production lot, glass temperature, and other factors. If and when there is a desire to update these parameters, the SMS can easily do so.

Figure 4:
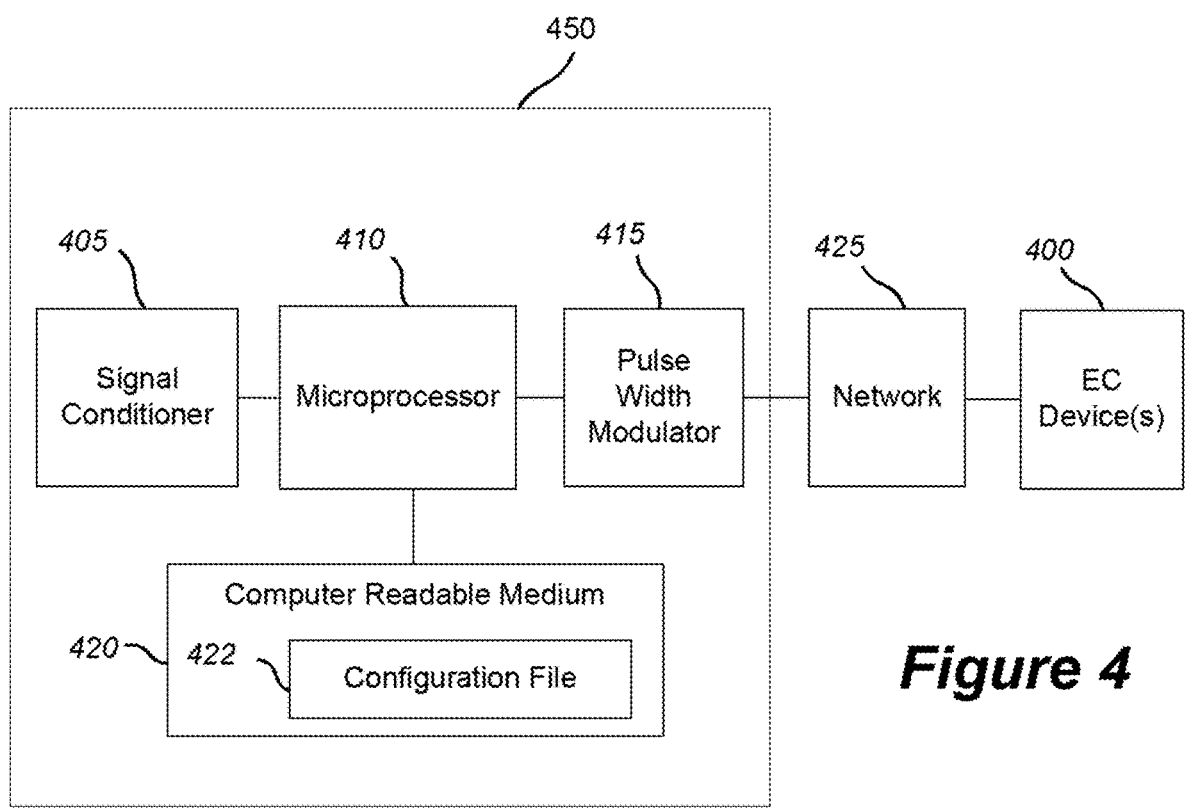
FIG. 4 depicts a simplified block diagram of components of a window controller.

FIG. 4 depicts a block diagram of some components of a window controller 450 and other components of a window controller system of disclosed embodiments. FIG. 4 is a simplified block diagram of a window controller, and more detail regarding window controllers can be found in U.S. patent application Ser. Nos. 13/449,248 and 13/449,251, both naming Stephen Brown as inventor, both titled "CONTROLLER FOR OPTICALLY-SWITCHABLE WINDOWS," and both filed on Apr. 17, 2012, and in U.S. patent Ser. No. 13/449,235, titled "CONTROLLING TRANSITIONS IN OPTICALLY SWITCHABLE DEVICES," naming Stephen Brown et al. as inventors and filed on Apr. 17, 2012, all of which are hereby incorporated by reference in their entireties. Window controllers are further discussed in U.S. Provisional Patent Application No. 62/248,181, filed Oct. 29, 2015, which is herein incorporated by reference in its entirety.

In FIG. 4, the illustrated components of the window controller 450 include a window controller 450 having a microprocessor 410 or other processor, a pulse width modulator (PWM) 415, a signal conditioning module 405, and a computer readable medium 420 (e.g., memory) having a configuration file 422. Window controller 450 is in electronic communication with one or more electrochromic devices 400 in an electrochromic window through network 425 (wired or wireless) to send instructions to the one or more electrochromic devices 400. In some embodiments, the window controller 450 may be a local window controller in communication through a network (wired or wireless) to a control system including, e.g., a network controller and/or master controller.

In disclosed embodiments, a site may be a building having at least one room having an electrochromic window between the exterior and interior of a building. One or more sensors may be located to the exterior of the building and/or inside the room. In embodiments, the output from the one or more sensors may be input to the signal conditioning module 405 of the window controller 450. In some cases, the output from the one or more sensors may be input to a BMS and/or to a SMS. Although the sensors of depicted embodiments are shown as located on the outside vertical wall of the building, this is for the sake of simplicity, and the sensors may be in other locations, such as inside the room or on other surfaces to the exterior, as well. In some cases, two or more sensors may be used to measure the same input, which can provide redundancy in case one sensor fails or has an otherwise erroneous reading.

Room Sensors and Window Controller

Figure 5:
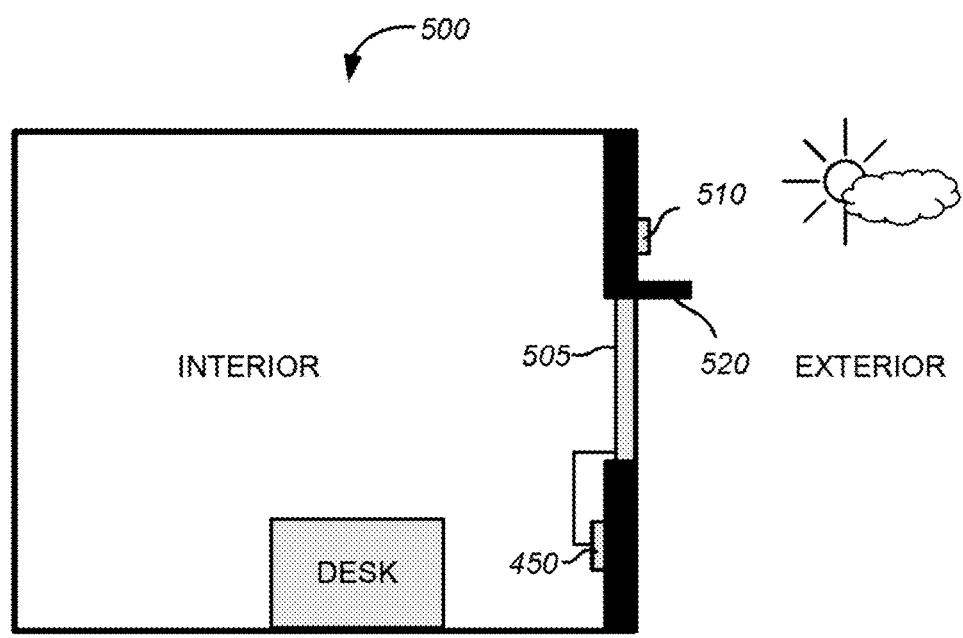
FIG. 5 depicts a schematic diagram of a room including a tintable window and at least one sensor.

FIG. 5 depicts a schematic diagram of a room 500 having a tintable window 505 with at least one electrochromic device. The tintable window 505 is located between the exterior and the interior of a building, which includes the room 500. The room 500 also includes a window controller 450 connected to and configured to control the tint level of the tintable window 505. An exterior sensor 510 is located on a vertical surface in the exterior of the building. In other embodiments, an interior sensor may also be used to measure the ambient light in room 500. In yet other embodiments, an occupant sensor may also be used to determine when an occupant is in the room 500.

Exterior sensor 510 is a device, such as a photosensor, that is able to detect radiant light incident upon the device flowing from a light source such as the sun or from light reflected to the sensor from a surface, particles in the atmosphere, clouds, etc. The exterior sensor 510 may generate a signal in the form of electrical current that results from the photoelectric effect and the signal may be a function of the light incident on the sensor 510. In some cases, the device may detect radiant light in terms of irradiance in units of watts/m$^2$ or other similar units. In other cases, the device may detect light in the visible range of wavelengths in units of foot candles or similar units. In many cases, there is a linear relationship between these values of irradiance and visible light.

Irradiance values from sunlight can be predicted based on the time of day and time of year as the angle at which sunlight strikes the earth changes. Exterior sensor 510 can detect radiant light in real-time, which accounts for reflected and obstructed light due to buildings, changes in weather (e.g., clouds), etc. For example, on cloudy days, sunlight would be blocked by the clouds and the radiant light detected by an exterior sensor 510 would be lower than on cloudless days.

In some embodiments, there may be one or more exterior sensors 510 associated with a single tintable window 505. Output from the one or more exterior sensors 510 could be compared to one another to determine, for example, if one of exterior sensors 510 is shaded by an object, such as by a bird that landed on exterior sensor 510. In some cases, it may be desirable to use relatively few sensors in a building because some sensors can be unreliable and/or expensive. In certain implementations, a single sensor or a few sensors may be employed to determine the current level of radiant light from the sun impinging on the building or perhaps one side of the building. A cloud may pass in front of the sun or a construction vehicle may park in front of the setting sun. These will result in deviations from the amount of radiant light from the sun calculated to normally impinge on the building.

Exterior sensor 510 may be a type of photosensor. For example, exterior sensor 510 may be a charge coupled device (CCD), photodiode, photoresistor, or photovoltaic cell. One of ordinary skill in the art would appreciate that future developments in photosensor and other sensor technology would also work, as they measure light intensity and provide an electrical output representative of the light level.

In some embodiments, output from exterior sensor 510 may be input to a BMS and/or SMS. The input may be in the form of a voltage signal. The BMS or SMS may process the input and pass an output signal with tinting instructions to the window controller 450 directly or through a control system 1102 (shown in FIG. 1B). The tint level of the tintable window 505 may be determined based on various configuration information, override values. Window controller 450 then instructs the PWM 415, to apply a voltage and/or current to tintable window 505 to transition to the desired tint level.

In disclosed embodiments, window controller 450 can instruct the PWM 415, to apply a voltage and/or current to tintable window 505 to transition it to any one of four or more different tint levels. In disclosed embodiments, tintable window 505 can be transitioned to at least eight different tint levels described as: 0 (lightest), 5, 10, 15, 20, 25, 30, and 35 (darkest). The tint levels may linearly correspond to visual transmittance values and solar gain heat coefficient (SGHC) values of light transmitted through the tintable window 505. For example, using the above eight tint levels, the lightest tint level of 0 may correspond to an SGHC value of 0.80, the tint level of 5 may correspond to an SGHC value of 0.70, the tint level of 10 may correspond to an SGHC value of 0.60, the tint level of 15 may correspond to an SGHC value of 0.50, the tint level of 20 may correspond to an SGHC value of 0.40, the tint level of 25 may correspond to an SGHC value of 0.30, the tint level of 30 may correspond to an SGHC value of 0.20, and the tint level of 35 (darkest) may correspond to an SGHC value of 0.10.

The BMS or SMS in communication with the window controller 450 or a control system in communication with the window controller 450 may employ any control logic to determine a desired tint level based on signals from the exterior sensor 510 and/or other input. The window controller 415 can instruct the PWM 415 to apply a voltage and/or current to electrochromic window 505 to transition it to the desired tint level.

As mentioned above, the SMS may be used to generate a fingerprint for any sensors installed in connection with the network of optically switchable devices. The fingerprint can include all relevant information related to the sensors including, but not limited to, ID numbers for the sensors, a description of the sensors, any IN data related to the sensors, any default settings or calibration data for the sensors, location/layout information related to the sensors, etc. An initial fingerprint may be evaluated when a sensor or network is initially installed, in order to get a baseline reading against which a future fingerprint can be compared. Comparison of the relevant information within fingerprints taken at different times can be used to determine if and when a sensor is functioning at less-than-optimal performance. For instance, if an initial fingerprint indicates that a particular photosensor should indicate a particular reading at a given time of day/year for a given weather condition, but a later fingerprint indicates that the photosensor reading is much lower than expected, it may indicate that the photosensor is dirty or otherwise blocked or broken. In response to a fingerprint indicating such a change, the SMS may update some portion of the control system to compensate for the lower-than-expected photosensor readings. The update may relate directly to the photosensor (e.g., updating calibration data for the photosensor so future readings are more accurate), or it may relate to how the photosensor (or other sensor) data is used (e.g., by applying an offset to the photosensor readings before such readings are used in a control algorithm). Many options are available. Similar fingerprint comparisons and related updates may be made in connection with other types of sensors including, e.g., thermal sensors, occupancy sensors, etc.

Control Logic for Controlling Windows in a Building

Figure 6:
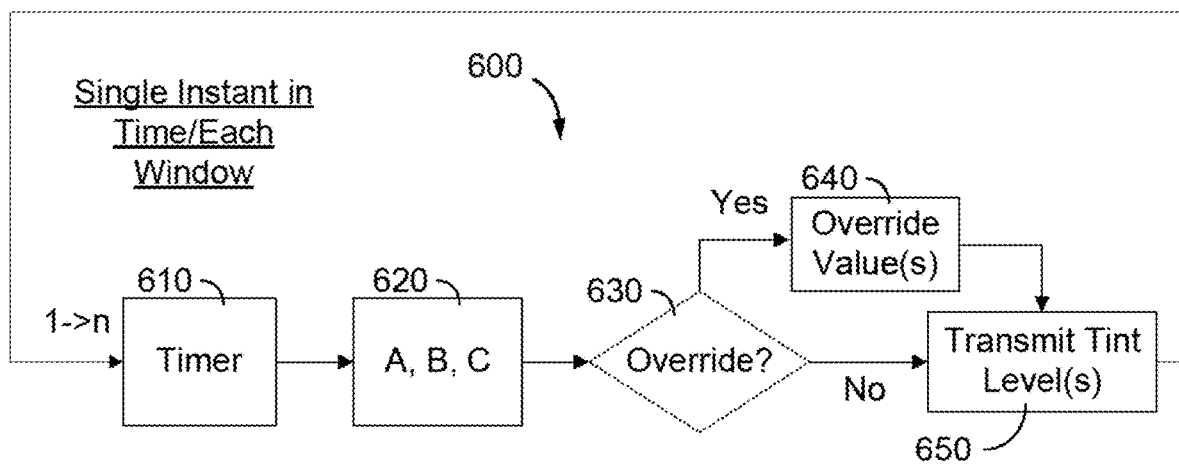
FIG. 6 is a flowchart showing some steps of predictive control logic for a method of controlling one or more electrochromic windows in a building.

FIG. 6 is a flowchart showing exemplary control logic for a method of controlling one or more tintable windows at a site, according to embodiments. The control logic uses one or more of the Modules A, B, and C to calculate tint levels for the tintable window(s) and sends instructions to transition the tintable window(s). The calculations in the control logic are run 1 to n times at intervals timed by the timer at step 610. For example, the tint level can be recalculated 1 to n times by one or more of the Modules A, B, and C and calculated for instances in time $t_i = t_1, t_2 \ldots t_n$. n is the number of recalculations performed and n can be at least 1. The logic calculations can be done at constant time intervals in some cases. In one cases, the logic calculations may be done every 2 to 5 minutes. However, tint transition for large pieces of electrochromic glass can take up to 30 minutes or more. For these large windows, calculations may be done on a less frequent basis such as every 30 minutes. Although Modules A, B, and C are used in the illustrated embodiment, one or more other logic modules can be used in other embodiments.

At step 620, logic Modules A, B, and C perform calculations to determine a tint level for each electrochromic window 505 at a single instant in time $t_i$. These calculations can be performed by the window controller 450, or by a SMS. In certain embodiments, the control logic predictively calculates how the window should transition in advance of the actual transition. In these cases, the calculations in Modules A, B, and C can be based on a future time around or after transition is complete. In these cases, the future time used in the calculations may be a time in the future that is sufficient to allow the transition to be completed after receiving the tint instructions. In these cases, the controller can send tint instructions in the present time in advance of the actual transition. By the completion of the transition, the window will have transitioned to a tint level that is desired for that time.

At step 630, the control logic allows for certain types of overrides that disengage the algorithm at Modules A, B, and C and define override tint levels at step 640 based on some other consideration. One type of override is a manual override. This is an override implemented by an end user who is occupying a room and determines that a particular tint level (override value) is desirable. There may be situations where the user's manual override is itself overridden. An example of an override is a high demand (or peak load) override, which is associated with a requirement of a utility that energy consumption in the building be reduced. For example, on particularly hot days in large metropolitan areas, it may be necessary to reduce energy consumption throughout the municipality in order to not overly tax the municipality's energy generation and delivery systems. In such cases, the building may override the tint level from the control logic to ensure that all windows have a particularly high level of tinting. Another example of an override may be if there is no occupant in the room, for example, over a weekend in a commercial office building. In these cases, the building may disengage one or more Modules that relate to occupant comfort. In another example, an override may be that all the windows may have a high level of tinting in cold weather or all the windows may have a low level of tinting in warm weather.

At step 650, instructions with the tint levels are transmitted over a site network to window controller(s) in communication with electrochromic device(s) in one or more tintable windows 505 in the building. In certain embodiments, the transmission of tint levels to all window controllers of a building may be implemented with efficiency in mind. For example, if the recalculation of tint level suggests that no change in tint from the current tint level is required, then there is no transmission of instructions with an updated tint level. As another example, the building may be divided into zones based on window size. The control logic may calculate a single tint level for each zone. The control logic may recalculate tint levels for zones with smaller windows more frequently than for zones with larger windows.

In some embodiments, the logic in FIG. 6 for implementing the control methods for multiple tintable windows 505 in an entire site can be on a single device, for example, a single master controller, other controller, or control panel. This device can perform the calculations for each and every window in the site and also provide an interface for transmitting tint levels to one or more electrochromic devices in individual tintable windows 505.

Also, there may be certain adaptive components of the control logic of embodiments. For example, the control logic may determine how an end user (e.g., occupant) tries to override the algorithm at particular times of day and makes use of this information in a more predictive manner to determine desired tint levels. In one case, the end user may be using a wall switch to override the tint level provided by the predictive logic at a certain time each day to an override value. The control logic may receive information about these instances and change the control logic to change the tint level to the override value at that time of day.

User Interface

Figure 7:
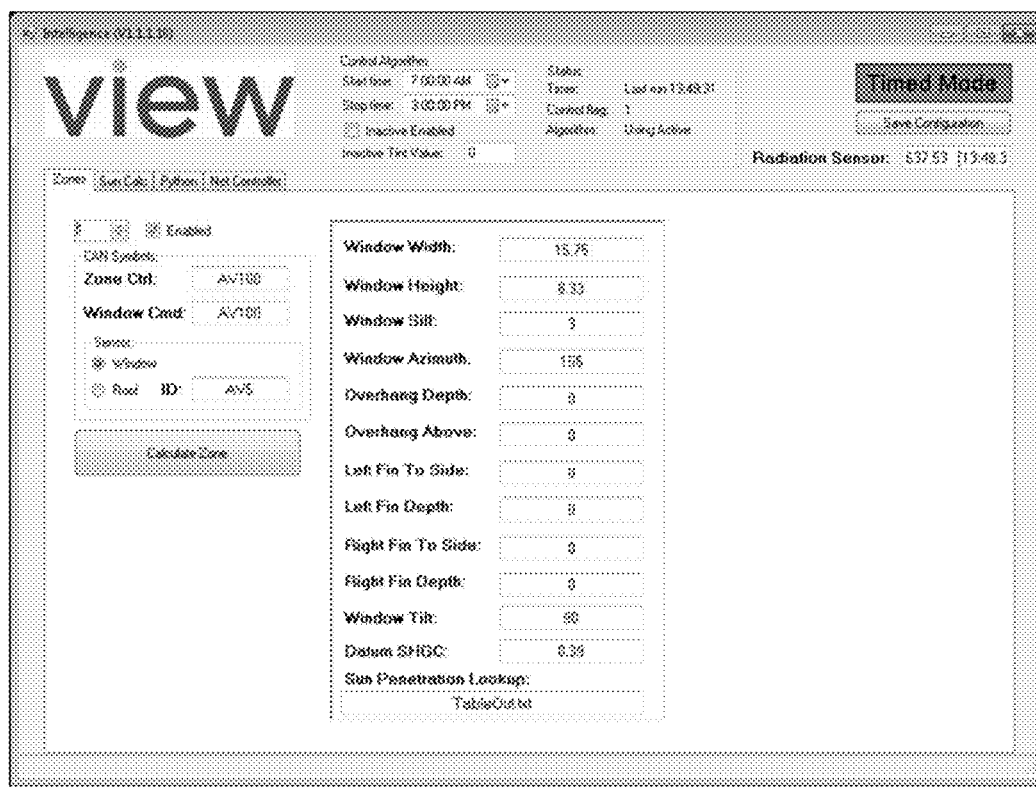
FIG. 7 is an illustration of an example of a user interface that can be used to enter schedule information to generate a schedule employed by a window controller.

The portion of the control logic employed by window controller may also include a user interface, in certain cases, in electronic communication with a master scheduler. An example of a user interface 1405 is shown in FIG. 7. In this illustrated example, the user interface 1405 is in the form of a table for entering schedule information used to generate or change a schedule employed by a master scheduler. For example, the user can enter the time period into the table by entering start and stop times. The user can also select a sensor used by a program. The user can also enter Site data and Zone/Group Data. The user can also select an occupancy lookup table to be used by selecting "Sun Penetration Lookup."

User interface 1504 is in electronic communication with a processor (e.g., microprocessor) and/or in electronic communication with a computer readable medium (CRM). The processor is in communication with the CRM. The processor is a component of the window controller 1110. The CRM may be a component of the window controller 1110 or may be a component of the BMS or SMS. The logic in the master scheduler and other components of the control logic may be stored on the CRM of the window controller 1110, the BMS, or the SMS User interface 1504 may include an input device such as, for example, a keypad, touchpad, keyboard, etc. User interface 1504 may also include a display to output information about the schedule and provide selectable options for setting up the schedule.

A user may input their schedule information to prepare a schedule (generate a new schedule or modify an existing schedule) using the user interface 1504.

A user may enter their site data and zone/group data using user interface 1504. Site data 1506 includes the latitude, longitude, and GMT Offset for the location of the site. Zone/group data includes the position, dimension (e.g., window width, window height, sill width, etc.), orientation (e.g., window tilt), external shading (e.g., overhang depth, overhang location above window, left/right fin to side dimension, left/right fin depth, etc.), datum glass SHGC, and occupancy lookup table for the one or more tintable windows in each zone of the site. In certain cases, site data and/or zone/group data is static information (i.e. information that is not changed by components of the predictive control logic). In other embodiments, this data may be generated on the fly. Site data and zone/group data may be stored on the CRM of the window controller 1110 or on other memory.

When preparing (or modifying) the schedule, the user selects the control program that a master scheduler will run at different time periods in each of the zones of a site. In some cases, the user may be able to select from multiple control programs. In one such case, the user may prepare a schedule by selecting a control program from a list of all control programs (e.g., menu) displayed on user interface 1405. In other cases, the user may have limited options available to them from a list of all control programs. For example, the user may have only paid for the use of two control programs. In this example, the user would only be able to select one of the two control programs paid for by the user.

Examples—A Site Monitoring System

FIGS. 8A and 8B show examples of dashboards for a SMS. In FIG. 8A, the depicted view includes a row for each of multiple sites monitored by the system, with each row including a site name, its current status, and a most recent update time. The status row indicates whether or not all monitored devices and controllers in the site appear to be functioning properly. A green light may be used to indicate no problems, a red light may be used to indicate that a problem exists, and a yellow light may be used to indicate that a device or controller is trending toward a problem. One field of the view provides a link to details about the site. Thus, if the dashboard shows that there may be a problem at the site, the user can obtain pull up event logs, sensor output, window electrical responses, etc. for the site. This allows the user to drill down quickly to the precise issue while still having a high-level picture of any sites that have issues. In FIG. 8B, the dashboard is showing information relevant to a particular site, and many options are available to view the information in different ways. Further, the dashboard includes options for running fingerprints (in this case, a short fingerprint and a longer final fingerprint, each of which may be include a particular set of information relevant to various components at the site).

Figure 9:
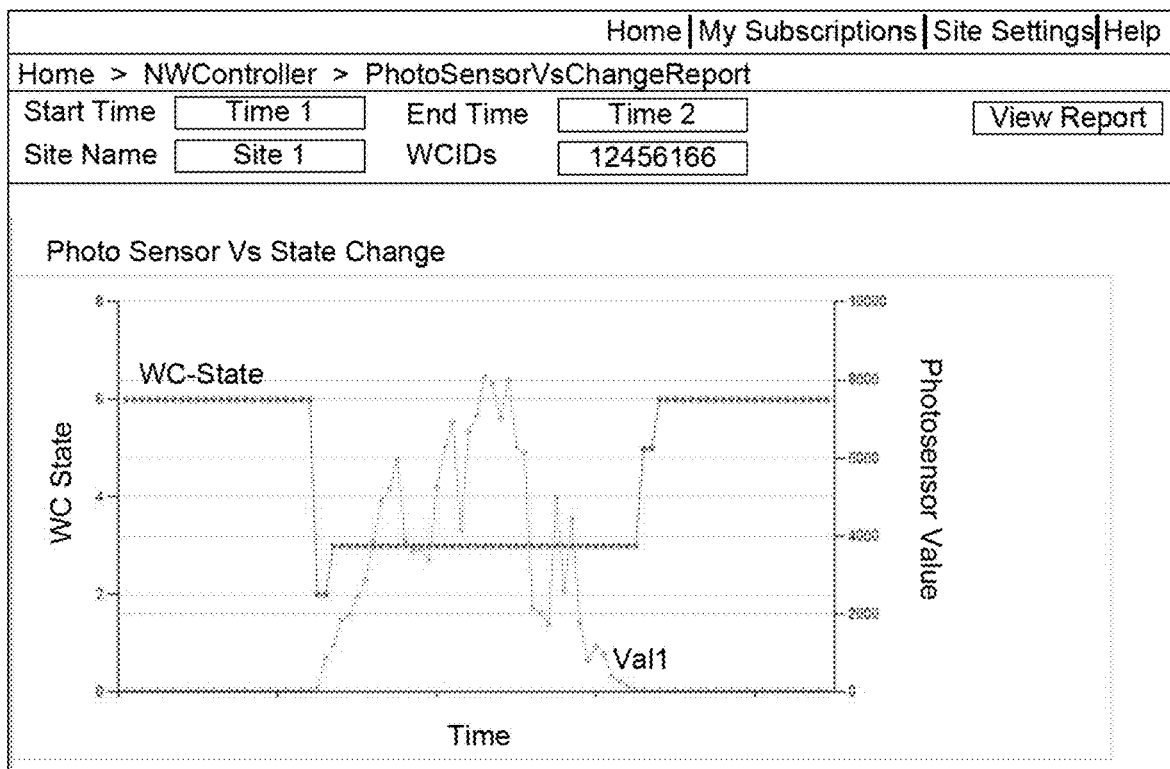
FIG. 9 presents an example of photosensor data that may be obtained by a SMS.

FIG. 9 presents an example of one type of site information that may be obtained by a SMS, and may be included in a fingerprint for a photosensor. The graph presents the output signal from a photosensor over time. This information is presented with the tint state of a window that is controlled using information from the sensor. As illustrated, the window tint state reasonably corresponds with the sensor output.

Figure 10:
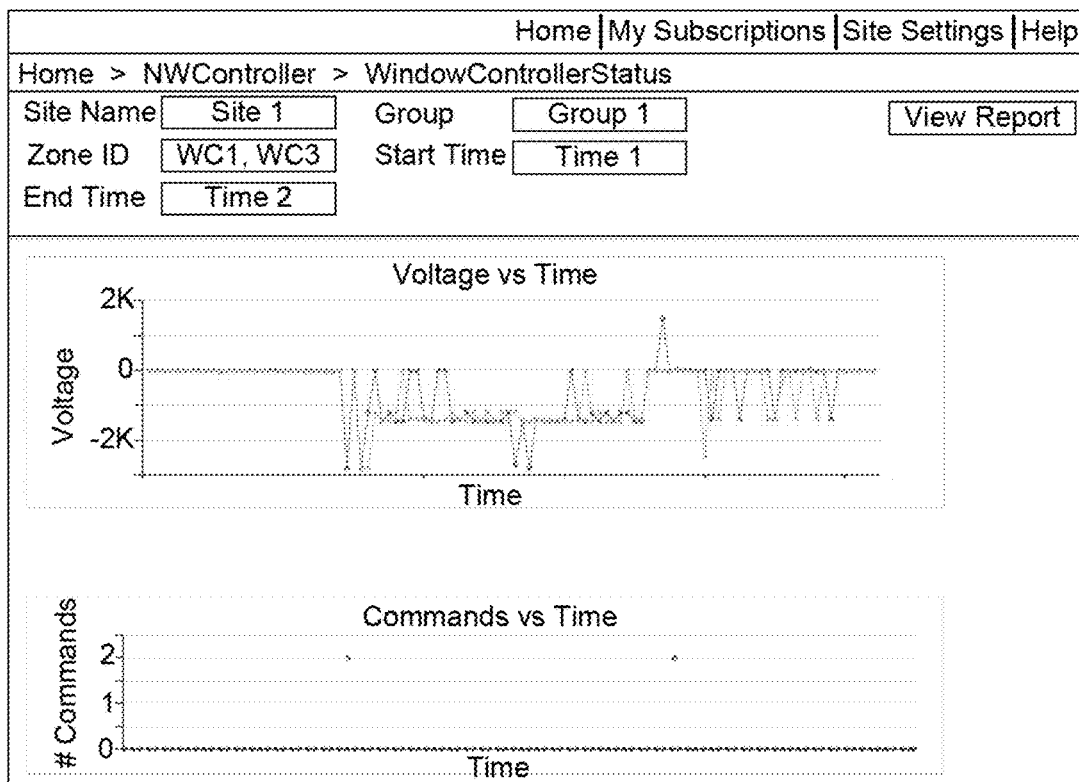
FIG. 10 presents data showing a window's response is shown in relation to commands issued by a controller for the window. This is another example of site information that may be obtained by a monitoring system.

FIG. 10 presents another example of site information that may be obtained by a monitoring system. In this case, a window's response is shown in relation to commands issued by a controller for the window. This type of information may be included in a fingerprint for a window controller and/or an associated optically switchable device, for example.

Figure 11:
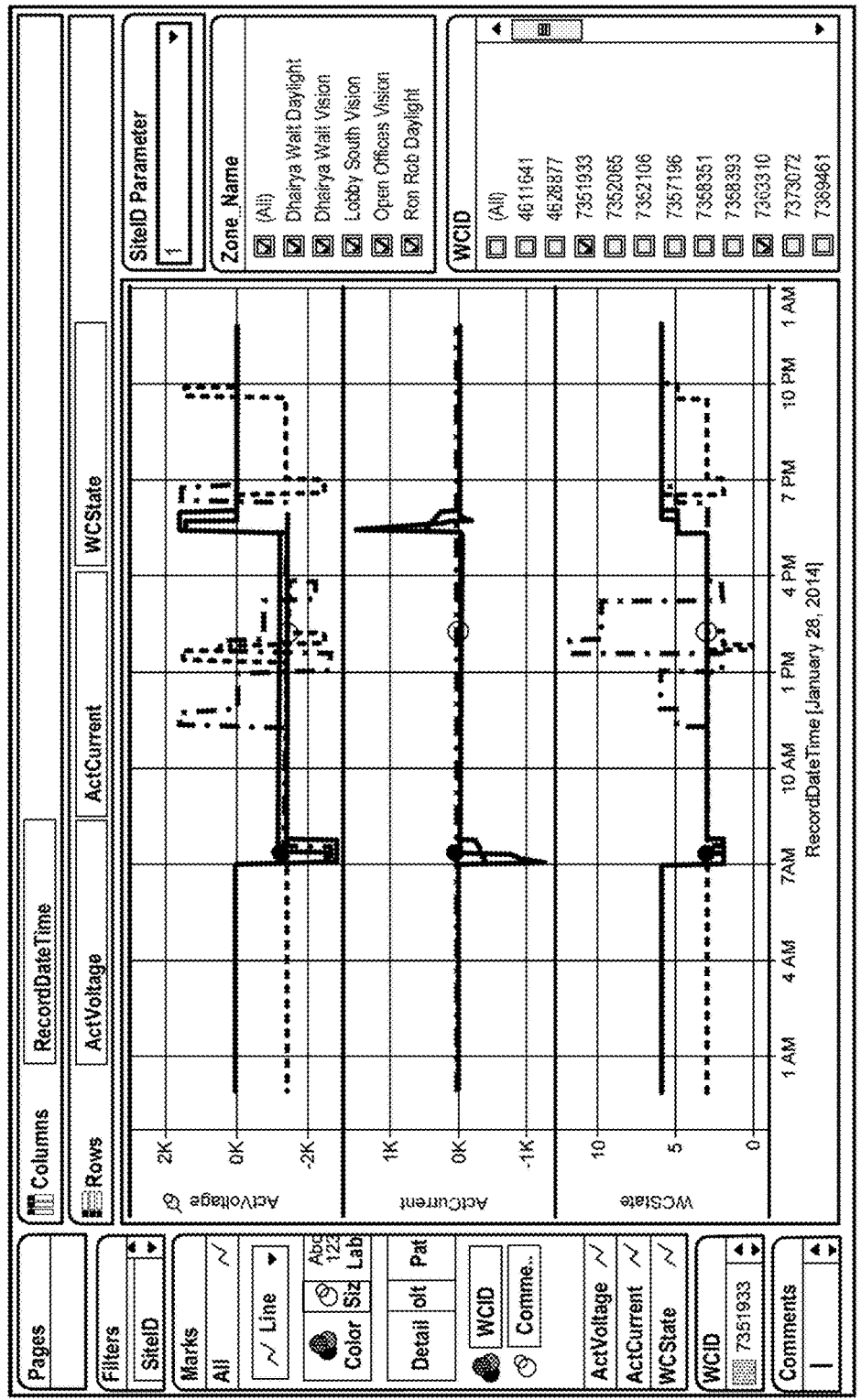
FIG. 11 shows state transitions of windows controlled by three different network controllers in a site. This is yet another example of site information that can be monitored and stored.

FIG. 11 shows yet another example of site information that can be monitored and stored. This example shows state transitions of windows (using current, voltage, and controller commands) controlled by three different network controllers in a site. If the transitions of one of the windows are inconsistent with expected behavior, it may indicate a problem with the associated network controller. The type of information shown in FIG. 11 (e.g., voltage, current, and window or window controller state over time) may be included in a fingerprint for one or more components in the system, e.g., an optically switchable device and/or its associated window controller.

Figure 12:
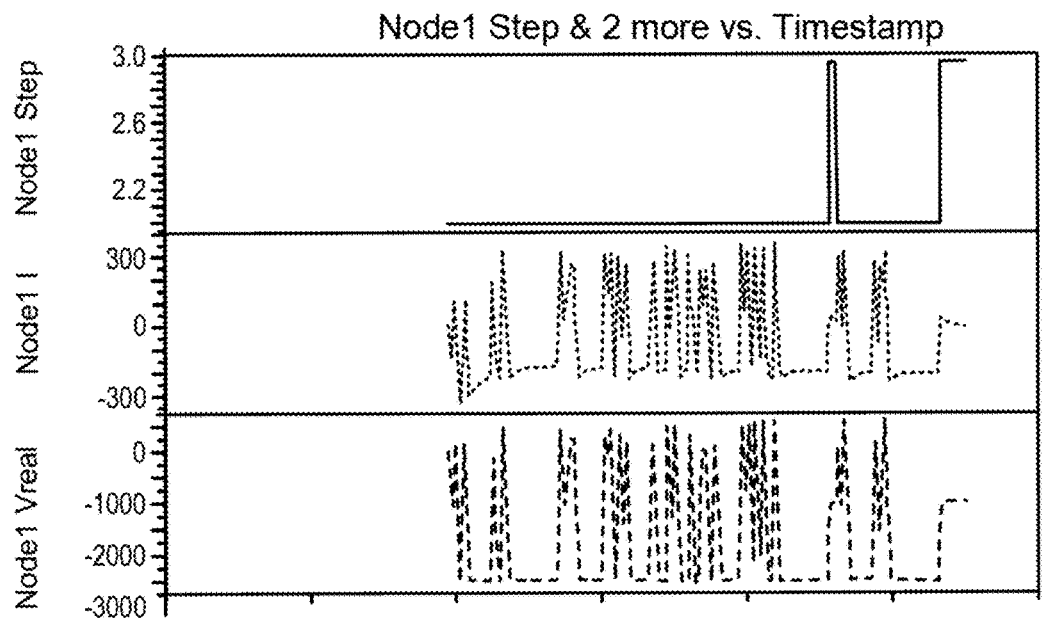
FIG. 12 shows site monitored data illustrating the case when a multiple tinting is required to switch a device from one optical state to another.

FIG. 12 illustrates the case when multiple tinting operations are required to switch a device from one optical state to another. Each unsuccessful attempt to switch a device (whether successful or not) impacts the lifetime of device. The lower trace represents the voltage to the window and the middle trace represents the current to the window. In a properly executed transition according to one embodiment, the applied voltage will settle to a hold voltage of about −1200 mV. Clearly, this is not the case with the monitored window under consideration, a situation that may be flagged by the SMS. This flagging may occur in response to a comparison between fingerprints taken at different times. The fingerprint may relate directly to the window under consideration, or it may relate to the broader network of windows, including the window under consideration and any other components being considered. In certain embodiments, the system includes an autodiagnostic function that notes attempts to double tint and double clear, situations that may result in early failure. In some cases, the system may initiate a fingerprint of one or more components in response to an indication that a double tint or double clear has occurred. This fingerprint can then be compared to an earlier fingerprint to determine if the relevant component is operating as expected and to determine if any updates, maintenance, or other action is needed.

Figure 13:
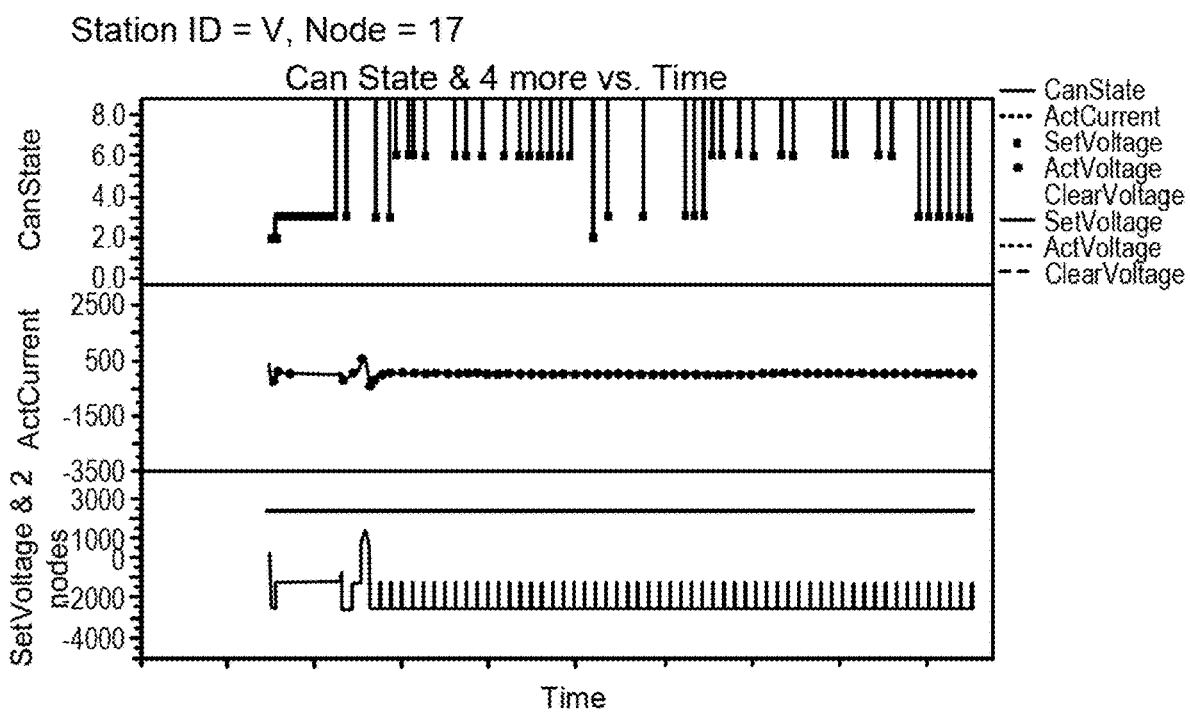
FIG. 13 shows site monitored data indicating degradation in the connection of a power line to an insulated glass unit.

FIG. 13 presents an example of monitored data that may be used to diagnose a potential problem with an electrical connector to a window or controller, possibly through a window frame or IGU. As mentioned, a "pigtail" is sometimes used to connect wiring from a power source to the window. In some cases, the connecter connects directly to a controller. The information contained in FIG. 13 shows that a constant command was issued by a high level controller (e.g., a master controller). See the flat line, third from the top. However the window controller's applied voltage and current (lower and upper traces) show rapid and significant changes, which may be diagnosed as a problem with the connection. In response, personnel can be instructed to check the connection and replace it if necessary.

Figure 14A:
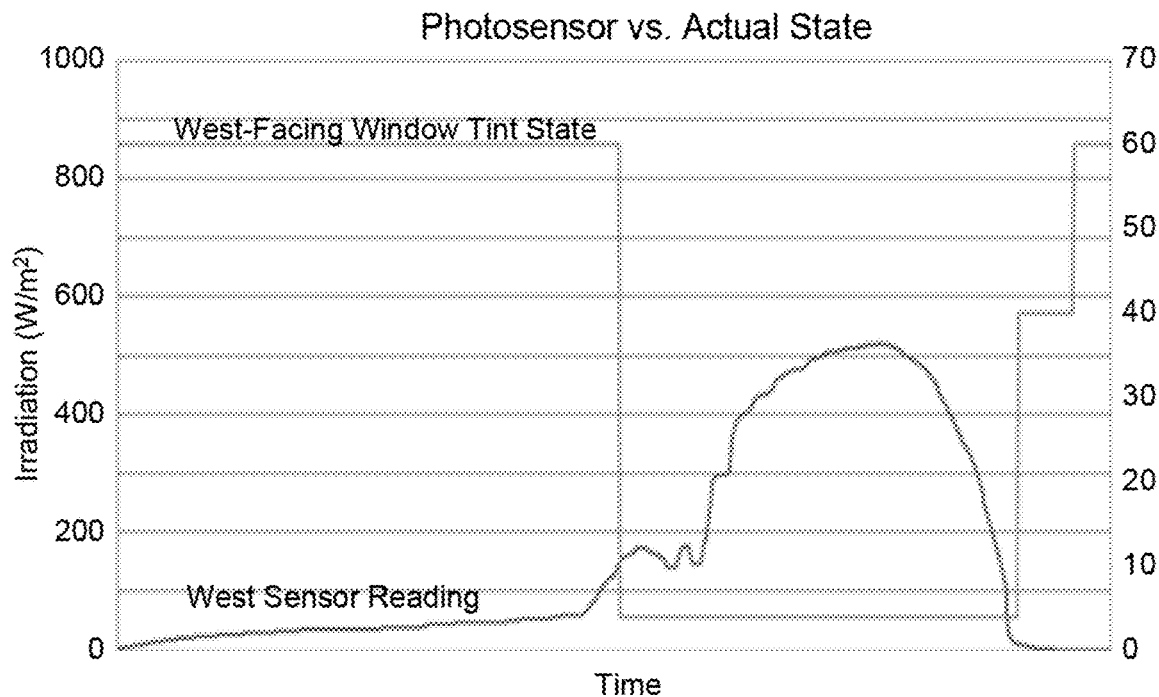
FIGS. 14A-14D show site monitored data comparing zone state changes that may be used by the monitoring system to ensure that the control logic is working properly.
Figure 14B:
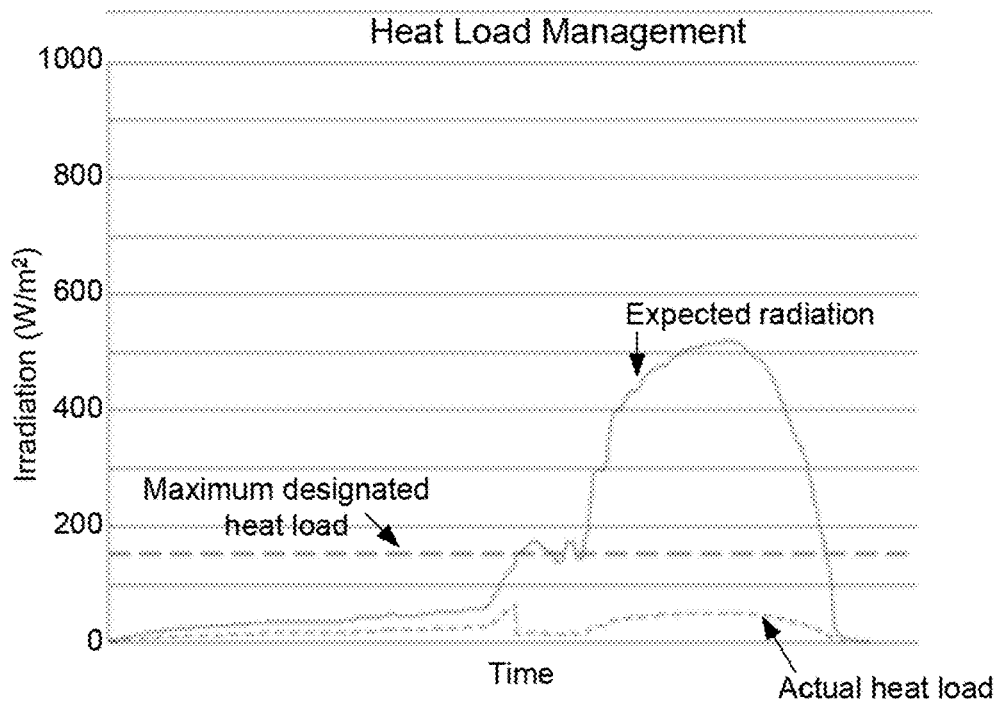
Figure 14C:
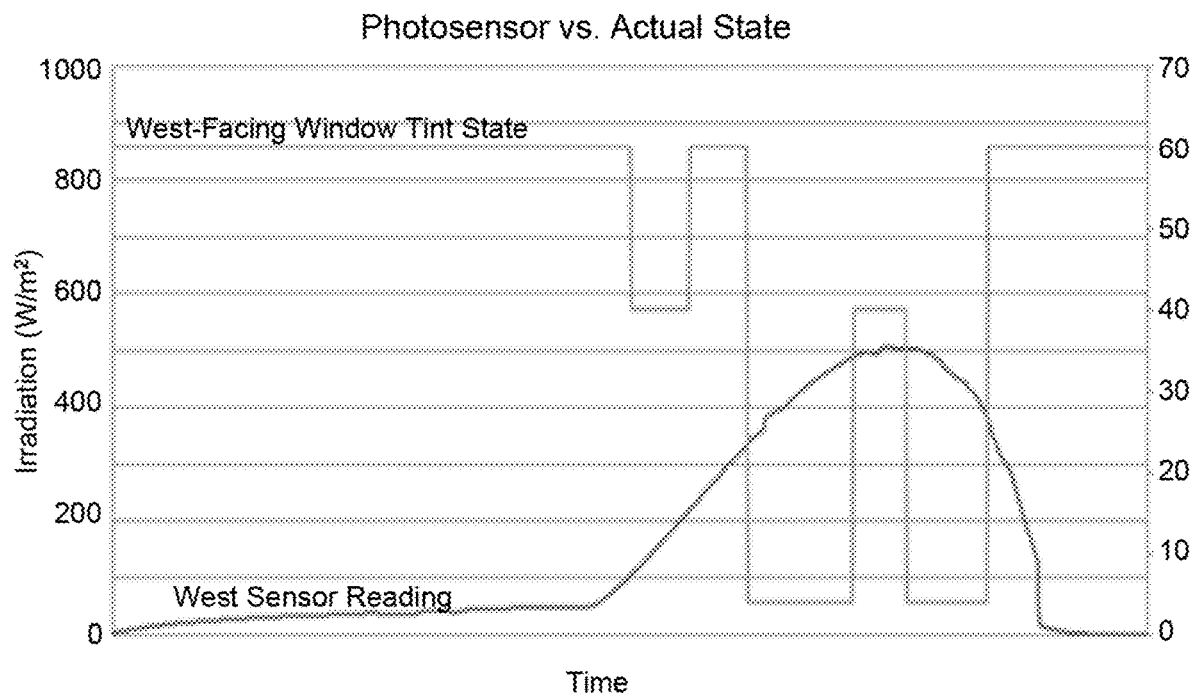

FIGS. 14A-14D illustrate monitored information relating solar radiation (as detected by photo detector on the site exterior) to window tinting and heat load. FIG. 14A illustrates monitored data for a properly functioning controller and window, while FIG. 14C illustrates data for an improperly functioning controller and/or window. In FIG. 14A, the darker curve represents irradiance (W/m$^2$) over time as detected by the photo detector, while the lighter more linear plot represents the tinting state of a window facing the same direction as the photo detector. As expected for a properly functioning tinting algorithm, the window tints when the solar irradiance increases. By contrast, the tinting shown in FIG. 14C does not follow an expected path; it drops to a high transmissivity state during maximum solar exposure. This situation may be automatically detected and flagged by the SMS. The system may include further logic for determining whether this otherwise problematic situation is actually acceptable due to, e.g., a common override for the subject window or controller at the site. If such override is identified, the monitoring site may conclude that no problem exists and/or that it should change the tinting algorithm to capture the override.

FIG. 14B illustrates the radiative heat load through a window (or group of windows) at the site as a function of time. The upper curve represents the radiative heat flux (W/m$^2$) that the building would receive if no tinting was applied. The lower dashed curve represents the actual radiative heat load at the site when the window(s) in question is tinted according to the properly functioning algorithm as depicted in FIG. 14A. The flat middle dashed line represents a designed maximum radiative heat load that may be associated with a standard window type (e.g., static tinted glass or low E glass). As shown in FIG. 14B, the actual radiative heat load is well below both the no-tint heat load and the designed maximum heat load. In this situation, the SMS will not flag a problem. It may, however, calculate and optionally save or present the quantity of energy saved using the switchably tinting windows. Energy can be calculated from the area under the curves. The difference between the area under the upper solid curve (no tinting) and the lower dashed curve (controlled tinting) corresponds to the energy saved using controlled tinting in the site under consideration. Similarly, the difference between the area under the middle dashed line (design maximum heat load) and the lower dashed curve (controlled tinting) corresponds to the energy saved in comparison to a standard static approach to managing radiant heat flux.

Figure 14D:
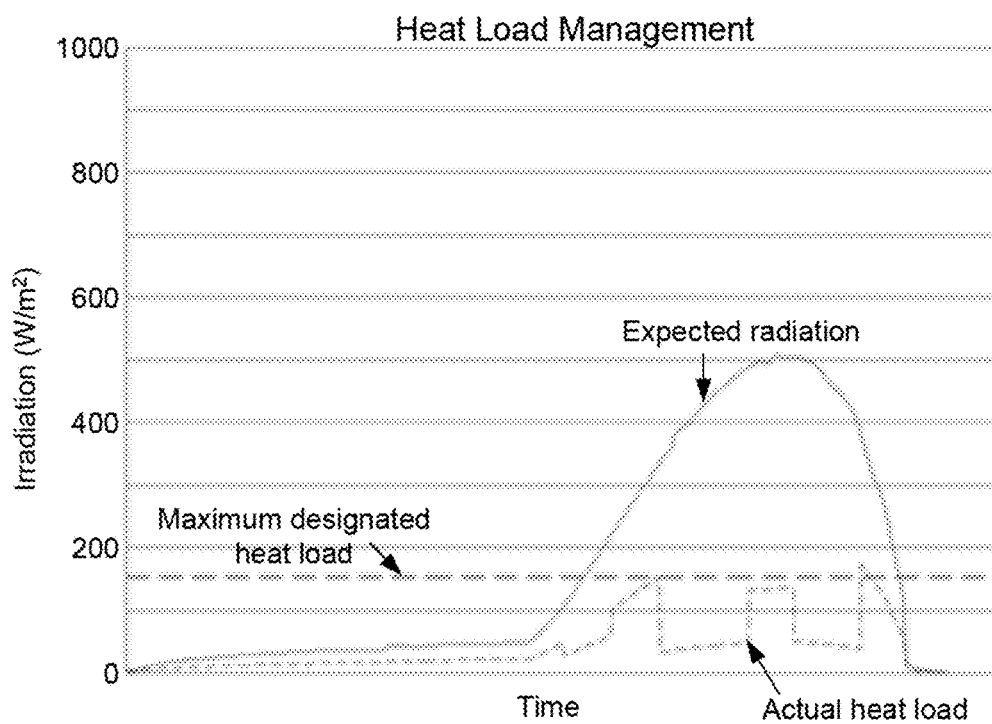

FIG. 14D illustrates the heat load as in FIG. 14B but for the potentially problematic tinting reflected in FIG. 14C. In this case, the heat load temporarily exceeds the design maximum heat load, but stays well below the heat load that would result from no tinting. Over time, this window/controller still saves energy in comparison to the design maximum heat load.

Figure 15:
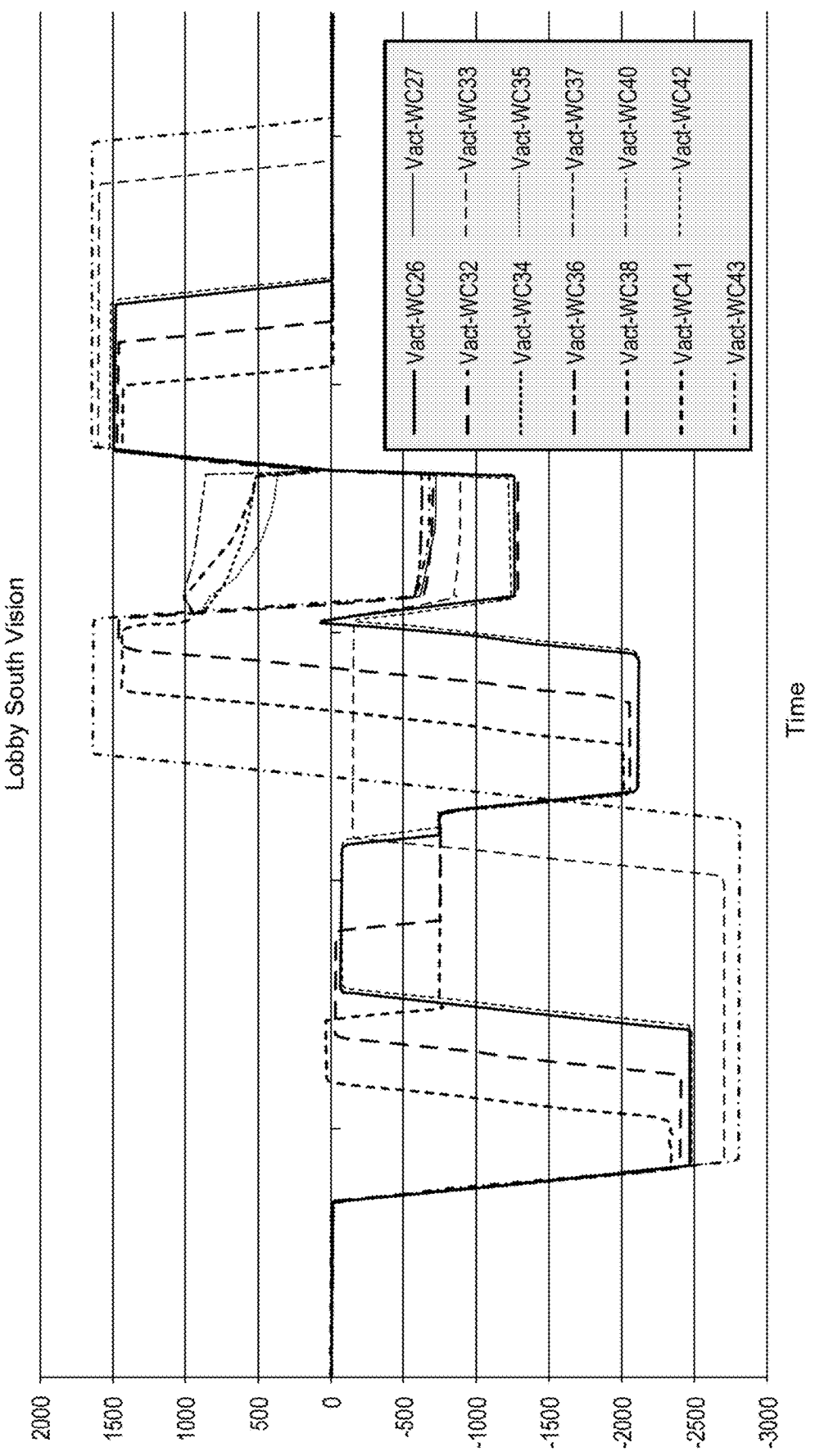
FIG. 15 illustrates monitored data for multiple windows from the same zone but having different switching characteristics.

FIG. 15 illustrates monitored data for multiple windows having different switching characteristics and possibly having different sizes. Each trace in the figure represents the switching voltage over time for a different window. As shown, different windows exhibit different switching times; the lowest V trace is for a window having the longest switching time. In the depicted example, the different windows are part of the same bank or zone and consequently should transition at the same or similar rates. When the monitoring system receives data as shown in FIG. 15, for example in one or more fingerprints for various components on the system, it can automatically determine that the switching times vary widely and possibly well out of specification. This may trigger an adjustment in the switching algorithm or associated parameters for some or all of the windows; the algorithm/parameters may be changed to slow the transition rate of fast switching windows and/or increase the rate of slow switching windows.

Figure 16:
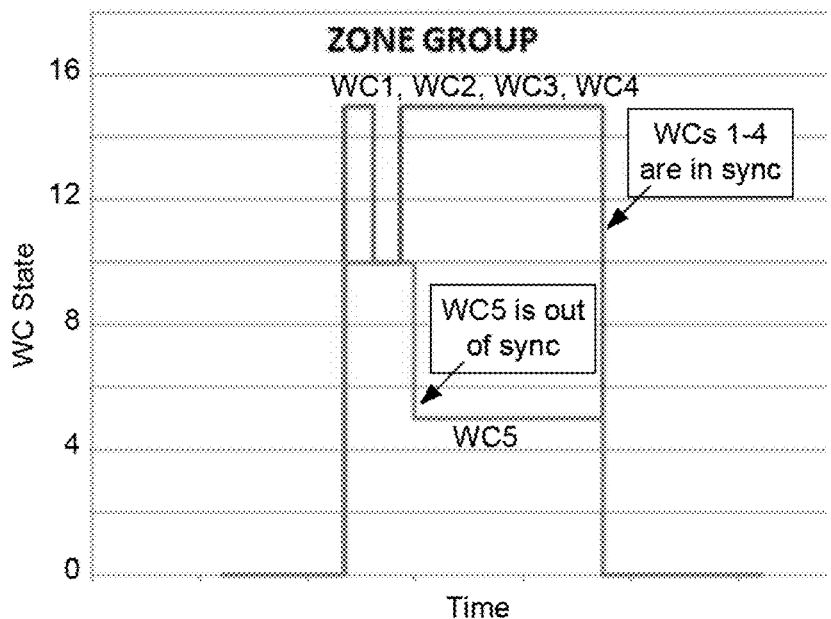
FIG. 16 illustrates monitor information showing that a zone under consideration has one of the controllers is out of sync with rest of the controllers in the zone.

FIG. 16 provides monitor information showing that the zone under consideration has a potential problem or error because one of the controllers is out of sync with rest of the controllers in the zone. With such information, the monitoring system or personnel accessing the system can further investigate the problem to isolate the controller, its connections, a window it controls, etc.

Figure 17:
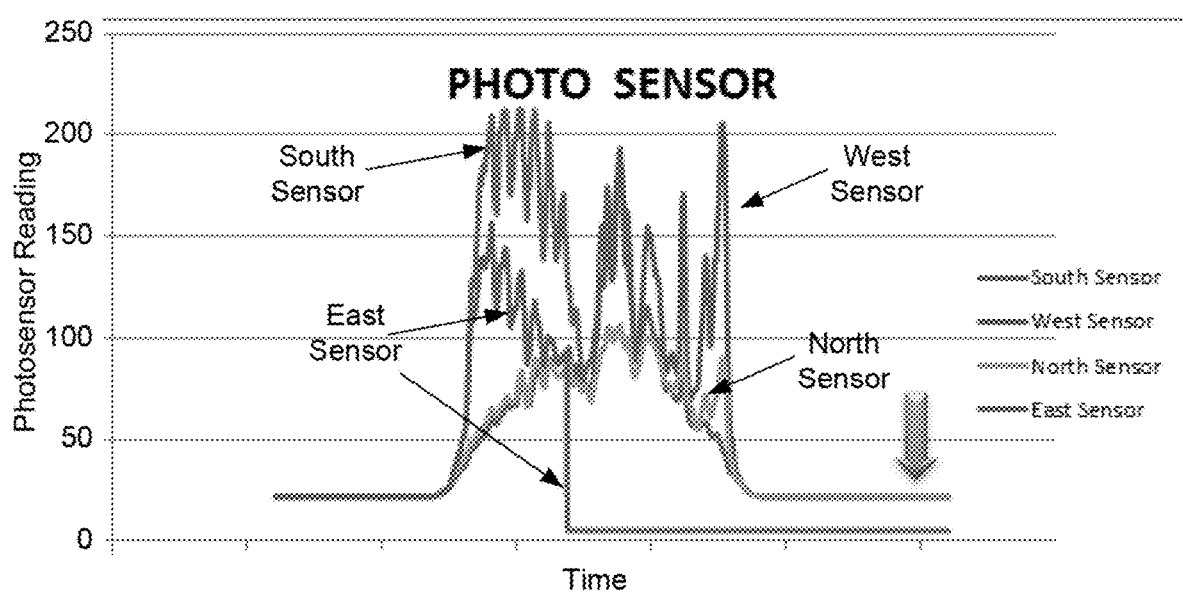
FIG. 17 provides monitor information for four photosensors, each facing a different direction, on a site.

FIG. 17 provides monitor information for four photosensors, each facing a different direction, on a site. The East sensor has stopped working as shown by its output value dropping to near zero and then not changing at all. Because the other sensors are still reading and the time is early in the afternoon, the system can eliminate the possibility that no light is hitting the site exterior, which could also lead to the very low reading. The monitoring system may conclude that the East photosensor has failed. This information may be provided in a fingerprint for one or more components (e.g., the four photosensors) that is used by the SMS to diagnose the problem.

FIGS. 18A-18H present an example of field degradation and detection using features 1.a, 1.b and 1.f from the "Data Monitored" section: changes in peak current, changes in hold (leakage) current, and comparison with other window controllers on the same façade with identical loads. In this example, window controllers WC1-WC11 have similar loads (two insulated glass units/controller) and they control windows on same façade. Controller WC12 is on same façade but has half the load (1 IGU/controller). Stored information on the controllers is provided in the graph of FIG. 18A, where W, H, and SF are the windows' widths, heights, and square feet (area), respectively. The system expects that controllers WC1-WC11 will have the same drive and hold current profiles.

Figures 18A, 18B:
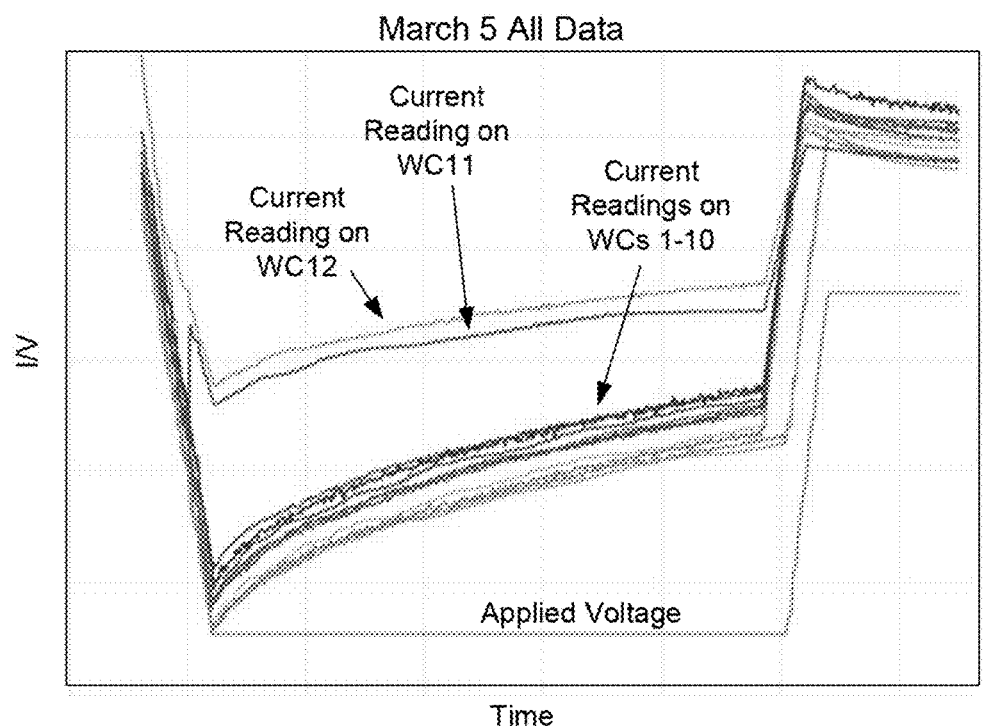
FIGS. 18A-18H present information used by a SMS to detect and analyze a problem with a window controller in a group of controllers for windows on a single façade.
Figure 18C:
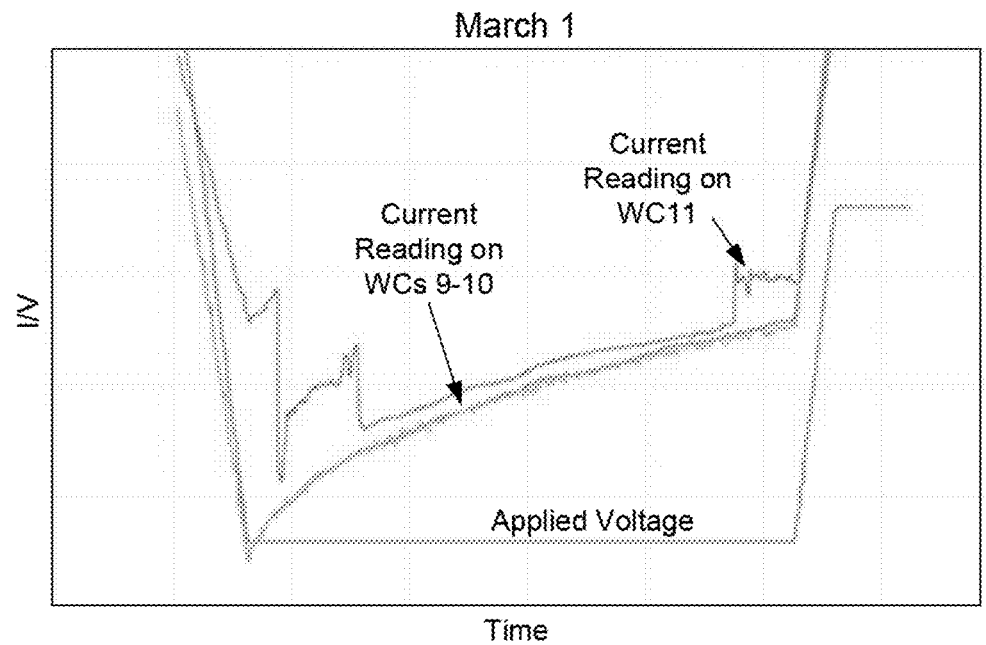
Figure 18D:
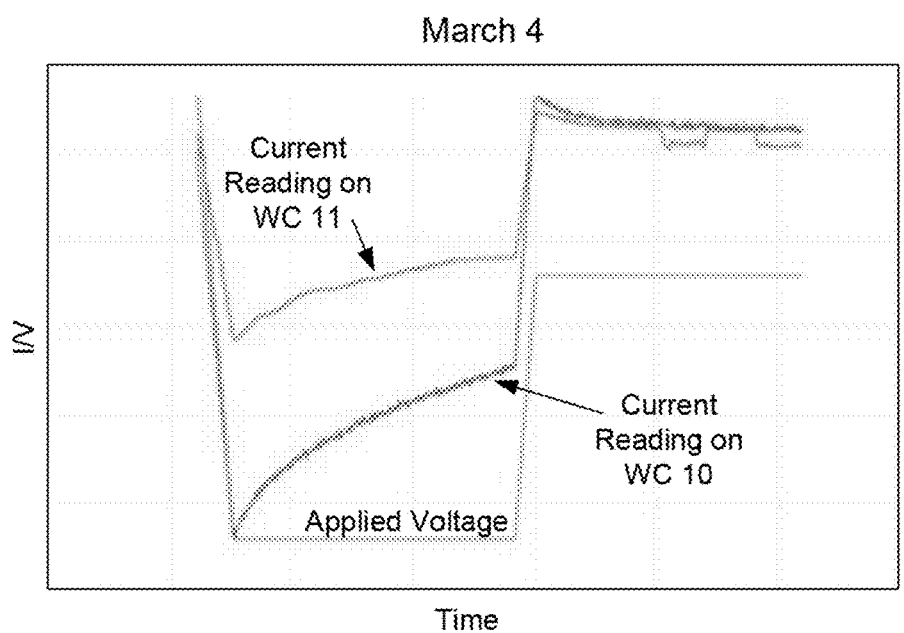
Figure 18E:
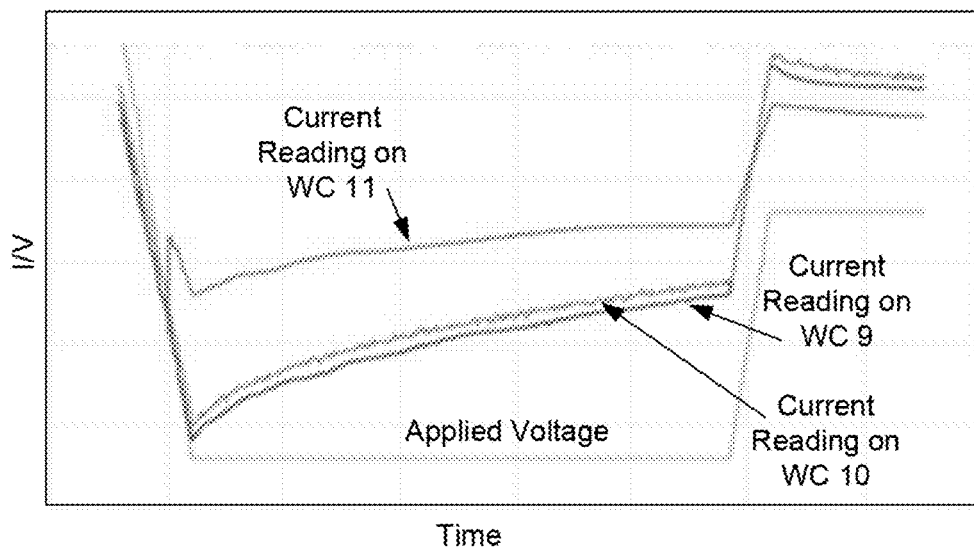
Figure 18F:
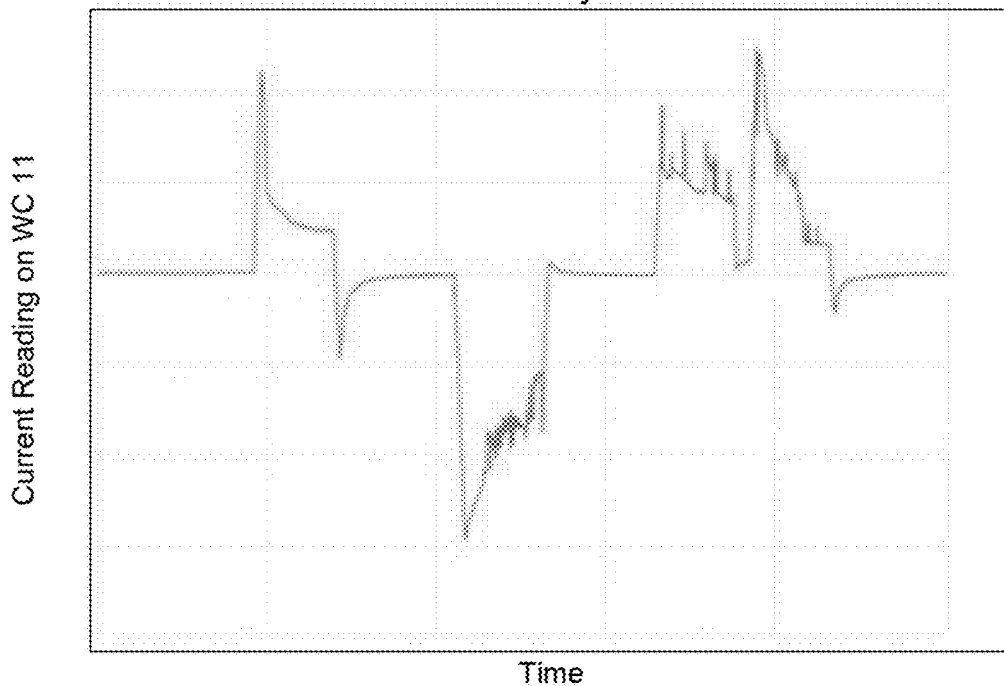
Figure 18G:
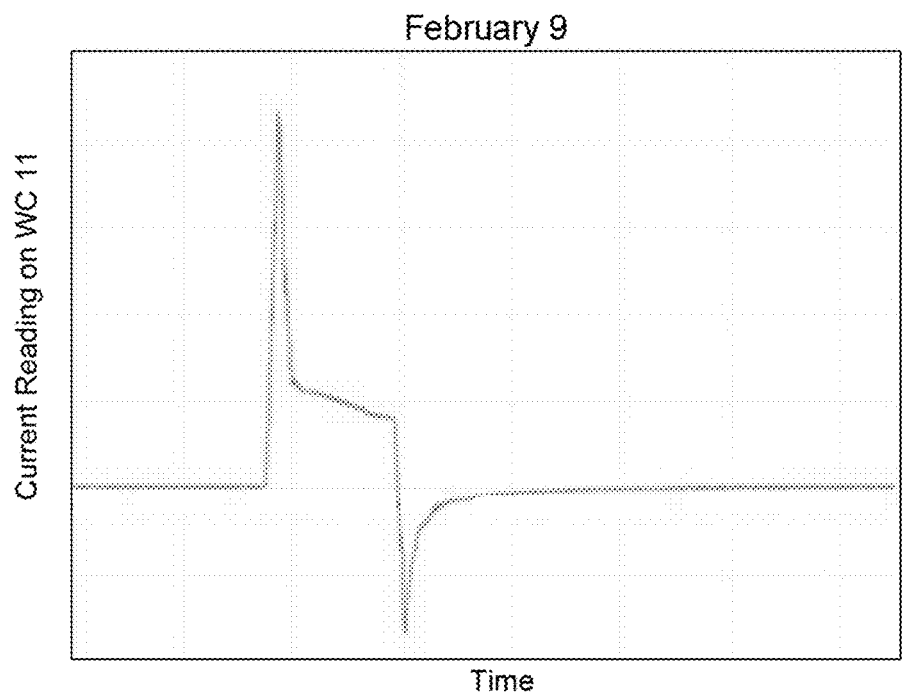
Figure 18H:
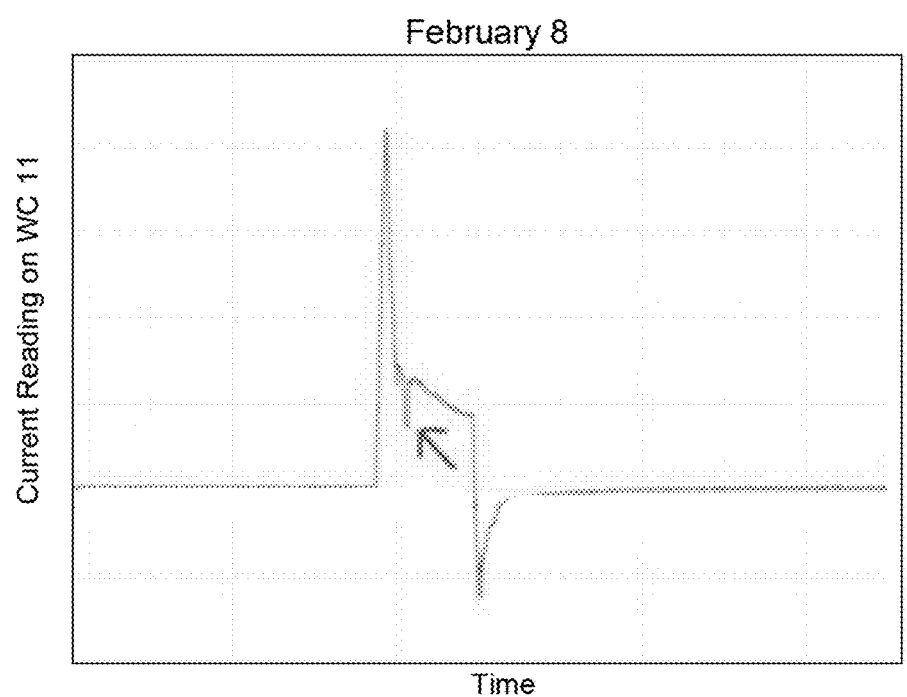

In FIGS. 18B-18E, which present plots of controller current readings taken on March 1, 4, and 5, the lower flat bottomed curve is the applied voltage to drive a window transition. See the labels WC1V for March 5, WC09V for March 1, WC10V for March 4, and WC9V for March 5 (FIG. 18E). As seen, the applied voltage profile is the same; all controllers are identically driven. All other curves represent current from the controllers, and all controllers except WC12 have identical loads. Hence, the system expects the current curves for WC1-WC11 to be same for same. The SMS analyzes and compares the current readings, and finds that WC11 has two issues (a) its current profile has an uncharacteristic dip in it in the middle of a ramp (b) it draws about half the peak current (about as much as WC12 level) compared to WC1-WC10, suggesting that one of the two windows controlled by WC11 was not getting tinted. Manual inspection of the windows confirmed that one window controlled by WC11 was not tinting properly. Further inspection showed that one window of two controlled by WC11 was not tinting due to pinched cable which ultimately stopped working, which is why WC11 had an uncharacteristic current profile that eventually resembled WC12, which drives only a single window.

Analysis of WC11 from earlier dates (February 8-10 in the graphs FIGS. 18F-18H) shows that it had characteristics of a failing controller. Current drawn from WC11 had spiky drops and increases in current evidencing onset of the problem. With auto detection, the SMS could have found this problem and flagged it to field service before one of the windows stopped tinting and became a noticeable problem.

Mechanical Shades

While certain disclosure emphasizes systems, methods, and logic for controlling switchable optical devices (e.g., electrochromic devices), these techniques can also be used to control mechanical shades or a combination of switchable optical devices and mechanical shades. Such a mechanical shade may, for example, include a motor operated blind or an array of microelectromechanical systems (MEMS) devices or other electromechanical systems (EMS) devices. Windows having a combination of electrochromic devices and EMS systems devices can be found in PCT international application PCT/US2013/07208, titled "MULTI-PANE WINDOWS INCLUDING ELECTROCHROMIC DEVICES AND ELECTROMECHANICAL SYSTEMS DEVICES," filed on Nov. 26, 2012, which is hereby incorporated by reference in its entirety. Mechanical shades typically have different power requirements than certain switchable optical devices such as electrochromic devices. For example, while certain electrochromic devices require a few volts to operate, mechanical shades may in some instances require larger voltages in order to establish sufficient potential to physically move the mechanical feature.

Microblinds and microshutters are examples of types of EMS devices. Some examples of microblinds and microshutters, and their methods of fabrication are described respectively in U.S. Pat. Nos. 7,684,105 and 5,579,149, both of which are hereby incorporated by reference in their entirety.

In certain embodiments, a mechanical shade may be an array of EMS devices, where each EMS device including a portion (e.g., a hinge or an anchor) attached to the substrate and a mobile portion. When actuated by electrostatic forces, the mobile portion may move and obscure the substrate. In the unactuated state, the mobile portion may expose the substrate. In the example of some microblinds, the mobile portion may be an overhanging portion of a material layer that curls when actuated by electrostatic forces. In the example of some microshutters, the mobile portion can rotate or curl when actuated. In some cases, the EMS devices may be actuated and controlled by electrostatic control means. In the example of microshutters, the electrostatic control means may control the angle of rotation or curl to different states. The substrate with the array of EMS devices may also include a conductive layer. In the example of microblinds, the microblinds are fabricated using a thin layer(s) under controlled stress. In embodiments with an array of EMS devices, each EMS device has two states, an actuated state and an unactuated state. The actuated state may render the array of EMS devices substantially opaque and the unactuated state may render the array of EMS devices substantially transparent, or vice versa. The actuated and unactuated states may also switch between substantially reflective (or absorptive) and substantially transparent, for example. Other states are also possible when the array of EMS devices is in an actuated or unactuated state. For example, microshutters, a type of MEMS device, may be fabricated from a tinted (but non-opaque) coating, which when shut provide a tinted pane, and when open the tint is substantially removed. Further, some arrays of EMS devices may have three, four, or more states that are able to be transitioned to. In some cases, the EMS devices can modify visible and/or infrared transmission. The EMS devices may reflect in some cases, may be absorptive in other cases, and in yet other embodiments may provide both reflective and absorptive properties. In certain embodiments, the EMS devices may be operated at variable speeds, e.g., to transition from a high transmission state to a low-transmission state, or a no-transmission state. In certain cases, the EMS devices may be used in conjunction with an electrochromic device (or other switchable optical device) as a temporary light blocking measure, e.g., to block light until the associated electrochromic device has transitioned to a lower transmissivity state or a higher transmissivity state.

Although the foregoing embodiments have been described in some detail to facilitate understanding, the described embodiments are to be considered illustrative and not limiting. It will be apparent to one of ordinary skill in the art that certain changes and modifications can be practiced within the scope of the appended claims. For example, while the various features of the site monitoring devices have been described individually, such features may be combined in a single site monitoring device.

What is claimed is:

1. A site monitoring system (SMS) comprising:
   one or more processors communicatively coupled with a plurality of remote sites, each site including a respective network of optically switchable windows and associated controllers and sensors, wherein the one or more processors are configured to:
communicate with a plurality of components of the network of optically switchable windows to receive information associated with the plurality of components,
cause a first set of voltage and/or current parameters to be measured at the plurality of components,
store the information received and the first set of measured parameters as a baseline characterization of the network of optically switchable windows, wherein the plurality of components comprise at least one of the optically switchable windows, the associated controllers and the associated sensors,
use the baseline characterization for comparison to subsequently measured parameters to identify a variation in the subsequently measured parameters from the baseline characterization,
when the variation in the subsequently measured parameters from the baseline characterization exceeds a threshold value, identify a malfunctioning or degrading component of the plurality of components and
perform a remedial action in response to the identified malfunctioning or degrading component of the plurality of components, wherein the remedial action comprises adjusting at least one or more voltages and/or one or more other parameters applied to at least one of the plurality components.

2. The SMS of claim 1, further comprising:
a computer readable medium comprising instructions configured to execute operations on the one or more processors, wherein the instructions comprise: determining that the SMS requires updated parameters for controlling one or more optical transitions of one or more of the optically switchable windows, and sending one or more communications comprising the updated parameters and instructions to update the SMS with the updated parameters.

3. The SMS of claim 1, wherein the remedial action includes notifying a user and/or an operator of the SMS when the malfunctioning or degrading component is identified.

4. The SMS of claim 1, wherein a change in the network relates to a removal or replacement of at least one of the plurality of components of the network of optically switchable windows.

5. The SMS of claim 1, wherein the SMS is configured to monitor two or more networks of optically switchable windows, the two or more networks of optically switchable windows being provided at different sites of the plurality of remote sites.

6. The SMS of claim 1, wherein the baseline characterization of the network of optically switchable windows includes a combination of component fingerprints of all or a subset of the plurality of components.

7. The SMS of claim 1, wherein the baseline characterization of the network of optically switchable windows comprises data indicating a frequency of errors over time related to one or more of the plurality of components.

8. The SMS of claim 1, wherein the baseline characterization of the network of optically switchable windows comprises data related to the associated sensors, the data including one or more parameters selected from the group consisting of: (i) sensor readings vs. time, (ii) sensor readings vs. external weather events, (iii) information comparing an output of one or more of the sensors vs. a tint state on at least one optically switchable window affected by the one or more of the sensors, and (iv) information regarding changes in external lighting conditions since the network of optically switchable windows was installed.

9. The SMS of claim 1, wherein the plurality of components further comprise one or more control panels.

10. The SMS of claim 9, wherein the baseline characterization of the network of optically switchable windows comprises at least one parameter associated with a control panel of the one or more control panels, selected from the group consisting of: (i) an input power to the control panel, (ii) an output power from the control panel, (iii) an input voltage to the control panel, (iv) an output voltage from the control panel, (v) an input current to the control panel, and (vi) an output current from the control panel.

11. The SMS of claim 1, wherein the network is located at a site of the plurality of remote sites, and wherein the one or more processors are located remote from the site at which the network is located.

12. A method comprising:
communicating with a plurality of remote sites, each site including a respective network of optically switchable windows and associated controllers and sensors,
causing a first set of voltage and/or current parameters to be measured at a plurality of components of at least one of the respective networks,
storing the information received and the first set of measured parameters as a baseline characterization of the network of optically switchable windows, wherein the plurality of components comprise at least one of the optically switchable windows, the associated controllers and the associated sensors,
using the baseline characterization for comparison to subsequently measured parameters to identify a variation in the subsequently measured parameters from the baseline characterization,
in response to the variation in the subsequently measured parameters from the baseline characterization exceeding a threshold value, identifying a malfunctioning or degrading component of the plurality of components, and
performing a remedial action in response to the identified malfunctioning or degrading component of the plurality of components, wherein the remedial action comprises adjusting at least one or more voltages and/or one or more other parameters applied to at least one of the plurality components.

13. The method of claim 12, further comprising:
determining that a site monitoring system (SMS) requires updated parameters for controlling one or more optical transitions of one or more of the optically switchable windows, and
sending one or more communications comprising the updated parameters and instructions to update the SMS with the updated parameters.

14. The method of claim 12, wherein the remedial action comprises notifying a user and/or an operator of the SMS in response to the malfunctioning or degrading component being identified.

15. The method of claim 13, further comprising monitoring two or more networks of optically switchable windows, the two or more networks of optically switchable windows being provided at different sites of the plurality of remote sites.

16. The method of claim 12, wherein the baseline characterization of the network of optically switchable windows includes a combination of component fingerprints of all or a subset of the plurality of components.

17. The method of claim 12, wherein the baseline characterization of the network of optically switchable windows comprises data indicating a frequency of errors over time related to one or more of the plurality of components.

18. The method of claim 12, wherein the baseline characterization of the network of optically switchable windows comprises data related to the associated sensors, the data including one or more parameters selected from the group consisting of: (i) sensor readings vs. time, (ii) sensor readings vs. external weather events, (iii) information comparing an output of one or more of the sensors vs. a tint state on at least one optically switchable window affected by the one or more of the sensors, and (iv) information regarding changes in external lighting conditions since the network of optically switchable windows was installed.

19. The method of claim 12, wherein the plurality of components further comprise one or more control panels and the baseline characterization of the network of optically switchable windows comprises at least one parameter associated with a control panel of the one or more control panels, selected from the group consisting of: (i) an input power to the control panel, (ii) an output power from the control panel, (iii) an input voltage to the control panel, (iv) an output voltage from the control panel, (v) an input current to the control panel, and (vi) an output current from the control panel.

20. The method of claim 12, wherein the network is located at a site of the plurality of remote sites, and wherein the method is executed by one or more processors located remote from the site at which the network is located.

21. An apparatus comprising a controller configured to control the following operations:
communicating with a plurality of remote sites, each site including a respective network of optically switchable windows and associated controllers and sensors,
causing a first set of voltage and/or current parameters to be measured at a plurality of components of at least one of the respective networks,
storing the information received and the first set of measured parameters as a baseline characterization of the network of optically switchable windows, wherein the plurality of components comprise at least one of the optically switchable windows, the associated controllers and the associated sensors,
using the baseline characterization for comparison to subsequently measured parameters to identify a variation in the subsequently measured parameters from the baseline characterization,
when the variation in the subsequently measured parameters from the baseline characterization exceeds a threshold value, identifying a malfunctioning or degrading component of the plurality of components, and
performing a remedial action in response to the identified malfunctioning or degrading component of the plurality of components, wherein the remedial action comprises adjusting at least one or more voltages and/or one or more other parameters applied to at least one of the plurality components.

22. The apparatus of claim 21, the controller further configured to control:
determining that a site monitoring system (SMS) requires updated parameters for controlling one or more optical transitions of one or more of the optically switchable windows, and
sending one or more communications comprising the updated parameters and instructions to update the SMS with the updated parameters.

23. The apparatus of claim 21, the remedial action comprises notifying a user and/or an operator of the SMS when the malfunctioning or degrading component is identified.

24. The apparatus of claim 22, the controller further configured to control monitoring two or more networks of optically switchable windows, the two or more networks of optically switchable windows being provided at different sites of the plurality of remote sites.

25. The apparatus of claim 21, wherein the baseline characterization of the network of optically switchable windows includes:
(a) a combination of component fingerprints of all or a subset of the plurality of components;
(b) data indicating a frequency of errors over time related to one or more of the plurality of components; and/or
(c) data related to the associated sensors, the data including one or more parameters selected from the group consisting of: (i) sensor readings vs. time, (ii) sensor readings vs. external weather events, (iii) information comparing an output of one or more of the sensors vs. a tint state on at least one optically switchable window affected by the one or more of the sensors, and (iv) information regarding changes in external lighting conditions since the network of optically switchable windows was installed.

26. The apparatus of claim 21, wherein the plurality of components further comprise one or more control panels and the baseline characterization of the network of optically switchable windows comprises at least one parameter associated with a control panel of the one or more control panels, selected from the group consisting of: (i) an input power to the control panel, (ii) an output power from the control panel, (iii) an input voltage to the control panel, (iv) an output voltage from the control panel, (v) an input current to the control panel, and (vi) an output current from the control panel.

27. The apparatus of claim 21, wherein the network is located at a site of the plurality of remote sites, and wherein the controller is located remote from the site at which the network is located.

28. A computer program product comprising a non-transitory computer readable medium storing computer executable instructions, wherein the instructions comprise causing a controller to execute the following operations:
communicating with a plurality of remote sites, each site including a respective network of optically switchable windows and associated controllers and sensors,
causing a first set of voltage and/or current parameters to be measured at a plurality of components of at least one of the respective networks,
storing the information received and the first set of measured parameters as a baseline characterization of the network of optically switchable windows, wherein the plurality of components comprise at least one of the optically switchable windows, the associated controllers and the associated sensors,
using the baseline characterization for comparison to subsequently measured parameters to identify a variation in the subsequently measured parameters from the baseline characterization,
when the variation in the subsequently measured parameters from the baseline characterization exceeds a threshold value, identifying a malfunctioning or degrading component of the plurality of components, and performing a remedial action in response to the identified malfunctioning or degrading component of the plurality of components, wherein the remedial action comprises adjusting at least one or more voltages and/or one or more other parameters applied to at least one of the plurality components.

29. The computer program product of claim 28, wherein the instructions further comprise causing the controller to execute the following operations:

determining that a site monitoring system (SMS) requires updated parameters for controlling one or more optical transitions of one or more of the optically switchable windows, and sending one or more communications comprising the updated parameters and instructions to update the SMS with the updated parameters.

30. The computer program product of claim 28, wherein the remedial action comprises notifying a user and/or an operator of the SMS when the malfunctioning or degrading component is identified.

31. The computer program product of claim 28, wherein the instructions further comprise causing the controller to control monitoring two or more networks of optically switchable windows, the two or more networks of optically switchable windows being provided at different sites of the plurality of remote sites.

32. The computer program product of claim 28, wherein the baseline characterization of the network of optically switchable windows includes:

(a) a combination of component fingerprints of all or a subset of the plurality of components;

(b) data indicating a frequency of errors over time related to one or more of the plurality of components; and/or (c) data related to the associated sensors, the data including one or more parameters selected from the group consisting of: (i) sensor readings vs. time, (ii) sensor readings vs. external weather events, (iii) information comparing an output of one or more of the sensors vs. a tint state on at least one optically switchable window affected by the one or more of the sensors, and (iv) information regarding changes in external lighting conditions since the network of optically switchable windows was installed.

33. The computer program product of claim 28, wherein the plurality of components further comprise one or more control panels and the baseline characterization of the network of optically switchable windows comprises at least one parameter associated with a control panel of the one or more control panels, selected from the group consisting of: (i) an input power to the control panel, (ii) an output power from the control panel, (iii) an input voltage to the control panel, (iv) an output voltage from the control panel, (v) an input current to the control panel, and (vi) an output current from the control panel.

34. The computer program product of claim 28, wherein the network is located at a site of the plurality of remote sites, and wherein the controller is located remote from the site at which the network is located.

* * * * *